(12) United States Patent
Morimoto et al.

(10) Patent No.: US 8,229,281 B2
(45) Date of Patent: Jul. 24, 2012

(54) RECORDING APPARATUS, RECORDING METHOD, RECORDING PROGRAM, RECORDING/REPRODUCING APPARATUS, RECORDING/REPRODUCING METHOD, RECORDING/REPRODUCING PROGRAM, EDITING APPARATUS, EDITING METHOD, AND EDITING PROGRAM

(75) Inventors: Naoki Morimoto, Tokyo (JP); Kenichiro Aridome, Kanagawa (JP); Yukio Isobe, Kanagawa (JP); Atsushi Mae, Kanagawa (JP)

(73) Assignee: Sony Corporation (JP)

( * ) Notice: Subject to any disclaimer, the term of this patent is extended or adjusted under 35 U.S.C. 154(b) by 1168 days.

(21) Appl. No.: 11/804,749

(22) Filed: May 18, 2007

(65) Prior Publication Data

US 2007/0269187 A1 Nov. 22, 2007

(30) Foreign Application Priority Data

May 19, 2006 (JP) .............................. P2006-140839

(51) Int. Cl.
*H04N 5/76* (2006.01)
(52) U.S. Cl. ...................................... 386/291
(58) Field of Classification Search ........................ None
See application file for complete search history.

(56) References Cited

U.S. PATENT DOCUMENTS

| 6,078,722 | A | * | 6/2000 | Kawamura et al. | ............ | 386/343 |
| 6,118,928 | A | * | 9/2000 | Kawakami et al. | ............ | 386/241 |
| 2004/0091241 | A1 | | 5/2004 | Seo et al. | | |
| 2005/0099869 | A1 | | 5/2005 | Crinon et al. | | |
| 2005/0152448 | A1 | * | 7/2005 | Crinon et al. | ............ | 375/240.01 |
| 2005/0259957 | A1 | * | 11/2005 | Jung et al. | ........................ | 386/65 |

FOREIGN PATENT DOCUMENTS

| EP | 1 206 135 | 5/2002 |
| EP | 1 746 825 | 1/2007 |
| EP | 1 818 937 | 8/2007 |
| JP | 2006-506763 T | 2/2006 |
| WO | 2004/044904 | 5/2004 |
| WO | 2005101827 | 10/2005 |

OTHER PUBLICATIONS

Office Action from Japanese Application No. 2006-140839, dated Dec. 14, 2010.

* cited by examiner

*Primary Examiner* — William C Vaughn, Jr.
*Assistant Examiner* — Eileen Adams
(74) *Attorney, Agent, or Firm* — Lerner, David, Littenberg, Krumholz & Mentlik, LLP

(57) ABSTRACT

A recording apparatus for compression-coding video data and recording the compression-coded video data, including an encoder compression-coding video data using interframe compression based on predictive coding for each of groups each including a plurality of pictures, a plurality of pictures including at least one independently-decodable picture; a mark information generator generating mark information indicating an access position to the video data for each of the groups; and a recording unit recording the video data compression-coded by the encoder in a recording medium is provided. When the access position is designated to one of the groups decodable without use of information on a closest past group in reproduction order, the mark information generator generates the mark information indicating a position of a top of the decodable group.

24 Claims, 37 Drawing Sheets

Fig. 7

| SYNTAX | DATA LENGTH (BITS) | MNEMONIC |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

Fig. 8

| SYNTAX | DATA LENGTH (BITS) | MNEMONIC |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (*title_id*=0; *title_id* < NumberOfTitles; *title_id*++) { | | |
|         MovieTitle[*title_id*]() { | | |
|             reserved | 1 | bslbf |
|             '1' | 1 | bslbf |
|             reserved | 46 | bslbf |
|             **MovieTitleMobjIDRef[*title_id*]** | 16 | uimsbf |
|             reserved | 32 | bslbf |
|         } | | |
|     } | | |
| } | | |

Fig. 9

| SYNTAX | DATA LENGTH (BITS) | MNEMONIC |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

Fig. 10

| SYNTAX | DATA LENGTH (BTS) | MNEMONIC |
|---|---|---|
| blkMovieObjects() { | | |
|   Length | 32 | uimsbf |
|   reserved | 32 | bslbf |
|   NumberOfMobjs | 16 | uimsbf |
|   for (mobj_id=0; mobj_id<NumberOfMobjs; mobj_id++) { | | |
|     MovieObject[mobj_id]() { | | |
|       TerminalInfo() { | | |
|         '1' | 1 | bslbf |
|         reserved | 15 | bslbf |
|       } | | |
|       NumberOfNavigationCommands[mobj_id] | 16 | uimsbf |
|       for (command_id=0; command_id<NumberOfNavigationCommands[mobj_id]; command_id++){ | | |
|         NavigationCommand[mobj_id][command_id] | 96 | bslbf |
|       } | | |
|     } | | |
|   } | | |
| } | | |

Fig. 11

| SYNTAX | DATA LENGTH (BITS) | MNEMONIC |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

Fig. 12

| SYNTAX | DATA LENGTH (BITS) | MNEMONIC |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(*PlayItem_id*=0;<br>        *PlayItem_id*<*NumberOfPlayItems*; *PlayItem_id*++) { | | |
|         blkPlayItem() | | |
|     } | | |
|     for(*SubPath_id*=0;<br>        *SubPath_id*<*NumberOfSubPaths*; *SubPath_id*++) { | | |
|         blkSubPath() | | |
|     } | | |
| } | | |

Fig. 13

| SYNTAX | DATA LENGTH (BITS) | MNEMONIC |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

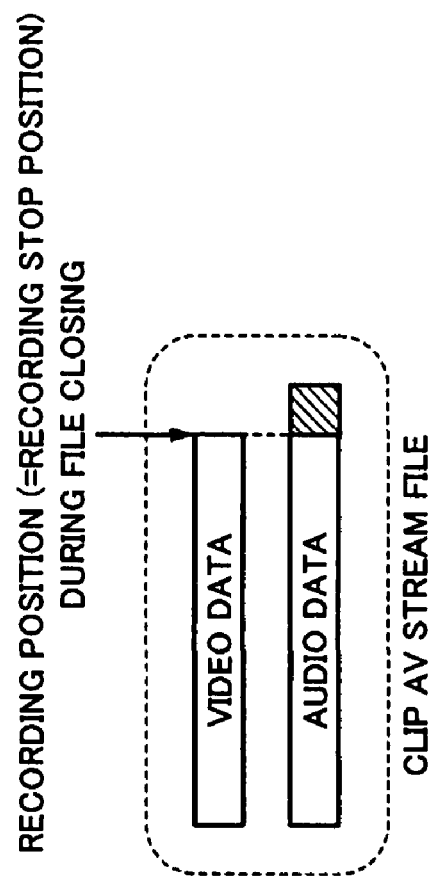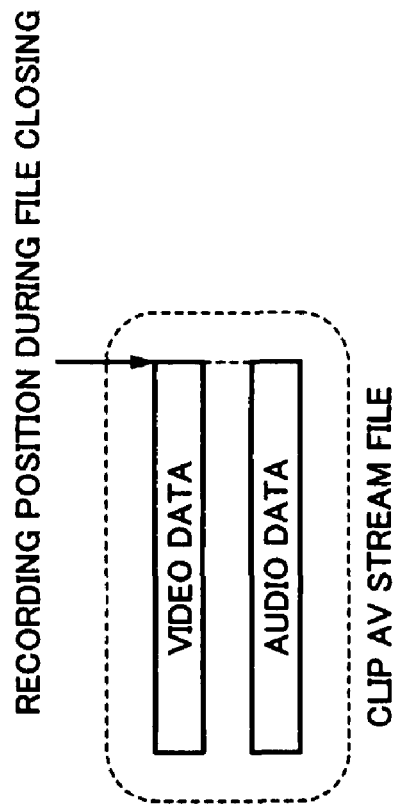
Fig. 14A  ConnectionCondition=5
Fig. 14B  ConnectionCondition=6

*Fig. 15*

| SYNTAX | DATA LENGTH (BITS) | MNEMONIC |
|---|---|---|
| blkPlayListMark() { | | |
|     Length | 32 | uimsbf |
|     NumberOfPlayListMarks | 16 | uimsbf |
|     for(PL_mark_id=0; PL_mark_id< NumberOfPlayListMarks; PL_mark_id++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

Fig. 16

| SYNTAX | DATA LENGTH (BITS) | MNEMONIC |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

*Fig. 17*

| SYNTAX | DATA LENGTH (BITS) | MNEMONIC |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

Fig. 18

| SYNTAX | DATA LENGTH (BITS) | MNEMONIC |
|---|---|---|
| blkEPMap(){ | | |
|   reserved | 8 | bslbf |
|   NumberOfStreamPIDEntries | 8 | uimsbf |
|   for (k=0; k<NumberOfStreamPIDEntries; k++) { | | |
|     StreamPID[k] | 16 | bslbf |
|     reserved | 10 | bslbf |
|     EPStreamType[k] | 4 | bslbf |
|     NumberOfEPCoarseEntries[k] | 16 | uimsbf |
|     NumberOfEPFineEntries[k] | 18 | uimsbf |
|     EPMapForOneStreamPIDStartAddress[k] | 32 | uimsbf |
|   } | | |
|   for (i=0; i<X; i++) { | | |
|     padding_word | 16 | bslbf |
|   } | | |
|   for (k=0; k<NumberOfStreamPIDEntries; k++) { | | |
|     blkEPMapForOneStreamPID(EPStreamType[k], NumberOfEPCoarseEntries[k], NumberOfEPFineEntries[k]) | | |
|     for (i=0; i<Y[k]; i++) { | | |
|       padding_word | 16 | bslbf |
|     } | | |
|   } | | |
| } | | |

Fig. 19

| SYNTAX | DATA LENGTH (BITS) | MNEMONIC |
|---|---|---|
| blkEPMapForOneStreamPID(*EP_stream_type, Nc, Nf*) { | | |
|     EPFineTableStartAddress | 32 | uimsbf |
|     for (i=0; i<*Nc*; i++) { | | |
|     // EP coarse table | | |
|         **RefToEPFineID*[i]*** | 18 | uimsbf |
|         **PTSEPCoarse*[i]*** | 14 | uimsbf |
|         **SPNEPCoarse*[i]*** | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*, *EP_fine_id*++) { | | |
|     // EP fine table | | |
|         **ReservedEPFine*[EP_fine_id]*** | 1 | bslbf |
|         **IEndPositionOffset*[EP_fine_id]*** | 3 | bslbf |
|         **PTSEPFine*[EP_fine_id]*** | 11 | uimsbf |
|         **SPNEPFine*[EP_fine_id]*** | 17 | uimsbf |
|     } | | |
| } | | |

- PTS : b0..b32 (33-BITS, 90kHz)
- PTSEPFine : b9..b19 (11-BITS, RESOLUTION=5.7 msec AND WRAP AROUND IN 11.5 SECONDS APPROXIMATELY)
- PTSEPCoarse : b19..b32 (14-BITS, RESOLUTION=5.8 sec AND WRAP AROUND IN 26.5 HOURS APPROXIMATELY)

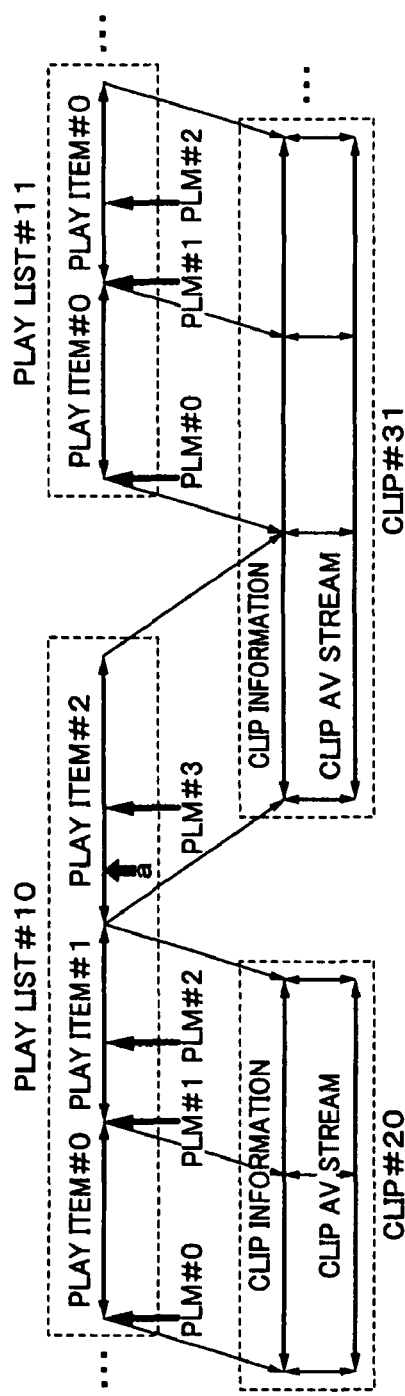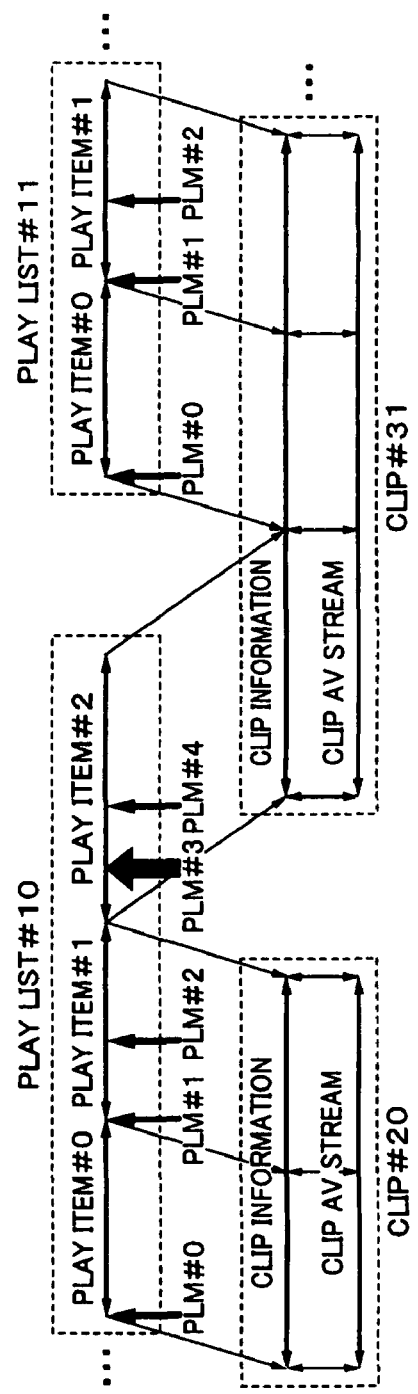

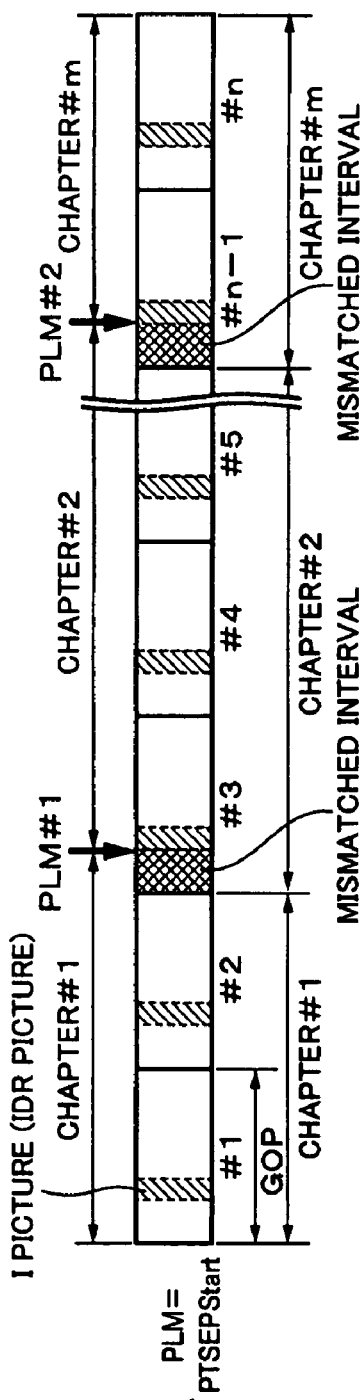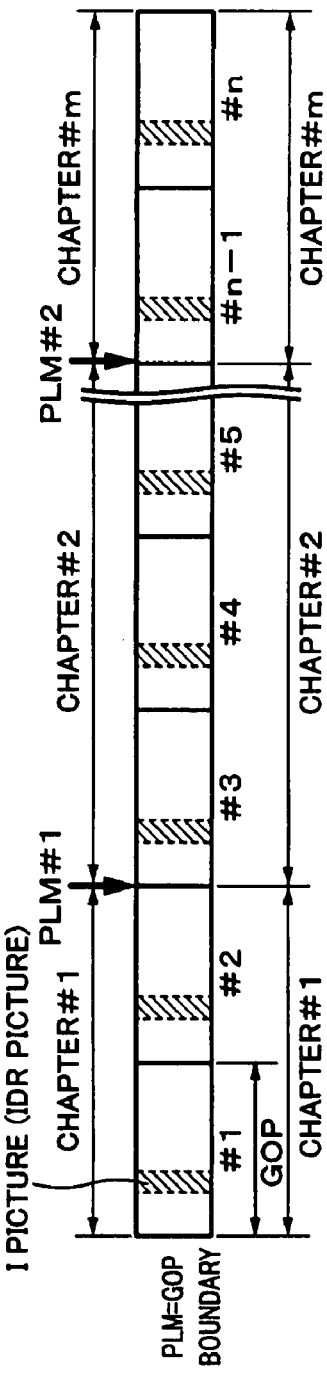

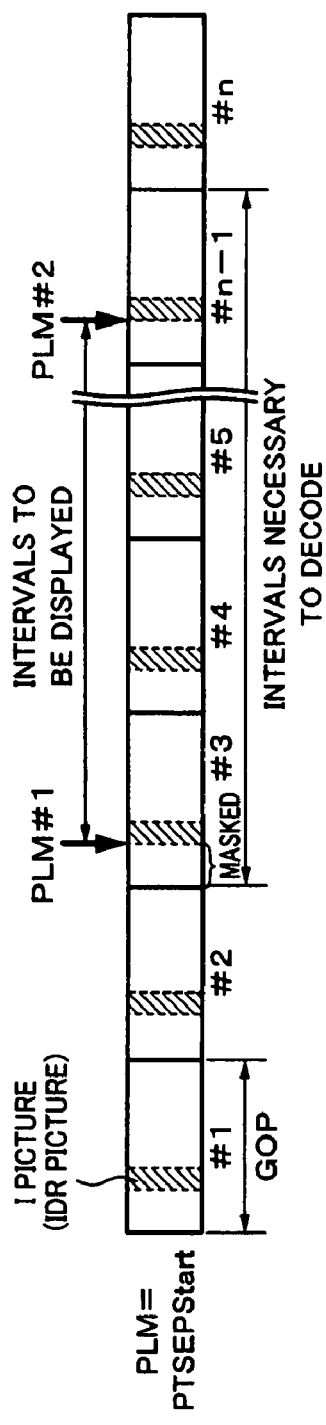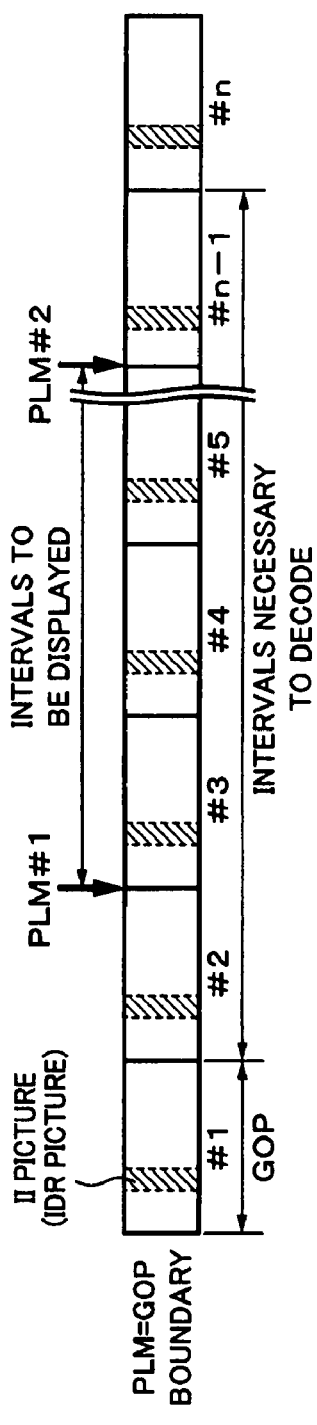

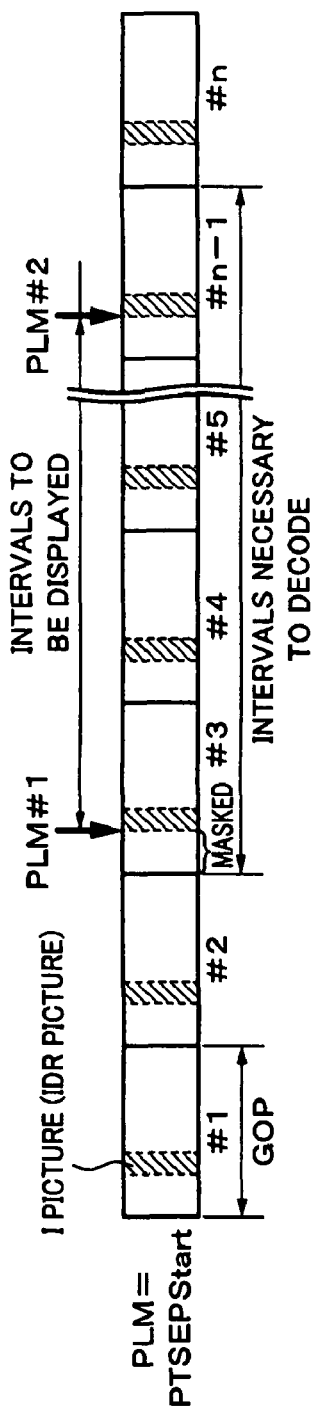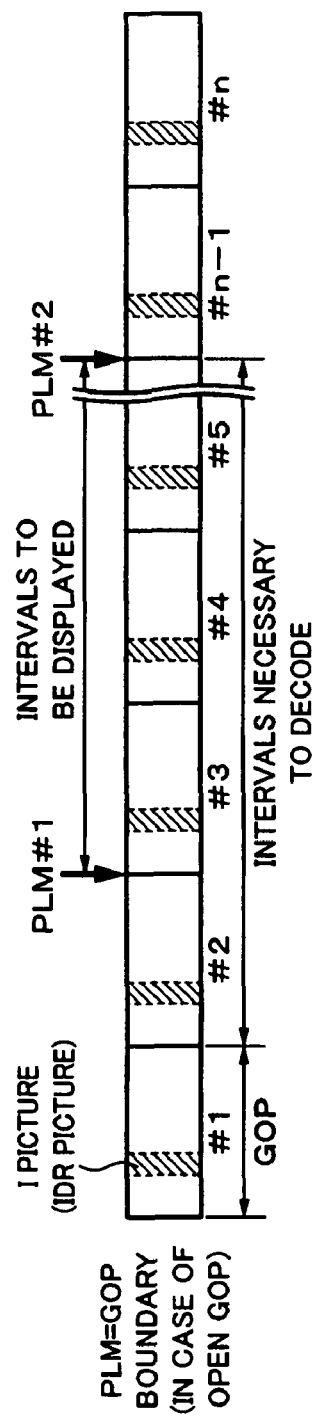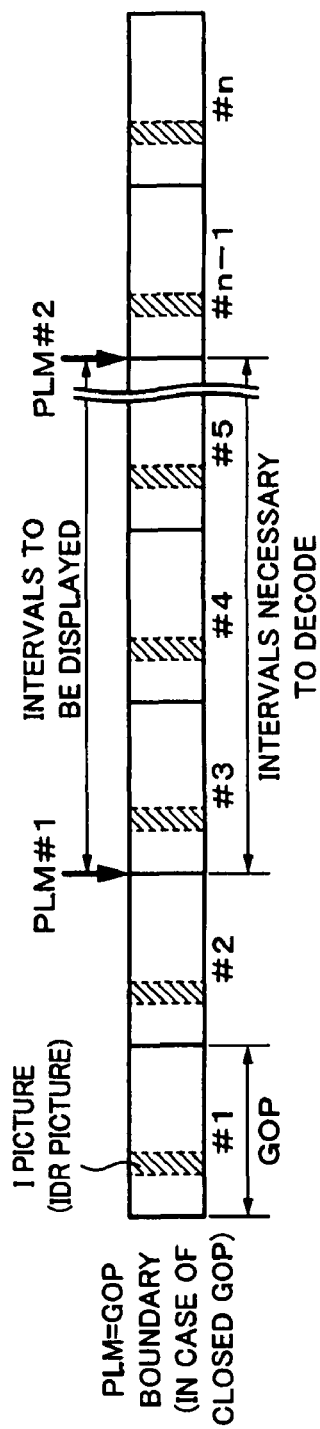

Fig. 30

| DESIGNATED POSITION / ACTUAL POSITION | ITEM | PTSEPStart | GOP BOUNDARY (ORDINARY REPRODUCING APPARATUS) | GOP BOUNDARY (APPARATUS USING UNIQUE INFORMATION) |
|---|---|---|---|---|
| IN CASE DESIGNATED POSITION IS RECORDING START/STOP BOUNDARY | IS CHAPTER-BOUNDARY MISMATCHING PRESENT/ABSENT BETWEEN RECORDING AND REPRODUCTION? | × | ○ | ○ |
| | INTERVAL IN WHICH MORE FRAMES THAN DISPLAY FRAMES ARE NECESSARY TO READ/DECODE AT START POSITION | ○ NECESSARY ONLY BY (M-1) FRAMES | ○ UNNECESSARY IN CASE OF CLOSED GOP | ○ UNNECESSARY IN CASE OF CLOSED GOP |
| | INTERVAL IN WHICH MORE FRAMES THAN DISPLAY FRAMES ARE NECESSARY TO READ/DECODE AT END POSITION | × NECESSARY BY (N-M+1) FRAMES | ○ UNNECESSARY | ○ UNNECESSARY |
| IN CASE DESIGNATED POSITION IS NOT RECORDING START/STOP BOUNDARY | IS CHAPTER-BOUNDARY MISMATCHING PRESENT/ABSENT BETWEEN RECORDING AND REPRODUCTION? | — | — | — |
| | INTERVAL IN WHICH MORE FRAMES THAN DISPLAY FRAMES ARE NECESSARY TO READ/DECODE AT START POSITION | ○ NECESSARY ONLY BY (M-1) FRAMES | × NECESSARY BY N FRAMES | × NECESSARY BY N FRAMES IN CASE OF NON-CLOSED GOP |
| | INTERVAL IN WHICH MORE FRAMES THAN DISPLAY FRAMES ARE NECESSARY TO READ/DECODE AT END POSITION | × NECESSARY BY (N-M+1) FRAMES | × NECESSARY BY N FRAMES | ○ UNNECESSARY |

RECORDING APPARATUS, RECORDING METHOD, RECORDING PROGRAM, RECORDING/REPRODUCING APPARATUS, RECORDING/REPRODUCING METHOD, RECORDING/REPRODUCING PROGRAM, EDITING APPARATUS, EDITING METHOD, AND EDITING PROGRAM

CROSS REFERENCES TO RELATED APPLICATIONS

The present application claims priority from Japanese Patent Application No. JP 2006-140839, filed in the Japanese Patent Office on May 19, 2006, the entire content of which is incorporated herein by reference.

BACKGROUND OF THE INVENTION

1. Field of the Invention

The present invention relates to a recording apparatus, a recording method, and a recording program, a recording/reproducing apparatus, a recording/reproducing method, a recording/reproducing program, an editing apparatus, an editing method, and an editing program for performing an editing processing on a clip configured to include AV (Audio/Video) stream data.

2. Description of the Related Art

In the related art, a DVD (Digital Versatile Disc) having a recording capacity equal to or larger than 4.7 GB (Giga Bytes) has been prevailing as a recording medium that is detachable from a recordable recording/reproducing apparatus, that has a relatively large recording capacity, and that is suited to record AV (Audio/Video) data including video data and audio data. Japanese Patent Application Laid-Open (JP-A) No. 2004-350251 discloses an imaging apparatus for recording AV data in a recordable DVD in DVD-Video format.

The AV data recorded in such a recordable recording medium is desirably editable. A specific example of a method of editing AV data is a method of editing AV data while dividing the AV data into predetermined units. Video data and audio data included in the AV data are generally recorded in the recording medium as predetermined multiplexed data units.

Furthermore, the video data is generally recorded in the recording medium after being compression-coded by a predetermined system because the video data is considerably large in data capacity. As standard systems for compression-coding the video data, MPEG2 (Moving Picture Experts Group 2) systems are known. Moreover, ITU-T (International Telecommunication Union-Telecommunication Standardization Sector) Recommendation H.264 and ISO (International Organization for Standardization)/IEC (International Electrotechnical Commission) International Standard 14496-10 (MPEG-4 Part 10) Advanced Video Coding (hereinafter, abbreviated as "H.264|AVC") that enable efficient coding by further advancing the MPEG2-based compression coding have been also widespread.

According to the MPEG2 and the H264|AVC systems, not only intraframe coding using orthogonal transform but also intraframe coding using predictive coding based on motion compensation are performed, thereby further improving compression ratio. Using MPPEG2 as an example, an interframe-compression based on predictive coding will be described below.

Outline of a data stream structure according to the MPEG2 will first be described. The MPEG2 is a combination of motion-compensation-based predictive coding and DCT (discrete cosine transform)-based compression coding. According to the MPEG2, data has a hierarchical structure in which a block layer, a macroblock layer, a slice layer, a picture layer, a GOP (Group Of Picture) layer, and a sequence layer are arranged from below. The block layer is configured to include DCT blocks that are units for performing the DCT. The macroblock layer is configured to include a plurality of DCT blocks. The slice layer is configured to include a header part and one or more macro blocks. The picture layer is configured to include a header part and one or more slices.

One picture corresponds to one image plane. Boundaries of the layers are made identifiable by predetermined identification codes, respectively.

The GOP layer is configured to include a header part, an I (Intra-coded) picture based on intraframe coding, a P (Predictive-coded) picture based on predictive coding, and a B (Bidirectionally predictive-coded) picture based on predictive coding. The I picture includes information only and is decodable per se. The P and B pictures are undecodable per se unless a temporally previous image and temporally previous and later images are used as a reference image and reference images, respectively. For example, the P picture is decoded using a temporally previous I or P picture as a reference image. The B picture is decoded using two temporally previous or later I or P pictures as reference images. A self-contained group including at least one I picture is referred to as "GOP", which is regarded as an independently accessible minimum unit in a MPEG stream.

The GOP is configured to include one or a plurality of pictures. It is assumed hereafter that the GOP is configured to include a plurality of pictures. Types of the GOP are two, i.e., a closed GOP completely decodable in itself and having a closed structure and an open GOP decodable using information on a GOP closest past the open GOP in order of coding. The open GOP can ensure higher image quality and is used more often than the closed GOP because the open GOP is decodable using more information than that used by the closed GOP.

Referring to FIGS. 1A to 1C, a processing for decoding interframe-compressed data will be described. It is assumed that one GOP includes one I picture, four P pictures, and 10 B pictures, i.e., 15 pictures in all. As shown in FIG. 1A, the I, P, and B pictures are displayed in a display order of "$B_0 B_1 B_2 B_3 B_4 P_5 B_6 B_7 P_8 B_9 B_{10} P_{11} B_{12} B_{13} P_{14}$". In FIGS. 1A to 1C, each subscript indicates a display order number.

In the example, the first two B pictures, i.e., $B_0$ and $B_1$ pictures are obtained after being predicted from and decoded using a last $P_{14}$ picture in a GOP closest past this GOP and an $I_2$ picture in the same GOP. The first P picture, i.e., $P_5$ picture in the GOP is obtained after being predicted from and decoded using the $I_2$ picture in the same GOP. Each of the remaining $P_8$, $P_{11}$, and $P_{14}$ pictures is obtained after being predicted from and decoded using the closest past P picture. Moreover, each of the B pictures subsequent to the I picture is obtained after being predicted from and decoded using temporally previous or later I and/or P pictures.

Each of the B pictures is predicted and decoded using temporally previous or later I and P pictures. Due to this, it is necessary to decide the display order of the I, P, and B pictures in a stream or recording medium in view of an order of decoding. Namely, it is typically necessary for the I or P pictures used to decode a B picture to be decoded prior to the B picture.

In the example, as shown in FIG. 1B, the pictures are arranged in the stream or recording medium in order of "$I_2 B_0 B_1 P_5 B_3 B_4 P_8 B_6 B_7 P_{11} B_9 B_{10} P_{14} B_{12} B_{13}$," and decoded in this order. In FIG. 1B, each subscript corresponds to that shown in FIG. 1A and indicates a display order number.

A decoding processing performed by a decoder is as follows. As shown in FIG. 1C, the $I_2$ picture is decoded first, and the $B_0$ and $B_1$ pictures are predicted from and decoded using the decoded $I_2$ picture and the rearmost $P_{14}$ picture (in display order) in a closest past GOP. The $B_0$ and $B_1$ pictures are output from the decoder in order of decoding, followed by output of the $I_2$ picture. After the $B_1$ picture is output, the $P_5$ picture is predicted from and decoded using the $I_2$ picture. Thereafter, the $B_3$ picture and the $B_4$ picture are predicted from and decoded using the $I_2$ picture and the $P_5$ picture. The decoded $B_3$ and $B_4$ pictures are output from the decoder in order of decoding, followed by output of the $P_5$ picture.

Subsequently, the following processing is similarly repeatedly performed. The P or I pictures used to predict the B picture are decoded prior to the B picture, the B picture is predicted and decoded using the decoded P or I pictures, the decoded B picture is output, and the P or I pictures used to decode the B picture are output. The picture arrangement in the recording medium or stream as shown in FIG. 1B is generally used arrangement.

SUMMARY OF THE INVENTION

In this manner, if video data that has been interframe-compressed based on the GOP structure is to be divided and edited by designating access positions to the video data, either a first method of dividing the video data by designating GOP boundaries or a second method of dividing the video data by designating an I picture in each GOP may be adopted. The first method has the following advantage. As described with reference to FIGS. 1A to 1C, the pictures subsequent to the I picture can be decoded in sequence by referring to this I picture. Due to this, during reproduction, when a top of each division of the video data divided based on result of editing is accessed, a jumping destination frame can be displayed with smaller delay.

On the other hand, the first method has, however, the following disadvantage. Boundary positions obtained by division and designation are inconsistent with GOP boundaries. Due to this, if a top of a division of the divided video data is accessed, pictures are not reproduced from a first picture in each GOP.

Furthermore, according to the first method, a rear end of each division of the divided video data is inconsistent with a GOP boundary. Due to this, if a GOP including a picture that is the rear end of the divided video data is produced as a different scene from previous GOPs, for example, pictures of irrelevant scenes are reproduced by as much as several frames on the rear end of the division of the divided video data.

According to the second method, a top of each GOP coincides with a boundary obtained by division and designation by editing. Differently from the first method, the second method is free from the problems that non-played pictures are present on the top of each GOP and that pictures of irrelevant scenes are reproduced on the rear end of each division of the divided video data.

The second method has, however, the following disadvantages. If the GOP including the first frame of the division of the video data is an open GOP, the B pictures temporally previous to the I picture in the GOP in display order are decoded using the I picture in the same GOP and the last P picture in the closest past GOP as described with reference to FIGS. 1A to 1C. Due to this, when a jumping destination is the division of the video data, it is typically necessary to also decode the last P picture in the closest past GOP, resulting in an increase of delay in picture output according to jumping operation.

As stated, in the related art, no method of dividing and editing the video data that has been interframe-compressed based on the GOP structure without producing problems in reproduced pictures and without hampering user convenience is not proposed yet.

It is, therefore, desirable to provide a recording apparatus, a recording method, a recording program, a recording/reproducing apparatus, a recording/reproducing method, a recording/reproducing program, an editing apparatus, an editing method, and an editing program capable of improving user convenience if video data having a GOP structure is to be divided and edited.

According to a first embodiment of the present invention, there is provided a recording apparatus for compression-coding video data and recording the compression-coded video data, including: an encoder compression-coding video data using interframe compression based on predictive coding for each of groups each including a plurality of pictures, a plurality of pictures including at least one independently-decodable picture; a mark information generator generating mark information indicating an access position to the video data for each of the groups; and a recording unit recording the video data compression-coded by the encoder in a recording medium, wherein, when the access position is designated to one of the groups decodable without use of information on a closest past group in reproduction order, the mark information generator generates the mark information indicating a position of a top of the decodable group.

According to a second embodiment of the present invention, there is provided a recording method for compression-coding video data and recording the compression-coded video data, the method including steps of: compression-coding video data using interframe compression based on predictive coding for each of groups including a plurality of pictures, a plurality of pictures including at least one independently-decodable picture; generating mark information indicating an access position to the video data for each of the groups; and recording the video data compression-coded at the step of compression-coding the video data in a recording medium, wherein, when the access position is designated to one of the groups decodable without use of information on a closest past group in reproduction order, the mark information indicating a position of a top of the decodable group is generated at the step of generating the mark information.

According to a third embodiment of the present invention, there is provided a recording program for causing a computer apparatus to execute a recording method for compression-coding video data and recording the compression-coded video data, wherein the recording method includes the steps of: compression-coding video data using interframe compression based on predictive coding for each of groups each including a plurality of pictures, a plurality of pictures including at least one independently-decodable picture; generating mark information indicating an access position to the video data for each of the groups; and recording the video data compression-coded at the step of compression-coding the video data in a recording medium, wherein, when the access position is designated to one of the groups decodable without use of information on a closest past group in reproduction order, the mark information indicating a position of a top of the decodable group is generated at the step of generating the mark information.

According to a fourth embodiment of the present invention, there is provided a recording/reproducing apparatus for compression-coding video data, recording the compression-coded video data in a recording medium, and reproducing and decoding the compression-coded video data recorded in the recording medium, including: an encoder compression-coding video data using interframe compression based on predictive coding for each of groups each including a plurality of pictures, a plurality of pictures including at least one independently-decodable picture; a recording unit recording the video data compression-coded by the encoder in a recording medium; a reproducing unit reading and decoding the compression-coded video data from the recording medium; and a mark information generator generating mark information indicating an access position to the video data for each of the groups, wherein, when the access position is designated to one of the groups decodable without use of information on a closest past group in reproduction order, the mark information generator generates the mark information indicating a position of a top of the decodable group.

According to a fifth embodiment of the present invention, there is provided a recording/reproducing method for compression-coding video data, recording the compression-coded video data in a recording medium, and reproducing and decoding the compression-coded video data recorded in the recording medium, the method including steps of: compression-coding video data using interframe compression based on predictive coding for each of groups each including a plurality of pictures, a plurality of pictures including at least one independently-decodable picture; recording the video data compression-coded at the step of compression-coding the video data in a recording medium; reading and decoding the compression-coded video data from the recording medium; and generating mark information indicating an access position to the video data for each of the groups, wherein, when the access position is designated to one of the groups decodable without use of information on a closest past group in reproduction order, the mark information indicating a position of a top of the decodable group is generated at the step of generating the mark information.

According to a sixth embodiment of the present invention, there is provided a recording/reproducing program for causing a computer apparatus to execute a recording/reproducing method for compression-coding video data, recording the compression-coded video data in a recording medium, and reproducing and decoding the compression-coded video data recorded in the recording medium, wherein the recording/reproducing method includes the steps of: compression-coding video data using interframe compression based on predictive coding for each of groups each including a plurality of pictures, a plurality of pictures including at least one independently-decodable picture; recording the video data compression-coded at the step of compression-coding the video data in a recording medium; reading and decoding the compression-coded video data from the recording medium; and generating mark information indicating an access position to the video data for each of the groups, wherein, when the access position is designated to one of the groups decodable without use of information on a closest past group in reproduction order, the mark information indicating a position of a top of the decodable group is generated at the step of generating the mark information.

According to a seventh embodiment of the present invention, there is provided an editing apparatus for generating mark information for designating an access position to video data, including: a decoder decoding video data compression-coded using interframe compression based on predictive coding for each of groups each including a plurality of pictures, a plurality of pictures including at least one independently-decodable picture; mark information generator generating mark information indicating an access position to the video data for each of the groups; and an operating unit accepting a user's operation and designating the access position according to the user's operation, wherein, when the access position is designated to one of the groups decodable without use of information on a closest past group in reproduction order in response to the operation on the operating unit, the mark information generator generates the mark information indicating a position of a top of the decodable group, and wherein, when the access position is designated to one of the groups decoded using information on the closest past group in the reproduction order in response to the operation on the operating unit, the mark information generator generates the mark information indicating a position of the independently-decodable picture belonging to each of the groups.

According to an eighth embodiment of the present invention, there is provided an editing method for generating mark information for designating an access position to video data, the method including steps of: decoding video data compression-coded using interframe compression based on predictive coding for each of groups each including a plurality of pictures, a plurality of pictures including at least one independently-decodable picture; generating mark information indicating an access position to the video data for each of the groups; and accepting user's operation and designating the access position according to the user's operation, wherein, when the access position is designated to one of the groups decodable without use of information on a closest past group in reproduction order in response to the user's operation at the step of accepting the operation, the mark information indicating a position of a top of the decodable group is generated at the step of generating the mark information, and wherein, when the access position is designated to one of the groups decoded using information on the closest past group in the reproduction order in response to the operation at the step of accepting the operation, the mark information indicating a position of the independently-decodable picture belonging to each of the groups is generated at the step of generating the mark information.

According to a ninth embodiment of the present invention, there is provided an editing program for causing a computer apparatus to execute an editing method for generating mark information for designating an access position to video data, wherein the editing method includes the steps of: decoding video data compression-coded using interframe compression based on predictive coding for each of groups each including a plurality of pictures, a plurality of pictures including at least one independently-decodable picture; generating mark information indicating an access position to the video data for each of the groups; and accepting user's operation and designating the access position according to the user's operation, wherein, when the access position is designated to one of the groups decodable without use of information on a closest past group in reproduction order in response to the operation at the step of accepting the user's operation, the mark information indicating a position of a top of the decodable group is generated at the step of generating the mark information, and wherein, when the access position is designated to one of the groups decoded using information on the closest past group in the reproduction order in response to the operation at the step of accepting the operation, the mark information indicating a position of the independently-decodable picture belonging to each of the groups is generated at the step of generating the mark information.

As stated above, according to the first, second, and third embodiments of the present invention, video data is compression-coded using interframe compression based on predictive coding for each of groups each including a plurality of pictures including at least one independently-decodable picture is recorded in a recording medium. When an access position is designated to one of the groups decodable without use of information on a closest past group in reproduction order, mark information indicating a position of a top of the decodable group is generated. Due to this, if it is designated to jump to the group decodable without use of the closest past group in the reproduction order when the video data is reproduced from the recording medium, it is possible to reduce a display delay at a jumping destination.

According to the fourth, fifth, and sixth embodiments of the present invention, video data compression-coded using interframe compression based on predictive coding for each of groups each including a plurality of pictures including at least one independently-decodable picture is recorded in a recording medium, and the compression-coded video data is read and decoded from the recording medium. When an access position is designated to one of the groups decodable without use of information on a closest past group in reproduction order, mark information indicating a position of a top of the decodable group is generated. Due to this, if it is designated to jump to the group decodable without use of the information on the closest past group in the reproduction order in the video data reproduced from the recording medium, it is possible to reduce a display delay at a jumping destination.

According to the seventh, eighth, and ninth embodiments of the present invention, video data is compression-coded using interframe compression based on predictive coding for each of groups each including a plurality of pictures including at least one independently-decodable picture. Mark information indicating an access position to the video data for each of the groups is generated so as to indicate a position of a top of the decodable group when the access position is designated to one of the groups decodable without use of information on a closest past group in reproduction order. Furthermore, the mark information is generated so as to indicate a position of at least one independently-decodable picture belonging to each of the groups when the access position is designated to one of the groups decoded using information on the closest past group in the reproduction order in response to a user's operation. Due to this, if it is designated to jump to the video data, it is advantageously possible to reduce a display delay at a jumping destination.

According to the first, second, and third embodiments of the present invention, video data is compression-coded using interframe compression based on predictive coding for each of groups each including a plurality of pictures including at least one independently-decodable picture is recorded in a recording medium. When an access position is designated to one of the groups decodable without use of information on a closest past group in reproduction order, mark information indicating a position of a top of the decodable group is generated. Due to this, if it is designated to jump to the group decodable without use of the closest past group in the reproduction order when the video data is reproduced from the recording medium, it is advantageously possible to reduce a display delay at a jumping destination.

According to the fourth, fifth, and sixth embodiments of the present invention, video data compression-coded using interframe compression based on predictive coding for each of groups each including a plurality of pictures including at least one independently-decodable picture is recorded in a recording medium, and the compression-coded video data is read and decoded from the recording medium.

When an access position is designated to one of the groups decodable without use of information on a closest past group in reproduction order, mark information indicating a position of a top of the decodable group is generated. Due to this, if it is designated to jump to the group decodable without use of the information on the closest past group in the reproduction order in the video data reproduced from the recording medium, it is advantageously possible to reduce a display delay at a jumping destination.

According to the seventh, eighth, and ninth embodiments of the present invention, video data is compression-coded using interframe compression based on predictive coding for each of groups each including a plurality of pictures including at least one independently-decodable picture. Mark information indicating an access position to the video data for each of the groups is generated so as to indicate a position of a top of the decodable group when the access position is designated to one of the groups decodable without use of information on a closest past group in reproduction order. Furthermore, the mark information is generated so as to indicate a position of at least one independently-decodable picture belonging to each of the groups when the access position is designated to one of the groups decoded using information on the closest past group in the reproduction order in response to a user's operation. Due to this, if it is designated to jump to the video data, it is advantageously possible to reduce a display delay at a jumping destination.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a schematic diagram showing syntax representing an exemplary structure of a file "index.bdmv";

FIG. 8 is a schematic diagram showing syntax representing an exemplary structure of a block "blkIndexes( )";

FIG. 9 is a schematic diagram showing syntax representing an exemplary structure of a file "MovieObject.bdmv";

FIG. 10 is a schematic diagram showing syntax representing an exemplary structure of a block "blkMovieObjects( )";

FIG. 11 is a schematic diagram showing syntax representing an exemplary structure of a PlayList file "xxxxx.mpls";

FIG. 12 is a schematic diagram showing syntax representing an exemplary structure of a block "blkPlayList( )";

FIG. 13 is a schematic diagram showing syntax representing an exemplary structure of a block "blkPlayItem( )";

FIGS. 14A and 14B are schematic diagram for explaining first and second seamless connections, respectively;

FIG. 15 is a schematic diagram showing syntax representing an exemplary structure of a block "blkPlayListMark( )";

FIG. 16 is a schematic diagram showing syntax representing an exemplary structure of a clip information file;

FIG. 17 is a schematic diagram showing syntax representing an exemplary structure of a block "blkCPI( )";

FIG. 18 is a schematic diagram showing syntax representing an exemplary structure of a block "blkEPMap( )";

FIG. 19 is a schematic diagram showing syntax representing an exemplary structure of a block "blkEPMapForOneStreamPID(EP_stream_type,Nc,Nf)";

FIGS. 25A and 25B are schematic diagrams for explaining the processing for additional insertion of PlayListMarks;

FIGS. 27A and 27B are schematic diagrams showing examples of chapter boundaries by a method of assigning PlayListMarks to positions each indicated by an entry "PTSEPStart" and a method of assigning PlayListMarks to positions of GOP boundaries, respectively;

FIGS. 28A and 28B are schematic diagrams showing examples of decoded intervals by the method of assigning PlayListMarks to positions each indicated by the entry "PTSEPStart" and the method of assigning PlayListMarks to positions of GOP boundaries, respectively;

FIGS. 29A, 29B, and 29C are schematic diagrams showing examples of decoded intervals by the method of assigning PlayListMarks to positions each indicated by the entry "PTSEPStart" and the method of assigning PlayListMarks to positions of GOP boundaries in the case where a GOP can be determined as an open GOP or a closed GOP, respectively;

FIG. 30 is a table showing evaluations of settings of PlayListmarks under respective conditions;

DESCRIPTION OF THE PREFERRED EMBODIMENTS

Embodiments of the present invention will be described below with reference to the accompanying drawings.

To help understand the embodiments of the present invention, an exemplary format applicable to the embodiments of the present invention (hereinafter, "AVCHD format") will first be described. The AVCHD format is currently proposed as a recording format for recording an AV (Audio/Video) stream in which video data and audio data are multiplexed in a predetermined fashion, in a recordable recording medium. The AVCHD format enables the AV stream recorded in the recording medium to be managed using a PlayList for every clip.

A bit stream encoded by encoding methods specified, for example, by ITU (International Telecommunication Union-Telecommunication Standarization Sector) recommendation H.264 or ISO (International Organization for Standardization)/IEC (International Electrotechnical Commission) International standard 14496-10 (MPEG-4 Part 10) Advanced Video Coding (hereinafter, abbreviated as H.264|AVC) and multiplexed according to the MPEG2 systems, for example, is referred to as "clip AV stream (or AV stream)". The clip AV stream is recorded as files in a disc by a predetermined file system. The file is referred to as "clip AV stream file (or AV stream file)".

The clip AV stream file is a management on the file system and is not necessarily convenient for the user friendliness. In view of the user convenience, it is typically necessary to use a mechanism of integrally reproducing video contents divided into a plurality of clip AV stream files and a mechanism of reproducing each clip AV stream file only partially, and a mechanism of recording information for smoothly performing special reproduction, cue reproduction or the like in the disc as a database.

Figure 1A:
FIGS. 1A, 1B, and 1C are schematic diagrams for explaining a data decoding processing using interframe compression.
Figure 1B:
Figure 1C:
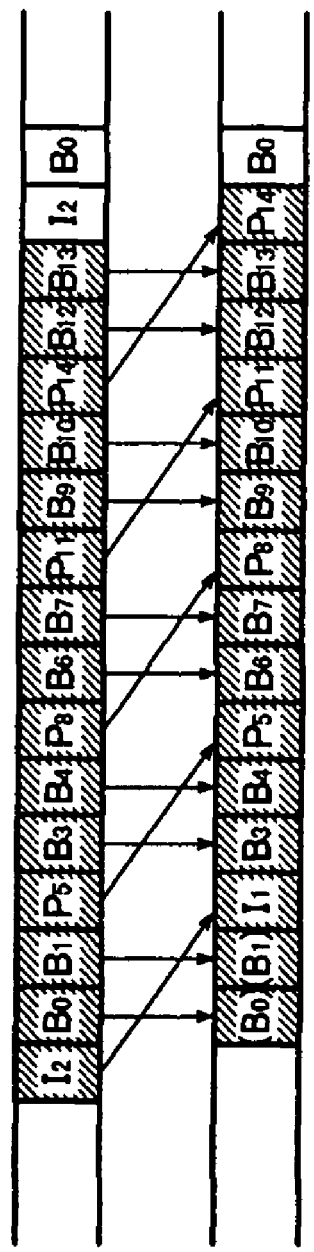
Figure 2:
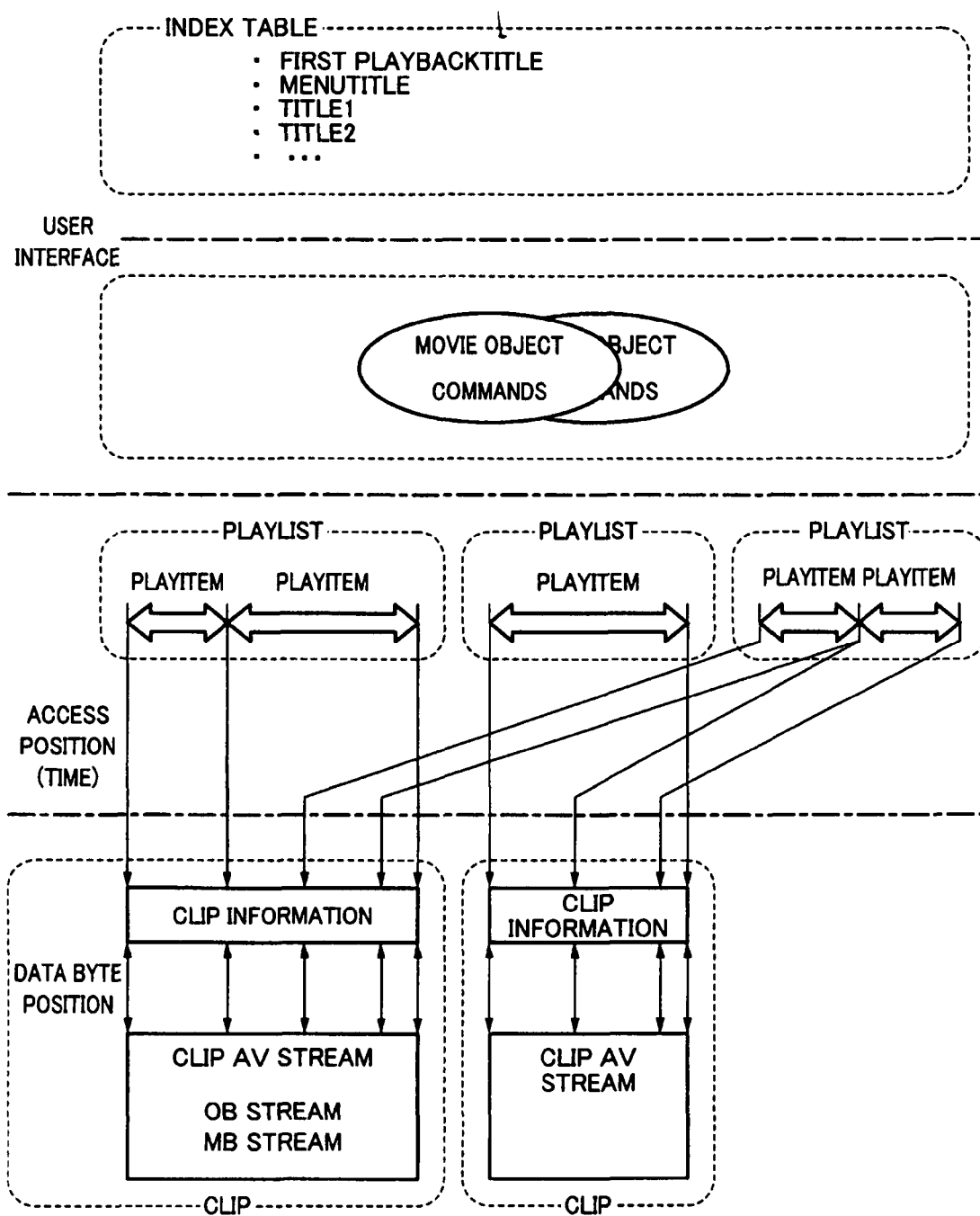
FIG. 2 is a schematic diagram of a data model specified in AVCHD format applicable to the present invention.

FIG. 2 is a schematic diagram of a data model specified in the AVCHD format applicable to the embodiments of the present invention. In the AVCHD format, a data structure includes four layers as shown in FIG. 2. A lowermost layer is a layer (hereinafter, "clip layer" for the sake of convenience) on which a clip AV stream is arranged. A second lowest layer next to the clip layer is a layer (hereinafter, "PlayList layer" for the sake of convenience) on which PlayLists each for designating a reproduction part with respect to the clip AV stream and PlayItem. A third lowest layer next to the PlayList layer is a layer (hereinafter, "object layer" for the sake of convenience) on which MovieObjects or the like including commands for designating a reproduction order with respect to the PlayLists are arranged. An uppermost layer is a layer (hereinafter, "index layer" for the sake of convenience) on which an Index Table for managing titles or the like stored in the recording medium is arranged.

The clip layer will be described. The clip AV stream is a bit stream in which the video data and the audio data are multiplexed in an MPEG2 TS (transport stream) format or the like. Information on the clip AV stream is recorded in a file (hereinafter, "clip information file") as clip information.

Furthermore, a stream obtained by multiplexing an OB stream (Overlay Bitmap stream) that is a graphic stream for displaying subtitles and/or an MB stream (Menu Bitmap stream) that is a stream of data (e.g., button image data) used to display a menu may be multiplexed with the clip AV stream.

One clip AV stream file and clip information file in which clip information corresponding to the clip AV stream file is recorded are regarded as an integrated object and the integrated object is referred to as a "clip". Namely, the clip is one object configured to include the clip AV stream and the clip information.

Generally, the file is regarded as a byte sequence. Contents of the clip AV stream file are expanded on a time axis, and an entry point in each clip is mainly designated on time basis. If an access point to access a predetermined clip is given as a time stamp, the clip information file can be used to search information on an address at which data reading starts in the clip AV stream file.

The PlayList layer will be described. The PlayList is configured to include a group of designation of one AV stream file to be reproduced, a reproduction start point ("IN point") and a reproduction end point ("OUT point") for designating a reproduction part of the designated AV stream file. Information on a pair of the IN point and the OUT point is referred to as "PlayItem". The PlayList is a group of PlayItems. To reproduce one of the PlayItems means to reproduce a part of the AV stream file referred to by the PlayItem. In other words, a corresponding interval of the clip is reproduced based on the information on the IN point and the OUT point included in the PlayItem.

The object layer will be described. Each of the MovieObjects includes a Navigation Command program and terminal information for cooperation with the other MovieObjects. The Navigation Command program is a command ("Navigation Command") for controlling reproduction of the PlayList.

The index layer will be described. The index layer includes the Index Table. The Index Table is a top-level table in which titles of the contents recorded in the recording medium are defined. A module manager in system software residing in a player controls reproduction of the data recorded in the recording medium based on information on the titles stored in the Index Table.

Figure 3:
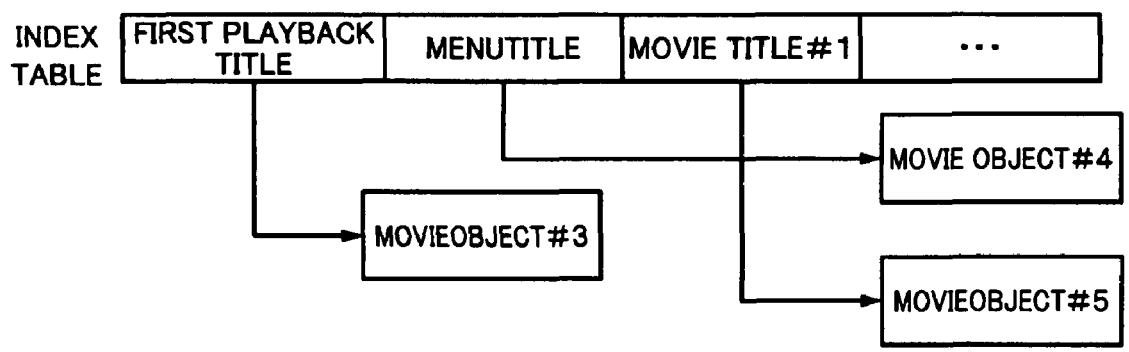
FIG. 3 is a schematic diagram for explaining an Index Table.

Namely, as schematically shown in FIG. 3, an arbitrary entry in the Index Table is referred to as "title", and a FirstPlaybackTitle, a MenuTitle, and MovieTitles #1, #2, etc., which are entries in the Index Table, are all titles. Each of the titles indicates a link to the MovieObjects.

To help understand the embodiments of the present invention, a read-only recording medium will be described by way of example. The FirstPlaybackTitle corresponds to an advertisement picture (i.e., a trailer) produced by a motion picture company and displayed prior to a main part of a movie if the contents stored in the recording medium are those of the movie. The MenuTitle corresponds to a menu screen for selecting one of a main-part reproduction, a chapter search, a subtitle or language setting, a special-picture reproduction and the like if the contents are those of the movie. Further, each of the MovieTitles corresponds to each picture selected by the MenuTitle. Alternatively, the MenuTitle may correspond to a menu screen that also includes the titles.

Figure 4:
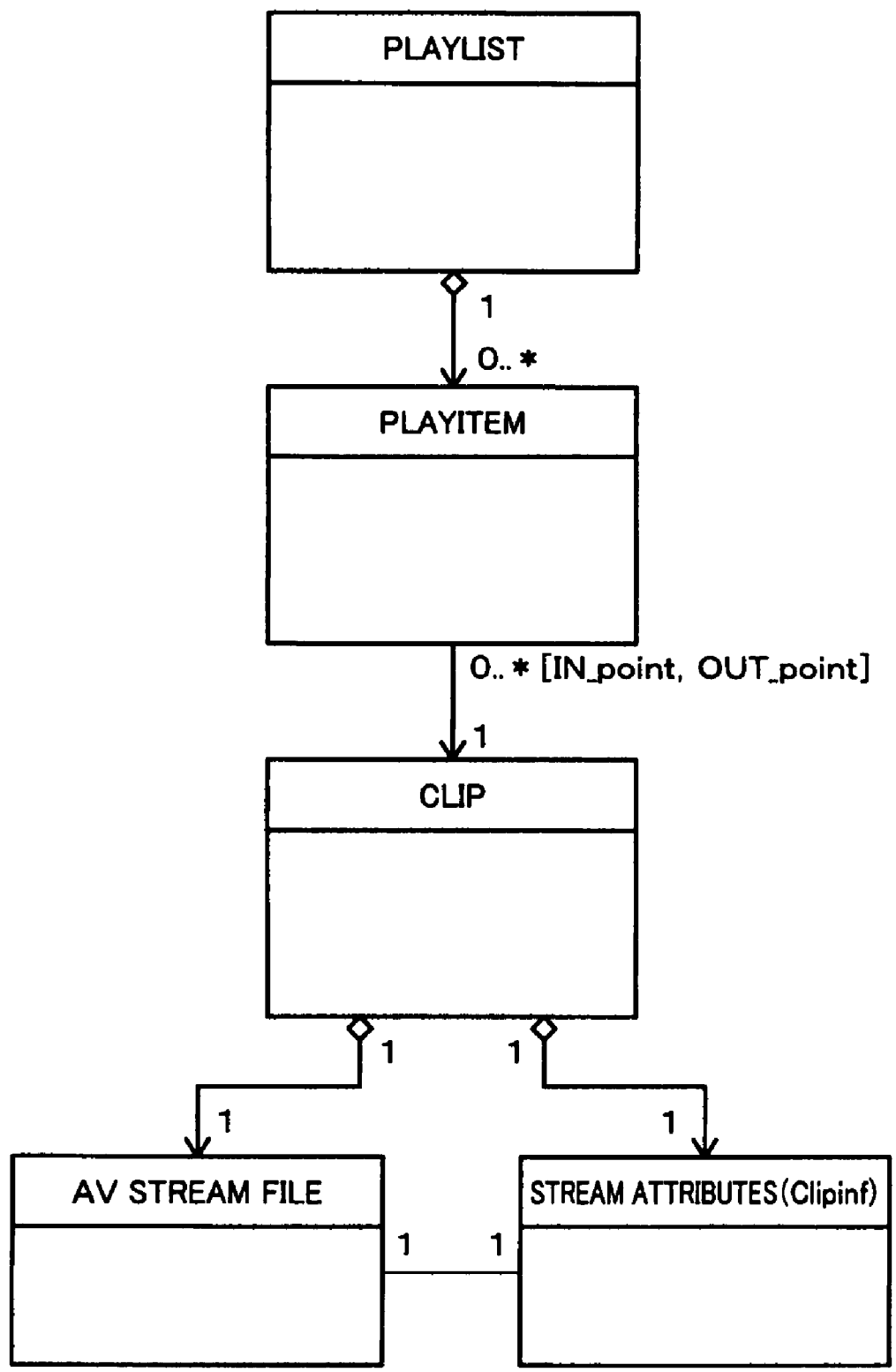
FIG. 4 is a UML diagram showing relationship among a clip AV stream, clip information, a clip, a PlayItem, and a PlayList.

FIG. 4 is a UML (unified Modeling Language) diagram showing the relationship among the clip AV stream, the clip information (Stream Attributes), the clip, the PlayItem, and the PlayList. The PlayList corresponds to one or a plurality of PlayItems, and one or a plurality of PlayItems correspond to one clip. A plurality of PlayItems having different start and/or end points can be assigned corresponding to one clip. One clip AV stream file is referred to by one clip. Likewise, one clip information file is referred to by one clip. Furthermore, the clip AV stream file and the clip information file have a one-to-one correspondence therebetween. By designating such a structure, a reproduction order for reproducing only a desired part of the AV stream can be designated nondestructively without changing the clip AV stream file.

Figure 5:
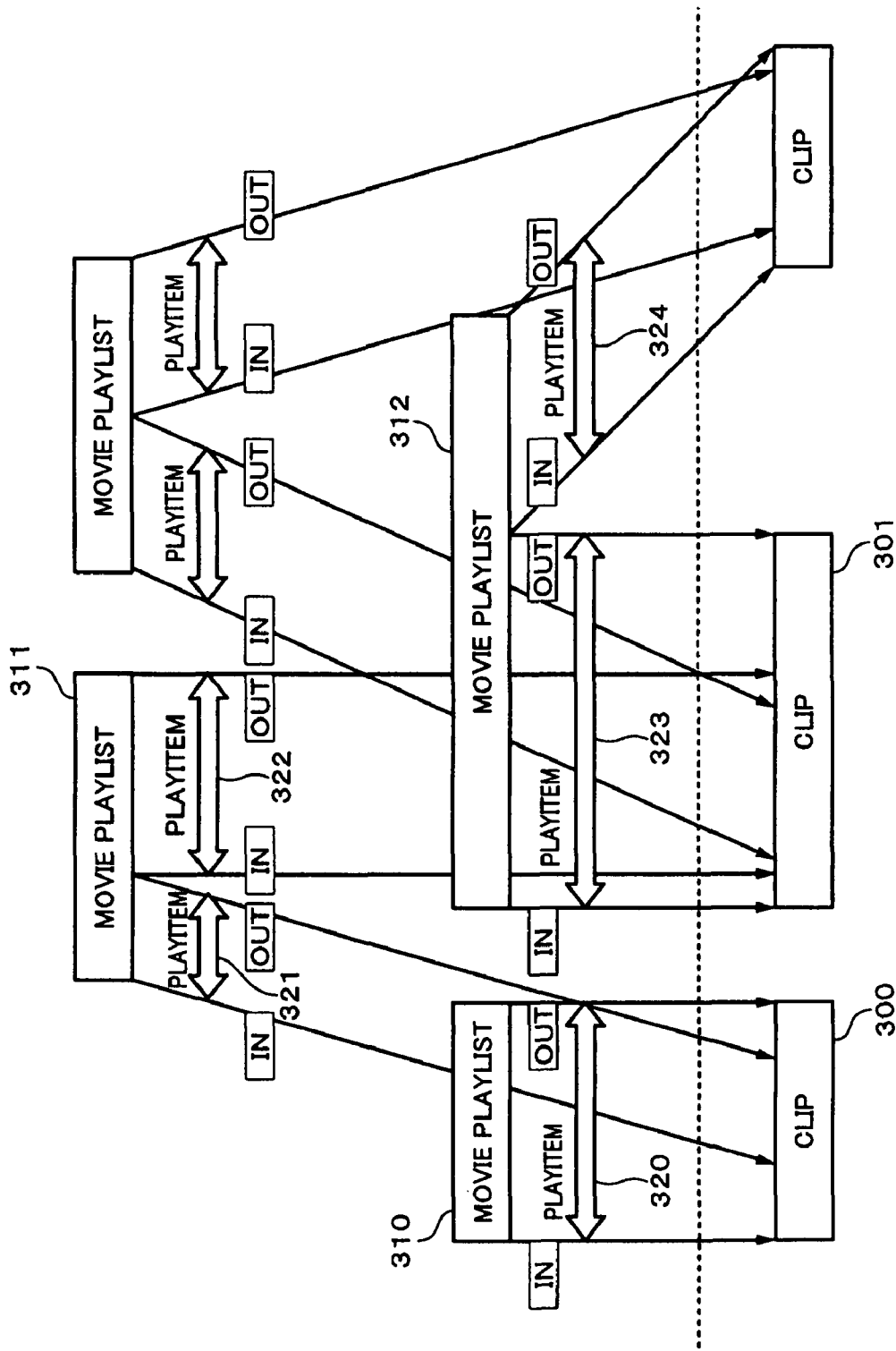
FIG. 5 is a schematic diagram for explaining a method of referring to the same clip by a plurality of lists.

Moreover, as shown in FIG. 5, the same clip can be referred to by a plurality of PlayLists. A plurality of clips can be designated by one PlayList. Each clip is referred to based on the information on the IN point and the OUT point included in the corresponding PlayItem in the PlayList. In the example of FIG. 5, a clip 300 is referred to by a PlayItem 320 in a PlayList 310, and an interval of the clip 300 is referred to by a PlayItem 321 out of PlayItems 321 and 322 constituting a PlayList 311 based on the information on the IN point and the OUT point included in the PlayItem 321. Likewise, an interval of a clip 301 is referred to by the PlayItem 322 in the PlayList 311 based on the information on the IN point and the OUT point included in the PlayItem 322. Furthermore, an interval of the clip 301 is referred to by a PlayItem 323 out of PlayItems 323 and 324 constituting a PlayList 312 based on the information on the IN point and the OUT point included in the PlayItem 323. In the example of FIG. 5, the clip 301 is further referred to by yet another PlayList.

A management structure of managing files recorded in the recording medium in the AVCHD format will next be described with reference to FIG. 6. The files are hierarchically managed in a directory structure. One directory (which is a root directory in the example of FIG. 6) is first generated on the recording medium. It is assumed that a range hierarchically lower than the root directory is a range managed by one recording/reproducing system.

A directory "BDMV" is arranged in a hierarchy lower than the root directory. Furthermore, a directory "AVCHDTN" is placed in the same lower hierarchy if it is necessary to do so In the directory "AVCHDTN", thumbnail files in which typical images of respective clips are reduced to predetermined sizes are stored, for example. In the directory "BDMV", the data structure already described with reference to FIG. 2 is stored.

Only two files of "index.bdmv" and "Movieobject.bdmv" can be placed in a hierarchy immediately below the directory "BDMV". Moreover, directories "PLAYLIST", "CLIPINF", "STREAM", and "BACKUP" are placed in the same lower hierarchy than the directory "BDMV" as that of the two files "index.bdmv" and "MovieObject.bdmv". The directory "BACKUP" stores therein backups of the respective directories and files.

Contents of the directory "IBDMV" are described in the file "index.bdmv". Namely, the file "index.bdmv" corresponds to the Index Table on the index layer that is the uppermost layer in the data structure. The file "MovieObject.bdmv" stores therein information on one or more MovieObjects. Namely, the file "MovieObject.bdmv" corresponds to the object layer in the data structure.

The directory "PLAYLIST" is one in which a PlayList database is placed. Namely, the directory "PLAYLIST" includes files "xxxxx.mpls" that are files on the respective PlayLists. Files "xxxxx.mpls" are created with respect to each PLAYLIST. In each file name, "xxxxx" before "." (period) is a five-digit number, and "mpls" after "." (period) is an extension fixed to every PlayList file.

The directory "CLIPINF" is one in which a clip database is arranged. Namely, the directory "CLIPINF" includes files "zzzzz.clpi" that are clip information files corresponding to the respective clip AV stream files. In each clip information file name, "zzzzz" before "." (period) is a five-digit number, and "clpi" after "." (period) is an extension fixed to this type of clip information file.

The directory "STREAM" is one in which AV stream files as entities are arranged. Namely, the directory "STREAM" includes clip AV stream files corresponding to the respective clip information files. Each of the clip AV stream files include a transport stream according to MPEG2 (Moving Pictures Expert Group 2) (hereinafter, abbreviated as "MPEG2 TS") and has a file name "zzzzz.m2ts". In each clip AV stream file name, "zzzzz" before "." (period) is made identical with that of the corresponding clip information file, thereby making it possible to facilitate grasping the correspondence between the clip information file and each clip AV stream file.

In the directory "AVCHDTN", two thumbnail files "thumbnail.tidx" and "thumbnail.tdt2" can be placed. In the thumbnail file "thumbnail.tidx", thumbnail images encrypted by a predetermined scheme are stored. In the thumbnail file "thumbnail.tdt2", unencrypted thumbnail images are stored. For example, a thumbnail image corresponding to a clip which a user photographed by a camera is a copy free one, is considered to be unnecessary to encrypt, and is, therefore, stored in the thumbnail file "thumbnail.tdt2".

Among the files shown in FIG. 6, those of close relevance to the embodiments of the present invention will now be described in more detail. The file "index.bdmv" arranged in the hierarchy immediately below the directory "BDMV" will be described. FIG. 7 is a schematic diagram showing a syntax that represents an exemplary structure of the file "index.bdmv". In FIG. 7, the syntax is shown based on a notation of C language employed as a program description language for computer apparatuses and the like. The same shall apply to the diagrams showing the other syntaxes.

Referring to FIG. 7, a field "TypeIndicator" has a data length of 32 bits and indicates that the file "index.bdmv" is the Index Table. A field "TypeIndicator2" has a data length of 32 bits and indicates a version of the file "index.bdmv". A field "IndexesStartAddress" has a data length of 32 bits and indicates a start address of a block "blkindexes( )" in the syntax.

A field "IndexsStartAddress" has a data length of 32 bits and indicates a start address of a block "blkExtensionData( )" in the syntax. The block "blkExtensionData( )" is a block in which predetermined extension data can be stored. The field "Indexs StartAdress" indicates the start address of the block "blkExtensionData( )" by the relative number of bytes from a first byte of the file "index.bdmv". The relative number of bytes starts at "0". If a value of this field "ExtensionDataStartAddress" is "0", this indicates that the block "blkExtensionData( )" is not present in the file "index.bdmv".

Subsequent to the field "ExtensionDataStartAddress", an area "reserved" having a data length of 192 bytes is arranged. The area "reserved" is one for byte alignment, future addition of fields or the like. The same shall apply hereafter. A block "blkAppInfoBDMV( )" is a one in which a content creator can describe desired information and which has no influence on player operation and the like.

A block "blkindexes( )" corresponds to a substantial content of the file "index.bdmv". Depending on the content described in the file "index.bdmv", the FirstPlaybackTitle to be reproduced when the disc is installed in the player and the title (MovieObject) called on a top menu are designated. One of the PlayLists to be described later is read based on the commands described in the MovieObject or the like called on the Index Table.

FIG. 8 is a schematic diagram of a syntax that represents an exemplary structure of the block "blkIndexes( )". A field "Length" has a data length of 32 bits and indicates a data length from just an end of this field "Length" to an end of the block "blkIndexes( )". Subsequently to the field "Length", blocks "FirstPlaybackTitle( )" and "MenuTitle( )" are arranged.

In the block "FirstPlaybackTitle( )", information on objects used for the FirstPlaybackTitle is described.

Specifically, a fixed value "1" is described subsequent to an area "reserved" having a data length of 1 bit in the block "FirstPlaybackTitle( )". Furthermore, a fixed value "1" is described via an area "reserved" having a data length of 31 bits in the block "FirstPlaybackTitle( )". A field "FirstPlaybackTitleMobjIDRef" having a data length of 16 bits is arranged via an area "reserved" having a data length of 14 bits. This field "FirstPlaybackTitleMobjIDRef" indicates an ID of each MovieObject used for the FirstPlaybackTitle.

The ID of each MovieObject is indicated by a value "mobj_id" used as a loop variable in a for-loop sentence of the MovieObject based on a syntax of the MovieObject to be described later with reference to FIGS. 9 and 10. In the example of FIG. 8, a value "mobj_id" corresponding to each MovieObject to be referred to is stored in the field "FirstPlaybackTitleMobjIDRef".

The field "FirstPlaybackTitleMobjIDRef" in the block "FirstPlaybackTitle( )" in the block "blkindexes( )" may either indicate MovieObjects of the top menu or a title.

In the block "MenuTitle( )", information on the objects used on the top menu is described. Specifically, a fixed value "1" is described subsequent to an area "reserved" having a data length of 1 bit in the block "MenuTitle( )". Furthermore, a fixed value "1" is described via an area "reserved" having a data length of 31 bits in the block "MenuTitle( )". A field "MenuTitleMobjIDRef" having a data length of 16 bits is arranged via an area "reserved" having a data length of 14 bits. This field "MenuTitleMobjIDRef" indicates an ID of each MovieObject used for the MenuTitle.

A field "NumberofTitles" subsequent to the block "MenuTitle( )" has a data length of 16 bits and indicates the number of titles selectable and playable by the user.

According to a subsequent for-loop sentence, a block "MovieTitle[title_id]( )" is described using a value "title_id" as a factor by the number of times indicated by the field "NumberOfTitles". In the "MovieTitle[title_id]", information on each title is described. The value "title_id" is a numeric value from "0" to the value indicated by the field "NumberOfTitles" and used to identify each title.

In the block "MovieTitle[title_id]( )", a fixed value "1" is described via an area "reserved" having a data length of 1 bit and a field "MovieTitleMobjIDRef" is described via an area "reserved" having a data length of 46 bits. The field "MovieTitleMobjIDRef" has a data length of 16 bits and indicates an ID of each MovieObject used for each title. Subsequent to the field "MovieTitleMobjIDRef", an area "reserved" having a data length of 32 bit is arranged.

FIG. 9 is a schematic diagram of a syntax showing an exemplary structure of the file "Movieobject.bdmv" arranged in the hierarchy immediately below the directory "BDMV". A field "TypeIndicator" has a data length of 32 bits (4 bytes) and indicates that the file is "Movieobject.bdmv". A character string including four characters encoded by a coding method specified in ISO (International Organization for Standardization) 646 is described in the field "TypeIndicator". In the example of FIG. 9, a four-character string "MOBJ" encoded by the coding method specified in the ISO646 is described in the field "TypeIndicator" and indicates that the file is "MovieObject.bdmv".

A field "TypeIndicator2" has a data length of 32 bits (4 bytes) and indicates a version number of the file "MovieObject.bdmv". A four-character string "0100" encoded by the coding method specified in the ISO646 is typically described in the field "TypeIndicator2" of the file "MovieObject.bdmv".

A field "ExtensionDataStartAddress" has a data length of 32 bits and indicates a start address of a block "blkExtensionData( )" in the syntax. The field "ExtensionDataStartAddress" indicates the start address of the block "blkExtensionData( )" by the relative number of bytes from a first byte of the file "Movieobject.bdmv". The relative number of bytes starts at "0%". If a value of this field "ExtensionDataStartAddress"

is "0", this indicates that the block "blkExtensionData( )" is not present in the file "Movieobject.bdmv".

In the syntax shown in FIG. 9, each field "padding_word" has a data length of 16 bits and the field "padding_word" is inserted by the number of times indicated by a value N1 or N2 in a for-loop sentence according to the syntax of the file "MovieObject.bdmv". The value N1 or N2 is either "0" or an arbitrary positive integer. Further, a desired value may be used for each field "padding_word".

Subsequent to the field "ExtensionDataStartAddress", an area "reserved" having a data length of 224 bits is arranged, and a block "blkMovieObjects( )" that is a main body of the file "MovieObject.bdmv" is stored.

FIG. 10 is a schematic diagram of a syntax that represents an exemplary structure of the block "blkMovieObjects( )". A field "Length" has a data length of 32 bits and indicates a data length from just the end of the field "Length" to an end of the block "blkMovieObjecs( )". A field "NumberofMobjs" is arranged via an area "reserved" having a data length of 32 bits. The field "NumberOfMobjs" indicates the number of MovieObjects stored according to a for-loop sentence immediately after the field "NumberOfMobjs". A value "mobj_id" used as a loop variable of the for-loop sentence uniquely identifies each MovieObject. The value "mobj_id" is a value starting at "0" and the MovieObject identified by the value "mobj_id" is defined by an order described in the for-loop sentence.

A fixed value "1" is described in a block "TerminalInfo( )" in the for-loop sentence and an area "reserved" having a data length of 15 bits is arranged subsequently. Subsequently to the area "reserved", a field "NumberOfNavigationCommands[mobj_id]" having a data length of 16 bits is arranged. The field "NumberOfNavigationCommands[mobj_id]" indicates the number of Navigation Commands included in the MovieObject ("MovieObject[mobj_id]") indicated by the value "mobj_id".

By a subsequent for-loop sentence having a value "command_id" used as a loop variable, Navigation Commands are described by the number indicated by the field "NumberOfNavigationCommands[mobj_id]". Namely, the field "NumberOfNavigationCommands[mobj_id]" stores therein the Navigation Commands in sequence each indicated by the value "command_id" included in the block "MovieObject [mobj_id]( )" indicated by the value "mobj_id". The value "command_id" is a value starting at "0" and the Navigation Commands are defined in an order described in the for-loop sentence.

Figure 6:
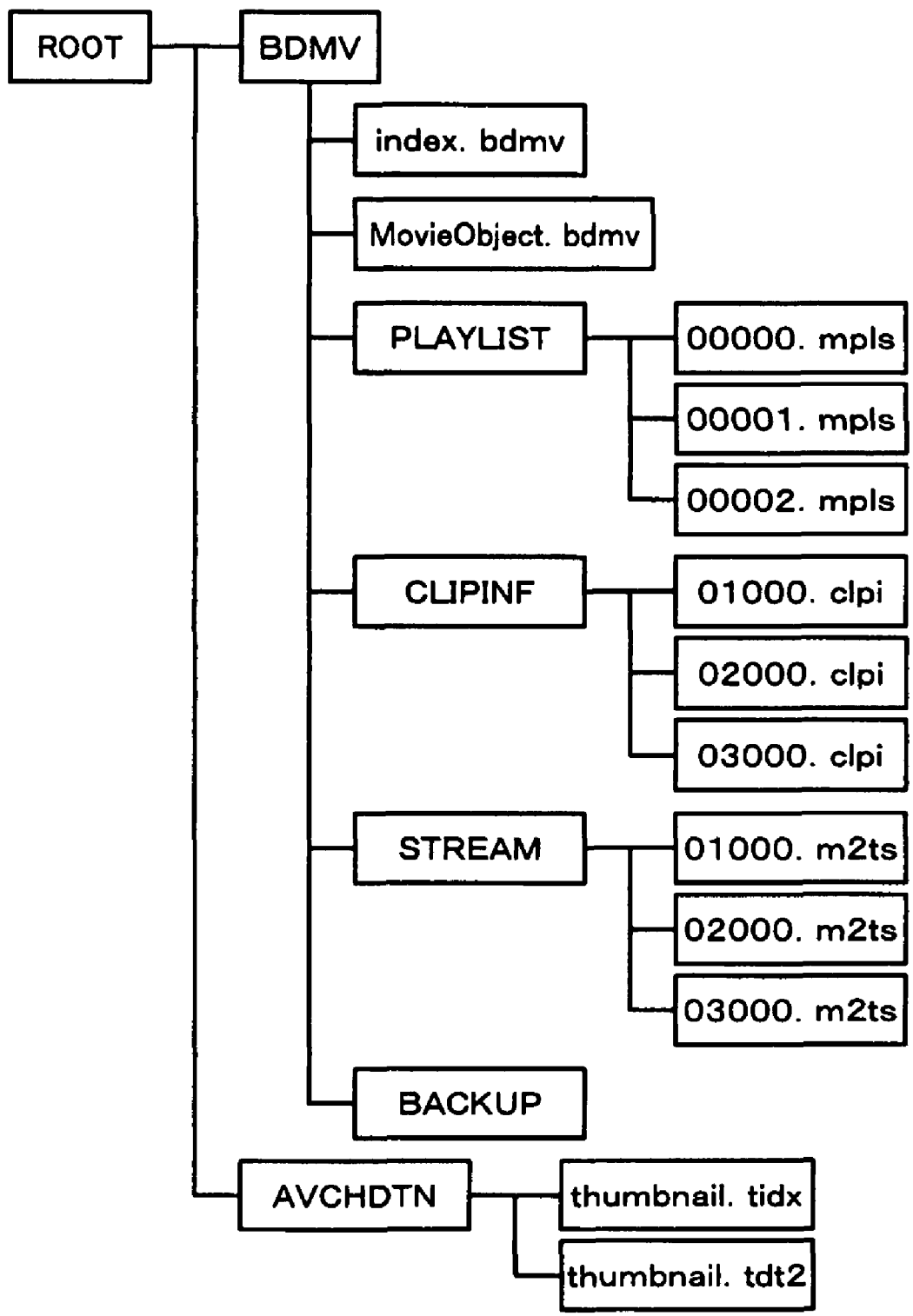
FIG. 6 is a schematic diagram for explaining a file management structure for managing files recorded in a recording medium.

FIG. 11 is a schematic diagram of a syntax that represents an exemplary structure of the PlayList file "xxxxx.mpls" shown in FIG. 6. A field "TypeIndicator" has a data length of 32 bits (4 bytes) and indicates that the file "xxxxx.mpls" is the PlayList file. A field "TypeIndicator2" has a data length of 32 bits (4 bytes) and indicates a version of the PlayList file "xxxxx.mpls". A field "PlayListStartAddress" has a data length of 32 bits and indicates a start address of a block "blkPlayList( )" in the syntax.

A field "PlayListMarkStartAddress" has a data length of 32 bits and indicates a start address of a block "blkPlayListMark( )" in the syntax. A field "ExtensionDataStartAddress" has a data length of 32 bits and indicates a start address of a block "blkExtensionData( )" in the syntax. A value of the field "ExtensionDataStartAddress" indicates a start address of the block "blkExtensionData( )" by the relative number of bytes from a first byte of the file "xxxxx.mpls". The relative number of bytes starts at "0". If the value of this field "ExtensionDataStartAddress" is "0", this indicates that the block "blkExtensionData( )" is not present in the file "xxxxx.mpls".

A block "blkAppInfoPlayList( )" is arranged via an area "reserved" having a data length of 160 bits. In the block "blkAppInfoPlayList( )", information on a type of a PlayList described in a next block "blkPlayList( )", reproduction restrictions and the like are described. The PlayList is described in the block "blkPlayList( )". Jumping destination points by chapter jump or the like are described in a block "blockPlayListMark( )". The block "blkExtensionData( )" is one in which predetermined extension data can be stored.

FIG. 12 is a schematic diagram of a syntax that represents an exemplary structure of the block "blkPlayList( )" shown in FIG. 11. A field "Length" has a data length of 32 bits and indicates a data length from just an end of the field "Length" to an end of the block "blkPlayList( )". Subsequently to the field "Length", an area "reserved" having a data length of 16 bits is arranged and a field "NumberofPlayItems" is arranged subsequently to the area "reserved". The field "NumberOfPlayItems" has a data length of 16 bits and indicates the number of PlayItems included in the block "blckPlayList( )". A field "NumberOfSubPath" indicates the number of sub-paths included in the block "blckPlayList( )".

A block "blkPlayItem( )", in which PlayItems by the number indicated by the field "NumberOfPlayItems" are described, is described according to a subsequent for-loop sentence. The number, i.e., count based on the for-loop sentence corresponds to an identifier "PlayItem_id" of the block "blkPlayItem( )". Furthermore, a block "blkSubPath( )" is described by the number indicated by the field "NumberOfSubPath" according to a subsequent for-loop sentence. The number, i.e., count based on the for-loop sentence corresponds to an identifier "SubPath_id" of the block "blkSubPath ( )".

It is to be noted that sub-paths can be arranged to correspond to sub-PlayItems for each of main paths corresponding to respective PlayItems that are mainly reproduced. The sub-path is used to designate a sub-picture to be reproduced synchronously with a clip designated by each PlayItem when the two pictures are combined with each other.

FIG. 13 is a schematic diagram of a syntax that represents an exemplary structure of the block "blkPlayItem( )". A field "Length" has a data length of 16 bits and indicates a data length from just an end of the field "Length" to an end of the block "blkPlayItem( )".

A field "ClipInformationFileName" has a data length of 40 bits (5 bytes) and indicates a file name of a clip information file referred to by the block "blkPlayItem( )". In this block "blkPlayItem( )", the clip information file in the file name indicated by the field "ClipInformationFileName" is read. A field "ClipCodeIentifier" has a data length of 32 bits (4 bytes) and indicates a codec method for the clip AV stream used in each PlayItem indicated by the block "blkPlayItem( )".

A field "ConnectionCondition" is arranged via an area "reserved" having a data length of 12 bits. The field "ConnectionCondition" has a data length of 4 bits and indicates information on a state of connection between clips.

A value of the field "ConnectionCondition" used for a recording-specific recording medium is "1", "5" or "6". If the field "ConnectionCondition" has the value "1", this indicates that the clip referred to by the PlayItem has no seamless connection to a clip referred to by a closest past PlayItem. If the field "ConnectionCondition" has the value "5" or "6", this indicates that the clip referred to by the PlayItem has seamless connection to the clip referred to by the closest past PlayItem. The "seamless connection" means that inter-clip reproduction control is performed so as to reproduce a clip and a next clip at continuous frame timings.

If the field "ConnectionCondition" has the value "5", a recording length of audio data is set larger than that of video data in the clip referred to by the PlayItem (see FIG. 14A). By so setting, when the two clips are connected to each other, the audio data can be subjected to a fadeout processing. For example, if clips are closed by user's recording stop operation, the value of the field "ConnectionCondition" is set to "5". The clip connection method indicated by the value "5" of the field "ConnectionCondition" will be referred to as "first seamless connection" below.

If the field "ConnectionCondition" has the value "6", the recording length of the audio data is set equal to that of the video data in the clip referred to by the PlayItem (see FIG. 14B). By so setting, clips can be connected seamlessly. For example, if clips are closed for a reason other than the user's recording stop operation, e.g., for a system-related reason, the value of the field "ConnectionCondition" is set to "6". The clip connection method indicated by the value "6" of the field "ConnectionCondition" will be referred to as "second seamless connection" below.

A field "RefToSTCID" has a data length of 8 bits and indicates information on a discontinuity of a system time base (STC). Fields "INTime" and "OUTTime" have data length of 32 bits, respectively and indicate a reproduction range of a main clip AV stream. The field "INTime" indicates a start point (IN point) and the field "OUTTime" indicates an end point (OUT point).

A block "blkUOMaskTable( )" is a table in which user-input acceptance restrictions are set. A flag "PlayItemRandomAccessFlag" having a data length of 1 bit is one for defining whether to permit a random access to the PlayItem indicated by the block "blkPlayItem( )".

Subsequently, a field "StillMode" is arranged via an area "reserved" having a data length of 7 bits. The field "StillMode" has a data length of 8 bits and indicates whether to display a last-displayed picture as a still picture in the PlayItem indicated by the block "blkPlayItem( )". If the field "StillMode" has a value "0x01" (binary), still time is indicated by a field "StillTime" having a data length of 16 bits according to an If-sentence. If the field "StillMode" has a value other than "0x01", the field having the data length of 16 bits is used as an area "reserved".

A numerical notation "0x" indicates that the numeric value is given in hexadecimal. The same shall apply to similar notations to be described later.

A block "blkSTNTable( )" is a table in which attributes and a PID number of the clip AV stream managed by the block item indicated by the block "blkPlayItem( )" as well as a recording position of the clip AV stream on the recording medium and the like are managed.

FIG. 15 is a schematic diagram of a syntax that represents an exemplary structure of the block "blkplayListMark( )". A field "Length" has a data length of 32 bits and indicates a data length from just an end of the field "Length" to an end of the block "blkPlayListMark( )".

A field "NumberofPlayListMarks" has a data length of 16 bits and indicates the number of PlayListMarks included in the block "blkPlayListMark( )". According to a subsequent for-loop sentence, information on PlayListMarks by the number indicated by the field "NumberofPlayListMarks" is described.

In the for-loop sentence, a field "MarkType" is arranged subsequently to an area "reserved" having a data length of 8 bits. The field "MarkType" has a data length of 8 bits and indicates a mark type. Each PlayListMark is defined as one of two types, i.e., an entry mark and a link point. The field "MarkType" indicates which of the types each PlayListMark is. The entry mark is used for defining a chapter. The link point will not be described herein because of less relevance to the embodiments of the present invention. The field "NumberofPlayListMarks" indicates a sum of entry marks and link points.

A field "RefToPlayItemID" has a data length of 16 bits and identification information "PlayItem_id" used to refer to a PlayItem at which a mark is given is described therein. A field "MarkTimeStamp" has a data length of 32 bits and a time stamp indicating a point at which a mark is given is described in the field "MarkTimeStamp". A field "EntryESPID" has a data length of 16 bits and indicates a PID value of a TS packet including an elementary stream indicated by a mark. A field "Duration" has a data length of 32 bits and is an unsigned integer measured at intervals of 45 kHz clocks. If a value stored in the field "Duration" is "0", the field "Duration" has no significance.

FIG. 16 is a schematic diagram of a syntax that represents an exemplary structure of the clip information file. A field "TypeIndicator" has a data length of 32 bits (4 bytes) and indicates that the file is the clip information file. A field "TypeIndicator2" has a data length of 32 bits (4 bytes) and indicates a version of the clip information file.

The clip information file includes blocks "blkClipInfo( )", "blkSequenceInfo( )", "blkProgramInfo( )", "blkCPI( )", "blkClipMark( )", and "blkExtensionData( )". Fields "SequenceInfoStartAddress", "ProgramInfoStartAddress", "CPIStartAddress", "ClipMarkStartAddress", and "ExtensionDataStartAddress" have data lengths of 32 bits and indicate start addresses of corresponding blocks, respectively.

The field "ExtensionDataStartAddress" indicates a start address of the block "blkExtensionData( )" by the relative number from a first byte of the clip information file. The relative number of bytes starts at "0". If the field "ExtensionDataStartAddress" has a value "0", this indicates that the block "blkExtensionData( )" is not present in the file "indx.bdmv".

The block "blkClipInfo( )" starts subsequently to an area "reserved" subsequent to the fields which indicate the start address and having a data length of 96 bits.

Information on the clip AV stream managed by the clip information file is described in the block "blkClipInfo( )". Information for managing sequences in which STC and ATC (arrival time base) are continuous as an integrated sequence is described in the block "blkSquenceInfo( )". Information on a coding method for the clip AV stream managed by the clip information file, an aspect ratio of the video data in the clip AV stream and the like is described in the block "blkProgramInfo( )". Information on characteristic point information ("CPI") representing characteristic parts of the AV stream such as a random access start point is stored in the block "blkCPI( )".

Moreover, index points (jump points) such as a chapter position for cue reproduction allocated to each clip are described in the block "blckClipMark( )". The block "blkExtensionData( )" is an area in which extension data can be stored. Because the blocks "blkClipMark( )" and "blkSequenceInfo( )" in the clip information file are less relevant to the embodiments of the present invention, they will not be described in detail herein.

FIG. 17 is a schematic diagram of a syntax that represents an exemplary structure of the block "blkCPI( )" in the clip information file. In a coded stream, e.g., MPEG stream, that has been subjected to interframe-compression, parts at which decoding can start are often limited to a part of parts such as a top of each GOP. The CPI is a database in which information on positions of start points at which decoding can start is collected, and is in the form of a table in which play time and an in-file address are made to correspond to each other. Namely, the CPI is a database in which information indicating a start point of each decoding target unit is recorded in the form of table.

By thus defining the database, if the stream is to be reproduced, for example, from a desired time, the in-file address of a reproduction position can be recognized by referring to the CPI based on the play time. Because the in-file address indicates a top of each decoding target unit, the user can read and decode data at the address and promptly display pictures using the player.

The top position of each decoding unit (which is the top position of each GOP) stored in the CPI will be referred to as "EP (Entry Point)".

In FIG. 17, a field "Length" has a data length of 32 bits and indicates a data length from just an end of the field "Length" to an end of the block "blkCPI( )". According to a subsequent If-sentence, if a value of the field "Length" is not "0", a field "CPIType" is arranged via an area "reserved" having a data length of 12 bit. The field "CPIType" has a data length of 4 bits and indicates a type of the CPI. A subsequent block blkEPMap( ) stores therein a table in which a PTS value is made to correspond to a byte address in the corresponding clip AV stream file.

FIG. 18 is a schematic diagram of a syntax that represents an exemplary structure of the block "blkEPMap( )". A field "NumberOfStreamPIDEntries" is arranged via an area "reserved" having a data length of 8 bits. The field "NumberOfStreamPIDEntries" has a data length of 8 bits and indicates the number of entries to a block "blkEPMapForOnStreamPID" in the block "blkEPMap( )". According to a subsequent for-loop sentence, information on entry points by the number indicated by the field "NumberOfStreamPIDEntries" with a value [k] used as a loop variable is described.

In the for-loop sentence, a field "StreamPID[k]" has a data length of 16 bits and indicates a PID value of a transport packet that transports an elementary stream referred to by a block "blkEPMapForOneStreamPID that is a [k]$^{th}$ entry to the block "blkEPMap( )" (hereinafter, described as "[k]$^{th}$ block "blkEPMapForOneStreamPID").

A field "EPStreamType[k]" is arranged via an area "reserved" having a data length of 10 bits. The field "EPStreamType[k]" has a data length of 4 bits and indicates a type of the elementary stream referred to by the [k]$^{th}$ block "blkEPMapForOneSteamPID". A field "NumberOfEPCoarseEntries[k]" has a data length of 16 bits and indicates the number of entries to an EP coarse table included in the [k]$^{th}$ block "blkEPMapForOneStreamPID". A field "NumberOfEPFineEntries[k] has a data length of 18 bits and indicates the number of entries to an EP fine table included in the [k]$^{th}$ block "blkEPMapForOneStreamPID". A field "EPMapForOneStreamPIDStart Address[k]" has a data length of 32 bits and indicates a relative byte position at which the [k]$^{th}$ block "blkEPMapForOneStreamPID" starts in the block "blkEPMap( )". The value of the field "EPMapForOneStreamPIDStartAddress[k]" is indicated by the number of bytes from a first byte of the block "blkEPMap( )".

After description of the for-loop sentence, blocks "blkEPMapForOneStreaPID(EPStreamType[k], NumberOfEPCoarseEntris[k], NumberOfEPFineEntries[k])" are stored by the number indicated by the field "NumberOfStreamPIDEntries" with the value[k] used as a loop variable according to for-loop sentences described across a field "padding_word" having a data length of an integer multiple of 16 bits. Namely, an argument "NumberOfEPCoarseEntries[k]" indicates the number of entries "PTSEPCoarse" and "SPNEPCoarse" stored in a sub-table ("EP coarse table"). Likewise, an argument "NumberOfEPFineEntries[k]" indicates the number of entries "PTSEPFine" and "SPNEPFine" stored in a sub-table ("EP fine table"). The arguments "NumberOfEPCoarseEntries[k]" and "NumberOfEPFineEntries[k]" will be appropriately referred to as "entry number Nc" and "entry number Nf" below, respectively.

FIG. 19 is a schematic diagram of a syntax that represents an exemplary structure of the block "blkEPMapForOneStreamPID(EP_stream_type, Nc, Nf). To describe semantics of the block "blkEPMapForOneStreamPID(EP_stream_type, Nc, Nf), meanings of entries "PTSEPStart" and "SPNEPStart" that are entries based on which data are stored in the block "blkEPMapForOneStreamPID (EP_stream-type, Nc, Nf) will first be described.

The entry "PTSEPStart" and the entry "SPNEPStart" associated with the entry "PTSEPStart" indicate entry points on the AV stream, respectively. Furthermore, the entry "PTSEPFine" and the entry "PTSEPCoarse" associated with the entry "PTSEPFine" are deduced from the same entry "PTSEPStart". The entry "SPNEPFine" and the entry "SPNEPCoarse" associated with the entry "SPNEPFine" are deduced from the same entry "SPNEPStart".

Figure 20:
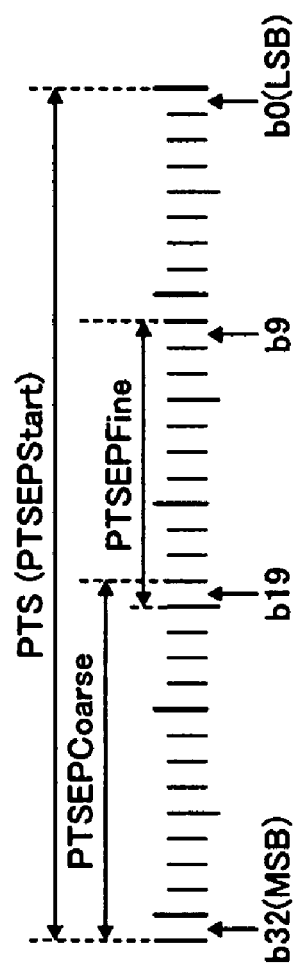
FIG. 20 is a schematic diagram of ex exemplary format of entries "PTSECoarse" and "PTSEPFine"

FIG. 20 shows an exemplary format of the entries "PTSEPCoarse" and "PTSEPFine". The PTS, i.e., entry "PTSEPStart" has a data length of 33 bits. If an MSB is the 32$^{nd}$ bit and an LSB is the 0$^{th}$ bit, 14 bits from the 32$^{nd}$ bit to a 19$^{th}$ bit of the entry "PTSEPStart" are used for the entry "PTSEPCoarse" for coarse search. The entry "PTSEPCoarse" enables searching the AV stream file at a resolution of 5.8 seconds in a wraparound of up to 26.5 hours. Moreover, 11 bits from the 19$^{th}$ bit to the 9$^{th}$ bit of the entry "PTSEPStart" are used for the entry "PTSEPFine" for fine search. The entry "PTSEPFine" enables searching the AV stream file at a resolution of 5.7 seconds in a wraparound of up to 11.5 seconds. The 19$^{th}$ bit is used to be common to the entries "PTSEPCoarse" and "PTSEPFine". Further, 9 bits from the 0$^{th}$ bit to the 8$^{th}$ bit from the LSB are not used for the entries "PTSEPCoarse" and "PTSEPFine".

Figure 21:
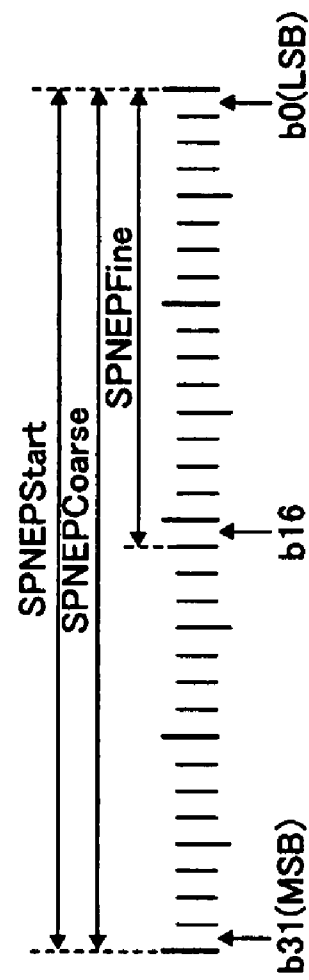
FIG. 21 is a schematic diagram of an exemplary format of entries "SPNEPCoarse" and "SPNEPFine"

FIG. 21 shows an exemplary format of the entries "SPNEPCoarse" and "SPNEPFine". A source packet number, i.e., the entry "SPNEPStart" has a data length of 32 bits. If an MSB is the 31$^{st}$ bit and the LSB is 0$^{th}$ bit, all bits from the 31$^{st}$ bit to the 0$^{th}$ bit of the entry "SPNEPStart" are used for the entry "SPNEPCoarse" for coarse search in the example of FIG. 21. Moreover, 17 bits from the 16$^{th}$ bit to the 0$^{th}$ bit of the entry "SPNEPStart" are used for the entry "SPNEPFine" for fine search. The entry "SPNEPFine" enables searching the AV stream file in a wraparound of up to about 25 MB (Mega bytes).

Even in case of the source packet, the predetermined number of MSB-side bits may be used for the entry "SPNEPCoarse". For example, 17 bits from the 31$^{st}$ bit to the 16$^{th}$ bit of the entry "SPNEPStart" are used for the entry "SPNEPCoarse" and 17 bits from the 16$^{th}$ bit to the 0$^{th}$ bit of the entry "SPNEPStart" are used for the entry "SPNEPFine".

The entries "PTSEPStart" and "SPNEPStart" are defined as follows based on the above.

The entry "PTSEPStart" is an unsigned integer having a data length of 33 bits as shown in FIG. 20, and indicates the PTS having the data length of 33 bits in a video access unit starting at a randomly accessible picture (e.g., an IDR (Instantaneous Decoding Refresh) picture or an I (Intra-coded) picture)) in the AV stream.

The entry "SPNEPStart" is, as shown in FIG. 21, an unsigned integer having a data length of 32 bits and indicates an address, in the AV stream, of a source packet including a first byte of a video access unit associated with the entry "PTSEPStart". The entry "SPNEPStart" is represented in units of source packet numbers, and counted as a value incremented by one for every source packet from a first source packet in the AV stream file with a value "0" used as an initial value.

Referring to FIG. 19, in the block "blkEPMapForOneStreamPID(EP_stream_type, Nc, Nf), the sub-table ("EP coarse table") for coarse search is described by a first for-loop sentence, and the sub-table ("EP fine table") for fine search is described by a second for-loop sentence.

A field "EPFineTableStartAddress" is arranged immediately before the first for-loop sentence. The field "EPFineTableStartAddress" has a data length of 32 bits and indicates a start address of a first byte of a field "ReservedEPFine [EP_fine_id] in the second for-loop sentence by the relative number of bytes from a first byte of the block "blkEPMapForOneStreamPID(EP_stream_type, Nc, Nf). The relative number of bytes starts at "0".

The first for-loop sentence is repeated by the number of entries Nc to the sub-table ("EP coarse table") using a loop variable [i]. A field "RefToEPFineID[i]", an entry "PTSEPCoarse[i]", and an entry "RefToEPFine[i]" are stored each by the number of entries Nc. In the first for-loop sentence, the field "RefToEPFineID[i]" has a data length of 18 bits and indicates an entry number in the sub-table ("EP fine table") having an entry "PTSEPFine" associated with an entry "PTSEPCoarse" indicated by a field "PTSEPCoarse[i]" subsequent to the field "PTSEPFineID[i]". The entry "PTSEPCoarse" and the entry "PTSEPCoarse" associated with the entry "PTSEPCoarse" are deduced from the same entry "PTSEPStart". The field "RefToEPFineID[i]" is given by a value of a loop variable [EP_fine_id] defined in an order described in the second for-loop sentence.

The second for-loop sentence is described after the first for-sentence across a field "padding_word". The second for-loop sentence is repeated by the number of entries Nf of the sub-table ("EP fine table") using the loop variable [EP_fine_id]. A field "ReservedEPFine[EP_fine_id]" having a data length of 1 bit, a field "IEndPositionOffset[EP_fine_id]" having a data length of 3 bits, a field "PTSEPFine[EP_fine_id]" having a data length of 11 bits, and a field "SPNEPFine [EP_fine_id]" having a data length of 17 bits are stored each by the number of entries Nf. Among these fields, the fields "PTSEPFine[EP_fine_id]" and "SPNEPFine[EP_fine_id]" are stored as entries "PTSEPFine" and "SPNEPFine", respectively referred to by the table ("EP Fine table") based on the loop variable [EP_fine_id].

The entries "PTSEPCoarse", "PTSEPFine", "SPNEP Coarse", and "SPNEPFine" are deduced as follows. It is assumed that Nf entries are arranged in an ascending order of a value of each related data "SPNEPStart" in the sub-table ("EP fine table"). Each entry "PTSEPFine" is deduced from the corresponding entry "PTSEPStart" as expressed by the following Equation (1).

$$PTSEPFine[EP\_fine\_id] = (PTSEPStart[EP\_fine\_id]) >> 9)/2^{11} \quad (1)$$

The relationship between the entry "PTSEPCoarse" and the corresponding entry "PTSEPFine" is expressed by the following Equations (2) and (3).

$$PTSEPCoarse[i] = (PTSEPStart[RefToEPFineID[i]] >> 19)/2^{14} \quad (2)$$

$$PTSEPFine[RefToEPFineID[i]] = (PTSEPStart[RefToEPFineID[i]] >> 9)/2^{11} \quad (3)$$

Each entry "SPNEPFine" is deduced from the corresponding entry "SPNEPStart" as expressed by the following Equation (4)

$$SPNEPFine[EP\_fine\_id] = SPNEPStart[EP\_fine\_id]/2^{17} \quad (4)$$

The relationship between the entry "SPNEPCoarse" and the corresponding entry "SPNEPFine" is expressed by the following Equations (5) and (6).

$$SPNEPCoarse[i] = SPNEPStart[RefToEPFineID[i]] \quad (5)$$

$$SPNEPFine[RefToEPFineID[i]] = SPNEPStart[RefToEPFineID[i]]/2^{17} \quad (6)$$

In the Equations (1) to (6), symbol ">>x" signifies use of bits from a digit exceeding x bits from the LSB side of the data.

One embodiment of the present invention will now be described. According to the embodiment of the present invention, if a PlayListMark is to be assigned to the PlayList and division and editing of clips are performed, the PlayListMark is assigned to a boundary of address information, i.e., a GOP boundary if a GOP corresponding to a position where the PlayListMark is to be assigned is a closed GOP, and to a position indicated by reproduction time information, i.e., the entry "PTSEPStart" (see FIG. 21) if the GOP is an open GOP.

Generally, a recording start position, for example, has a closed GOP structure because it is difficult to use information on previous GOPs for the recording start position. Due to this, at the recording start position, a PlayListMark is assigned to a GOP boundary. At positions other than the recording start position, each PlayListMark is assigned to a position indicated by the entry "PTSEPStart". Furthermore, even at the positions other than the recording start position, it is possible to determine whether a GOP corresponding to the position where each PlayListMark is to be assigned is the closed GOP or the open GOP, each PlayListMark is assigned to either the GOP boundary or the position indicated by the entry "PSEPStart" depending on a determination result.

By so controlling, a decoding range of a jumping destination can be minimized during chapter jumping and the chapter boundary can be set coincident with an original recording start position.

It is assumed in the embodiment of the present invention that PlayListMarks for designating chapter division positions are all entry marks.

The chapter division according to the embodiment of the present invention will be described in more detail. It is assumed herein that the type of the PlayListMark lists is fixed to the entry mark.

First, a chapter is a minimum reproduction interval unit visible to the user and indicates an interval between adjacent PlayListMarks. It is also assumed that a PlayListMark may not be assigned to an end position of each PlayList. Moreover, a PlayListMark is typically assigned to a top position of each PlayList.

Furthermore, it is assumed in the embodiment of the present invention that a temporal granularity for division and editing is a GOP. Moreover, it is assumed that the GOPs other than that including the recording start position are open GOPs. This is intended to realize higher image quality.

Figure 22:
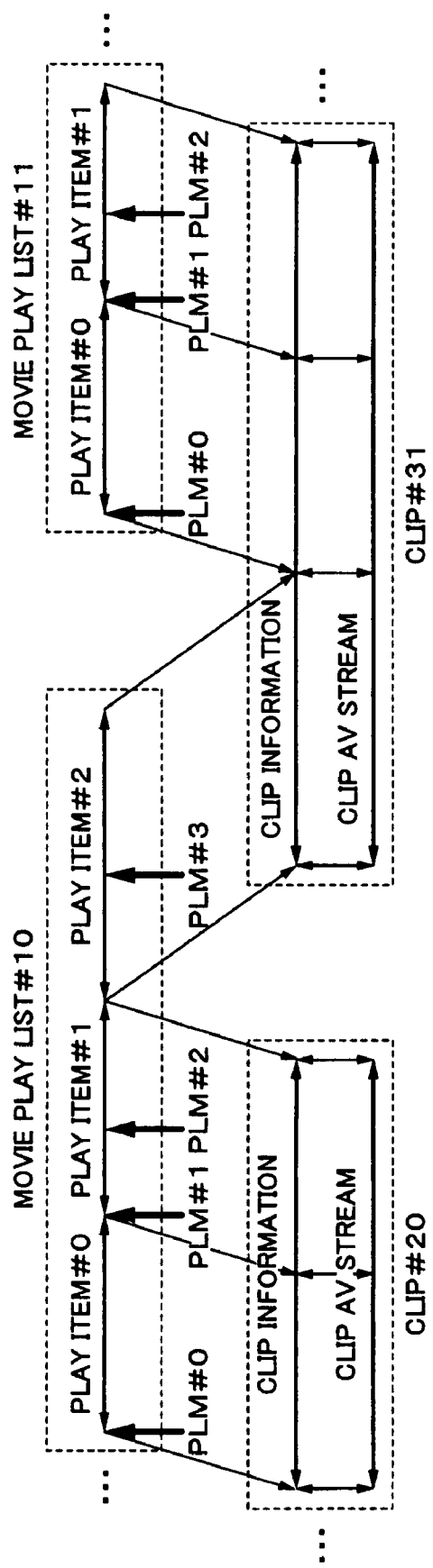
FIG. 22 is a schematic diagram showing an exemplary file structure of PlayLists and lower hierarchies.

A processing for inserting PlayListMarks into each PlayList will first be described. FIG. 22 shows an exemplary file structure of PlayLists and their lower hierarchies in the format applicable to the embodiments of the present invention. In the example of FIG. 22, a PlayList #10 includes three PlayItems #0, #1, and #2 each referred to based on a value "PlayItem_id" (see FIG. 12). The PlayItems #0 and #1 refer to intervals of a clip #20, respectively, and the PlayItem #2 refers to an interval of a clip #31. A PlayList #11 includes two PlayItems #0 and #1, and the PlayItems #0 and #1 refer to intervals of the clip #31, respectively.

As already stated, each PlayItem refers to an entry point described in the block "blkEPMap( )" included in the clip information that constitutes each clip, and designates an address in a corresponding clip AV stream file. By doing so, it s possible to designate parts of the clip AV stream file from the PlayList and reproduce them in a predetermined order.

In the example of FIG. 22, four PlayListMarks PLM#0, PLM#1, PLM#2, and PLM#3 are assigned to the PlayList #10. Marks indicating respective jump-access positions in each clip can be set to each PlayList. The marks are referred to as "PlayListMarks" (hereinafter, appropriately abbreviated as "PLMs"). These PlayListMarks are referred to by a value "µL_mark_id" in the block "blkPlayListMark( )" in the PlayList file and indicated as time information by the field "MarkTimeStamp" (see FIG. 15).

Figure 23A:
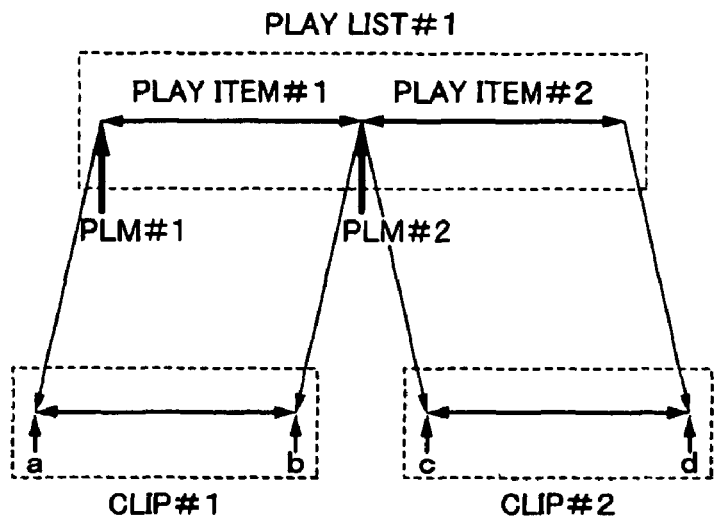
FIGS. 23A, 23B, and 23C are schematic diagrams for schematically explaining clip division and editing using PlayLists.
Figure 23B:
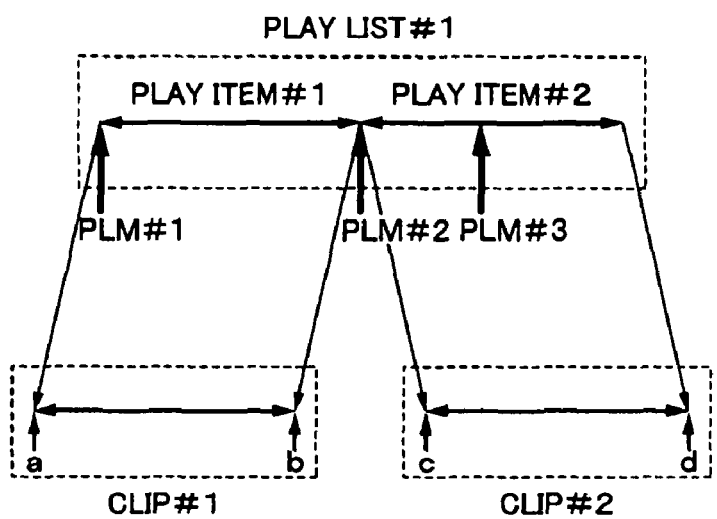
Figure 23C:
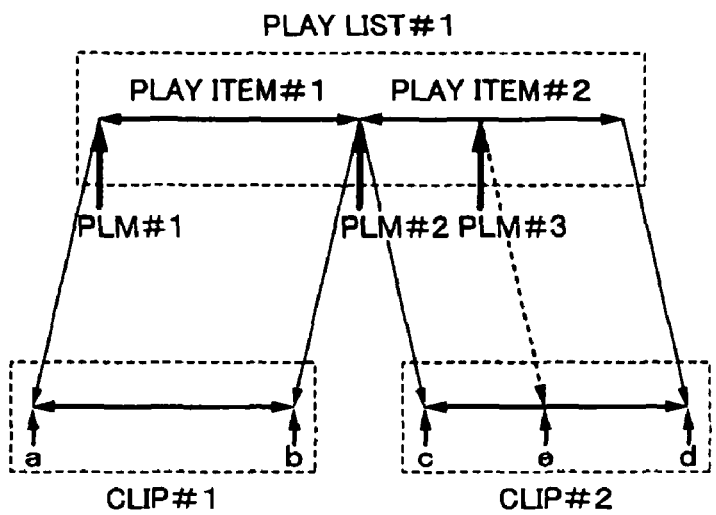

Referring next to FIGS. 23A to 23C, the division and editing of clips using a PlayList will be described. FIG. 23A shows a state in which clips are referred to by a PlayList. Clips #1 and #2 recorded on the recording medium are referred to by designating a reproduction start point (IN point) and a reproduction end point (OUT point) included in each of PlayItems #1 and #2 in the PlayList #1, respectively. In the example of FIGS. 23A to 23C, the PlayItem #1 refers to the clip #1 based on information that a top of the clip #1 (a position a) is the IN point and that a rear end thereof (a position b) is the OUT point. Likewise, the PlayItem #2 refers to the clip #2 based on information that a top of the clip #2 (a position c) is the IN point and that a rear end thereof (a position d) is the OUT point. In the PlayList #1, reproduction order numbers of the PlayItems #1 and #2 are designated.

Accordingly, in the example of FIG. 23A, the clip #1 is reproduced from the position a to the position b and the clip #2 is reproduced from the position c subsequent to the position b of the clip #1, and reproduction is finished at the position d in response to a command from the PlayList #1. In other words, in the example of FIG. 23A, an interval from the top of the clip #1 to the end of the clip #2 is continuously reproduced in response to the command from the PlayList #1.

Furthermore, in the example of FIG. 23A, PlayListMarks PLM#1 and PLM#2 are assigned to the top position a of the clip #1 and the top position c of the clip #2, respectively. In this case, if a jump is designated when the AV stream file is reproduced at, for example, an arbitrary position between the positions a and b on the clip #1 according to the PlayList #1, a reproduction position is jumped to a position of the PlayListMark set closest to the present reproduction position in reproducing direction (which is a position of the PlayListMark PLM#2 if the reproduction is from the position a to the position b), and reproduction is performed continuously from the position of the PlayListMark PLM#2.

By setting a PlayListMark halfway along a clip, the clip can be virtually divided. As exemplarily shown in, for example, FIG. 23B, the PlayListMark PLM#3 is assigned to a desired position of the clip #2 relative to the PlayList #1. By doing so, a position e corresponding to the PlayListMark PLM#3 of the clip #2 can be designated as a jumping destination position as exemplarily shown in FIG. 23C. It is, therefore, possible to consider the clip #2 to be virtually divided at the position e.

From user's viewpoints, intervals indicated by the PlayList are set according to chapters. The chapters can be set by assigning respective PlayListMarks to the PlayList. For example, if a PlayListMark is provided only at a top of an interval indicated by the PlayList or no PlayListMarks are provided on the PlayList, the entire PlayList constitutes one chapter.

Moreover, as shown in the example of FIG. 23A, if the PlayListMark PLM#1 is assigned to the position corresponding to the position a at the top of the clip #1 and the PlayListMark PLM#2 is assigned to the position corresponding to the position c at the top of the clip #2, then an interval from the PlayListMark PLM#1 to the PlayListMark plM#2 is regarded as a chapter #1, and an interval from the PlayListMark PLM#2 to an end of the PlayList #1 is regarded as a chapter #2. In this case, an entire length of the PlayList #1 is divided into two chapters by the PlayListMark PLM#2.

Further, if the PlayListMark PLM#3 corresponding to the desired position e halfway along the clip #2 is provided as shown in FIG. 23C, the chapter #2 in case of FIG. 23A is further divided into chapters at the position of the PlayListMark #3. Namely, an interval from the PlayListMark PLM#2 to the PlayListMark PLM#3 is regarded as the chapter #2, and an interval from the PlayListMark PLM#3 to the end of the PlayList #1 is regarded as a chapter #3.

Figure 24:
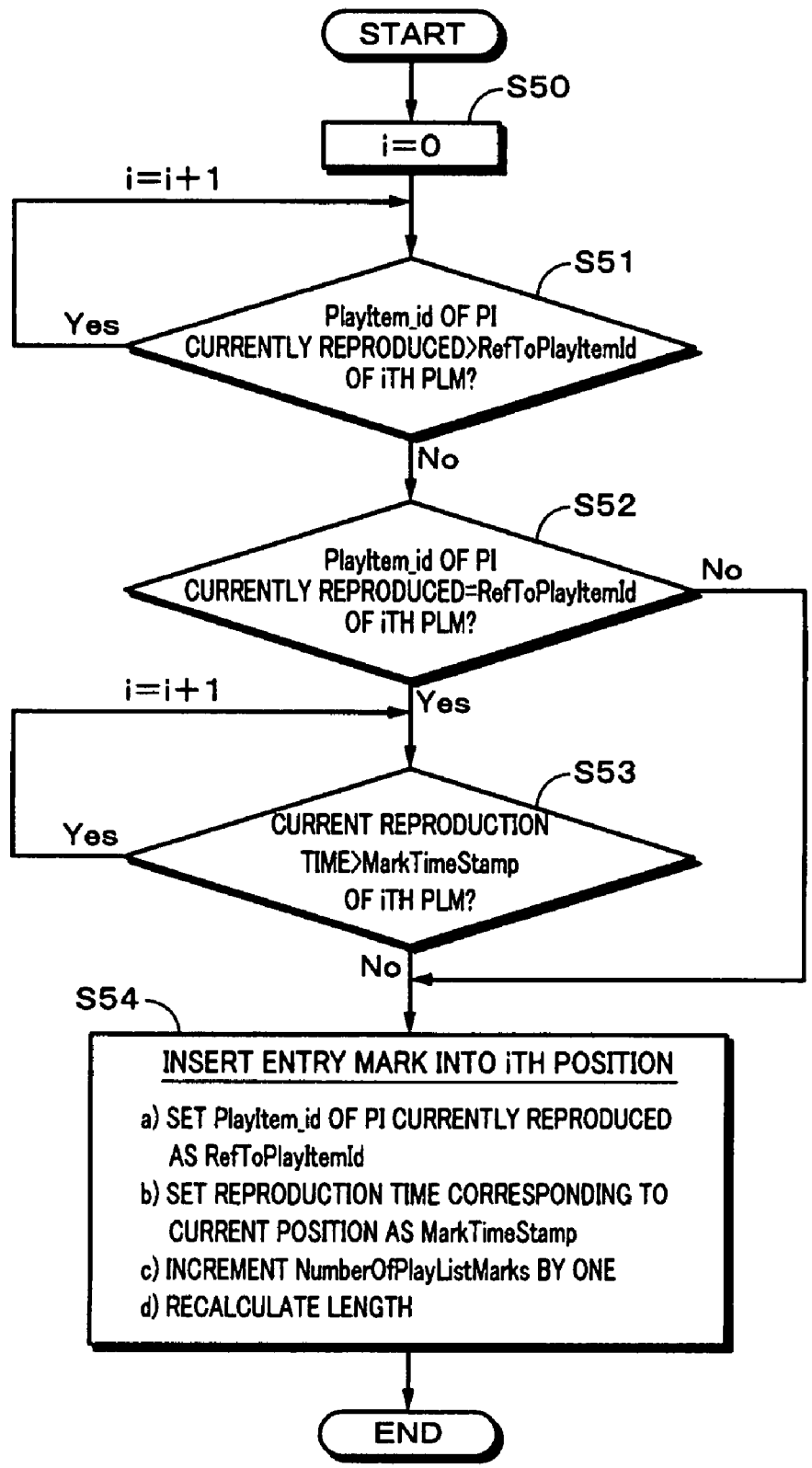
FIG. 24 is a flowchart showing an exemplary processing for additional insertion of a PlayListMark.

FIG. 24 is a flowchart showing an exemplary processing for additionally inserting a PlayListMark. In the processing shown in FIG. 24, a positional relationship between a current reproduction position and positions of already set PlayListMarks by searching the block "blkPlayListMark( )" (see FIG. 15) for storing PlayListMarks in the PlayList. An additional PlayListMark is inserted based on the result, and information on the block "blkPlayListMark( )" is rewritten.

At step S50, a count value i is initialized to "0". At step S51, it is determined whether the number of the PlayItem (denoted by "PI" in FIG. 24) that is currently reproduced is greater than the number of a PlayItem referred to by an $i^{th}$ PlayListMark (denoted by "PLM" in FIG. 24).

For example, in the block "blkPlayList( )" shown in FIG. 12, a value "PlayItem_id" corresponding to the PlayItem currently reproduced among those in the block "blkPlayItem( )" described in the for-loop sentence using the loop variable "PlayItem_id" is calculated. The calculated "PlayItem_id" is compared with an $i^{th}$ value "RefToPlayItemID" in the block "blkPlayListMark( )". If it is determined that the number of the PlayItem currently reproduced is greater, then the count value i is incremented by one and the processing returns to the step S51.

If it is determined at the step S51 that the number of the PlayItem currently reproduced is not greater than that of the PlayItem referred to by the $i^{th}$ PlayListMark, that is, the number of the PlayItem currently reproduced is equal to or greater than that of the PlayItem referred to by the $i^{th}$ PlayListMark, the processing moves to a step S52.

At the step S52, it is determined whether the number of PlayItem currently reproduced is equal to that of the PlayItem referred to by the $i^{th}$ PlayListMark. If it is determined that they are equal, the processing moves to a step S53. If it is not determined that they are equal, the processing moves to a step S54.

At the step S53, it is determined whether current reproduction time is later than reproduction time indicated by the $i^{th}$ PlayListMark. The current reproduction time can be acquired from, for example, a decoder decoding a video stream. Further, the reproduction time indicated by the $i^{th}$ PlayListMark can be acquired with reference to FIG. 15 and is based on an $i^{th}$ "MarkTimeStamp" in the block "blkPlayListMark( )".

If it is determined that the current reproduction time is later than the time indicated by the $i^{th}$ PlayListMark, then the count value i is incremented by one, and the processing returns to the step S53. If it is determined that the current reproduction time is not later than the time indicated by the $i^{th}$ PlayList-Mark, i.e., the current reproduction time is equal to or earlier than the time indicated by the $i^{th}$ PlayListMark, the processing moves to a step S54.

At the step S54, a processing for additionally inserting a PlayListMark (which is an entry mark in the embodiment) into an $i^{th}$ position. Here, in the block "blkPlayListMark( )", a PlayListMark is additionally inserted between the existing $i^{th}$ PlayListMark and an $(i-1)^{th}$ PlayListMark. After inserting the additional PlayListMark, the existing $i^{th}$ PlayListMark is regarded as the $(i+1)^{th}$ PlayListMark.

More specifically, in the block "blkPlayListMark( )", the value "PlayItem_id" corresponding to the PlayItem currently reproduced is set to the value of the field "RefToPlayItemID". Furthermore, the value of the field "MarkTimeStamp" is set to a value indicating the current reproduction time. Moreover, the value of the field "NumberOfPlayListMarks" is incremented by one and the value of the field "Length" is recalculated.

Actually, the block "blkPlayListMark( )" is a part of the PlayList file. Therefor, in the syntax of the PlayList file exemplarily shown in FIG. 11, the value of the field "ExtensionDataStartAddress" is rewritten according to the value of the field "Length" in the block "blkPlayListMark".

The processing for additional insertion of the PlayListMark will be described more specifically with reference to FIGS. 25A and 25B. Since FIGS. 25A and 24B are identical in structure to FIG. 22, they will not be described in detail. An instance of additionally inserting a PlayListMark into the position a while the PlayListMarks PLM#2 and PLM#3 are being reproduced will be described with reference to FIG. 25A.

The count value i is initialized to "0", and because the PlayItem corresponding to the position a is the PlayItem #2, the number of the PlayItem currently reproduced is 2. On the other hand, the $i^{th}$, i.e., $0^{th}$ Playlistmark #0 refers to the PlayItem #0 and the number of the PlayItem referred to by the $i^{th}$ PlayListMark is 0. Because the number of the PlayItem currently reproduced is greater than that referred to by the $i^{th}$ PlayListMark, the count value i is incremented by one to "1" based on the determination of the step S51, and the determination is made again at the step S51.

In the second determination of the step S51, the number of the PlayItem referred to by the $i^{th}$, i.e., first PlayListMark PLM#1 is compared with the number of the PlayItem currently reproduced. The first PlayListMark PLM#1 refers to the PlayItem #1 and the number of the PlayItem referred to is 1. Because the number of the PlayItem currently reproduced is greater than that referred to by the $i^{th}$ PlayListMark, the count value i is incremented by one to "2", based on the determination of the step S51, and the determination is made again at the step S51.

In the third determination of the step S51, the $i^{th}$, i.e., second PlayListMark PLM#2 is within the interval designated by the PlayItem #1, and the number of the PlayItem referred to by the second PlayListMark PLM#2 is 1. Therefore, it is determined that the number of the PlayItem currently reproduced is greater than that referred to by the $i^{th}$ PlayListMark. Accordingly, the count value i is incremented by one to "3", and the determination is made again at the step S51.

In the fourth determination of the step S51, the $i^{th}$, i.e., third PlayListMark PLM#3 is within the interval designated by the PlayItem #2, and the number of the PlayItem referred to by the third PlayListMark is 2. Therefore, it is determined that the number of the PlayItem currently reproduced is equal to that referred to by the $i^{th}$ PlayListMark, and the processing moves to a step S52. At the step S52, it is determined whether the number of the PlayItem referred to by the third PlayListMark PLM#3 is equal to that of the PlayItem currently reproduced. The processing, therefore, moves to a step S53.

The count value i is currently 3. Due to this, the time when the PlayListMark PLM#3 that is the $i^{th}$ PlayListMark is later than time of the current reproduction position a. At the step S53, therefore, it is determined that the value indicating the current reproduction time is smaller than the value indicating the time when the $i^{th}$ PlayListMark is set. The processing moves to a step S54, at which the PlayListMark corresponding to the position a is set.

Namely, the number of the PlayItem referred to is "2", and the PlayListMark indicating the reproduction time at the position a is additionally inserted as a third PlayListMark PLM#3. Furthermore, the number of PlayListMarks is incremented by one, the number of each of the PlayListMarks assigned after the reproduction time indicated by the PlayListMark PLM#3 immediately before the PlayListMark PLM#3 is additionally inserted is incremented by one. That is, in the example of FIGS. 25A and 25B, the PlayListMark PLM#3 shown in FIG. 25A is changed to a PlayListMark PLM#4 as exemplarily shown in FIG. 25B by the processing for additional insertion of the PlayListMark, and the additionally inserted PlayListMark is regarded as the PlayListMark #3.

If it is determined at the step S52 that the number of the PlayItem currently reproduced is not equal to that referred to by the $i^{th}$ PlayListMark, i.e., the number of the PlayItem currently reproduced is smaller than that referred to by the $i^{th}$ PlayListMark, a new PlayListMark may possibly be additionally inserted into a PlayItem which is between two PlayItems to which PlayListMarks are assigned in corresponding intervals, respectively and to which no PlayListMarks are assigned.

Figure 26:
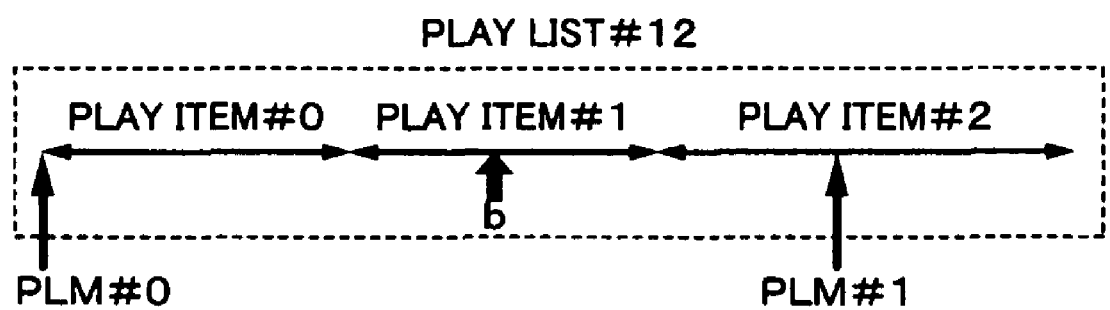
FIG. 26 is a schematic diagram for explaining the processing for additional insertion of PlayListMarks.

For example, as shown in FIG. 26, a PlayList #12 including three PlayItems of #0, #1, and #2 is considered. It is assumed that the PlayListMarks PLM#0 and PLM#1 are set to the position corresponding to the top of the PlayItem #0 and within an interval indicated by the PlayItem #2, respectively.

In this state, a PlayListmark is additionally inserted to the position b within the interval indicated by the PlayItem #1. Because the number of the PlayItem currently reproduced is "1" and that of the PlayItem referred to by the $i^{th}$ PlayList-Mark is "2" when the count value i of "1", it is determined at the step S51 that the number of the PlayItem currently reproduced is greater than that referred to by the $i^{th}$ PlayListMark, and the processing moves to the step S52. At the step S52, because the number of the PlayItem currently reproduced is "1" and that referred to by the $i^{th}$ PlayListmark is "2", it is determined that they are not equal. In this case, the other PlayListMark is not present in the PlayItem #1 corresponding to the position b. Therefore, there is no to determine at the step S53 whether the value indicating the present reproduction time is smaller than the value indicating the time when the $i^{th}$ PlayListMark is set. The processing, therefore, moves from the step S52 to the step S54, at which step a PlayListMark is additionally inserted into the position b.

A method of deciding a position where a PlayListMark is assigned related to the concept of the embodiments of the present invention will next be described. As already described, the two methods, i.e., the first method of assigning a PlayListMark to the position indicated by the entry "PTSEPStart" and the second method of assigning a PlayListMark at a position of each GOP boundary may be available. Advantages, disadvantages, and improvement methods of the respective first and second methods will be described.

If each GOP is configured to include I, P, and B pictures according to, for example, the MPEG2 system, the position indicated by the entry "PTSEPStart" can be made to correspond to the position of the I picture. Further, if an IDR picture is further used according to, for example, MPEG4 or H.264|AVC system, the position indicated by the entry "PTSEPStart" can be made to correspond to the position of the IDR picture.

FIGS. 27A and 27B show examples of chapter boundaries by the first and second methods, respectively. The chapter boundaries are indicated by the PlayListMarks PLM#1 and PLM#2, respectively, and an interval between the PlayListMarks PLM#1 and PLM#2 is set as a chapter #2. FIG. 27 shows exemplary chapter boundaries by the first method. A recording start position is at the top of the GOP. Due to this, if a PlayListMark is given at each position indicated by the entry "PTSEPStart", a mismatched interval is generated between the top of each GOP and the top of each chapter based on the PlayListMark as shown in FIG. 27A.

As a result, one to a plurality of frames in the mismatched intervals at the tops of the respective chapters is not reproduced. For example, if a PlayListMark is to be arranged at the recording start position, the problem occurs that one or a plurality of B pictures, for example, temporally previous to the first I picture (according to the MPEG2 system) in order of display, included in the GOP starting at the recording start position are not reproduced.

Moreover, on a rear end of each chapter, one or a plurality of frames in the mismatched interval belongs to a GOP different from a GOP immediately before the mismatched interval. Due to this, one or a plurality of frames in the mismatched interval may possibly be irrelevant in contents to the frame immediately before the mismatched interval. For example, the GOP immediately before the mismatched interval may be a GOP recorded in response to a recording stop command whereas the GOP including the mismatched interval may be either a next GOP or a GOP recorded in response to another recording start command. In this case, the problem occurs that several frames of an irrelevant scene are reproduced on the rear end of the chapter.

FIG. 27B shows exemplary chapter boundaries by the second method. With the second method, each chapter boundary coincides with a GOP boundary. The second method is, therefore, free from the problems with the first method stated above.

FIGS. 28A and 28B show examples of decoded intervals by the first and second methods, respectively. An interval between the PlayListMarks PLM#1 and PLM#2 is an interval to be displayed. FIG. 28A shows an exemplary decoded interval if the first method is adopted. At the top of each chapter, a PlayListmark is assigned to the position indicated by the entry "PTSEPStart". Due to this, a decoding start position is the top of the GOP including a corresponding picture at the position indicated by this entry "PTSEPStart". Namely, at the top of each chapter, the interval from the top of the GOP to the PlayListMark PLM#1 corresponds to an interval necessary to decode excessively relative to the interval to be displayed. During reproduction, the excessively decoded interval is masked.

As shown in FIG. 28B, if the second method is adopted, it is necessary to start decoding at the GOP immediately before the PlayListMark. The reason is as follows. If it is not determinable whether a GOP is an open GOP or a closed GOP, it is necessary to decode the GOP using information on the closest past GOP of the relevant GOP as an open GOP. That is, at the GOP boundary, the interval necessary to excessively decode by as much as one GOP relative to the interval to be displayed occurs.

Moreover, as time information, only information corresponding to each position indicated by the entry "PTSEPStart" is available. Due to this, the PlayListMark can be only recognized to be present between the positions each indicated by the entry "PTSEPStart" before and after the position where the PlayListMark is assigned. In this sense, it is necessary to start decoding at the GOP including the picture at the position indicated by the entry PTSEPStart before the position where the PlayListMark is assigned.

With the first method, a decoding end position is an end of the GOP including a frame corresponding to an end of the chapter. With the second method, it is difficult to recognize whether the position of the PlayListMark indicating the end of the chapter belongs to the GOP either before or after the PlayListMark for the similar reason as stated above. It is, therefore, necessary to perform decoding up to the end of the GOP including the picture corresponding to the position indicated by the entry "PTSEPStart" appearing immediately after the PlayListMark. Eventually, therefore, it is necessary to perform decoding up to the same position whether the first or second method is adopted.

FIGS. 29A to 29C show examples of decoded intervals by the first and second methods if a GOP can be determined as an open GOP or a closed GOP, respectively. The interval between the PlayListMarks PLM#1 and PLM#2 is an interval to be displayed. FIG. 29A shows an instance in which a PlayListMark is assigned at each position indicated by the entry "PTSEPStart", similarly to FIG. 28A. FIG. 29B shows an instance in which a PlayListMark is assigned to each GOP boundary between open GOPs.

As already stated, the closed GOP is completely decoded in itself and there is no need to use information on the closest past GOP. Due to this, as shown in FIG. 29C, even if a PlayListMark is assigned to each GOP boundary, decoding can start at the position of the PlayListMark. Namely, if the GOP to which the PlayListMark is assigned can be determined as the closed GOP, an interval necessary to excessively decode relative to the interval to be displayed does not occur.

Moreover, if recording restarts after recording stops, a next GOP to the open GOP corresponding to the recording stop is a closed GOP to follow the recording start. Due to this, a PlayListMark is assigned to the GOP boundary that is the recording start position. As a result, as shown in FIG. 29B, an end of the interval to be displayed in the recording stop part coincides with the end of the decoded interval, whereby frames irrelevant in contents are not displayed on the end of the chapter based on the PlayListmark.

As measures for determining whether the GOP is an open GOP or a closed GOP, several measures may be adopted. According to the embodiment of the present invention, each GOP is typically the closed GOP at the recording start time. Due to this, if chapter division is to be performed at the position corresponding to the recording start position, a PlayListMark is assigned to each GOP boundary.

Alternatively, according to, for example, the MPEG2 system, a flag may be used because the flag indicating whether the GOP is a closed GOP is stored in a header of an elementary stream of video data.

If chapter division and editing is performed by the same apparatus as the recording apparatus and reproduction is performed by the same apparatus, a method of storing information indicating the position where data is recorded in the closed GOP in a memory in the apparatus may be considered. Furthermore if it is defined to perform recording using the closed GOP as the specification of the apparatus and the chapter division is performed by the same apparatus, a PlayListMark can be typically assigned to each GOP boundary.

Information indicating a model name can be stored in, for example, an extension data area (i.e., the block "blkExtensionData( )") that can be provided in each index file, MovieObject file, PlayList file or clip information file. A method of storing information as to whether the GOP is the open GOP or the closed GOP in the extension data area may be considered.

FIG. 30 is a table showing evaluations of settings of PlayListMarks under the respective conditions described with reference to FIGS. 27A to 29C. In FIG. 30, an item given symbol "○" (circle) is a useful mode and an item given symbol "X" is an unfavorable mode. Furthermore, an item given symbol "-" (bar) is a substantially insignificant mode.

In FIG. 30, it is evaluated as to whether a position designated as a position for chapter division corresponds to a recording start position or a recording stop position if it is determined that a chapter-boundary mismatching is present or absent between recording and reproduction, an interval in which more frames than display frames are necessary to read/decode at the top and the rear end of the chapter while the PlayListMark is assigned to each position indicated by the entry "PTSEPStart" or to the position of each GOP boundary. Furthermore, if the PlayListMark is assigned to the position of each GOP boundary, evaluations are made for an instance in which the same apparatus is used for recording, editing, and reproducing and unique information of the apparatus is available (referred to as "apparatus using unique information" in FIG. 30) and for an instance in which an apparatus for recording and editing differs from an apparatus for reproduction (referred to as "ordinary reproducing apparatus").

In FIG. 30, a value M denotes the number of pictures present while moving from one reference picture to a next reference picture, and a value N denotes the number of pictures in one GOP. If the GOP is configured to include 15 pictures in order of, for example, "$I_2B_0B_1P_5B_3B_4P_8B_6B_7P_8B_9B_{10}P_{14}\ B_{12}B_{13}$", M=3 and N=15.

The instance in which it is instructed to perform chapter division at the position corresponding to the recording start or stop boundary position will be described. In this case, as described with reference to FIGS. 27A and 27B for chapter position mismatching between recording and reproduction, a mismatching is present if the PlayListMark is assigned to each position indicated by the entry "PTSEPStart" and no mismatching is present if the PlayListMark is assigned to the position of each GOP boundary.

In the decoded interval, as already described with reference to FIGS. 29A to 29C for the decoding start position, if a PlayListMark is assigned to each position indicated by the entry "PTSEPStart", more frames than display frames are necessary by (M−1) frames. If a PlayListMark is assigned to each GOP boundary position, the recording start position is typically in the closed GOP. Due to this, whether the ordinary reproducing apparatus or the apparatus using unique information is used, the display frame intervals coincides with the decoded interval. Moreover, for the decoding end position, if a PlayList is assigned to each position indicated by the entry "PTSEPStart", more frames than display frames are necessary by (N−M+1) frames. If a PlayListMark is assigned to each GOP boundary position, the display frame interval coincides with the decoded interval whether the apparatus is the reproducing apparatus or the apparatus using unique information.

The instance in which it is instructed to perform chapter division at the position that is not the recording start or stop boundary position will be described. In this case, the evaluation as to whether the chapter-boundary mismatching is present between recording and reproduction is of no significance. Therefore, the corresponding items are given "-" (bar) in FIG. 30.

As described with reference to FIGS. 29A to 29C, in the decoded interval, if a PlayList is assigned to each position of the entry PTSEPStart for the decoding start position, more frames than display frames are necessary by (M−1) frames. On the other hand, if a PlayListmark is assigned to each GOP boundary position, more frames than display frames are necessary by as much as a closest past GOP, i.e., N frames for the ordinary reproducing apparatus. For the apparatus using unique information, if it is determined that the GOP in which the PlayListMark is the open GOP, more frames than display frames are necessary by as much as one GOP, i.e., by N frames. In case of the apparatus using unique information, if it is determinable that the GOP is the closed GOP, a display start frame coincides with a decoding start frame.

Further, as for the decoding end position, if a PlayListMark is assigned to each position indicated by the entry "PTSEPStart", more frames than display frames are necessary by (N−M+1). If a PlayListMark is assigned to each GOP boundary position, more frames than display frames are necessary by as much as a immediate after GOP, i.e., by N frames. If case of the apparatus using unique information, a display end frame coincides with a decoding end position.

In this manner, if the chapter division is performed at the recording start or stop boundary position, a PlayListMark is assigned to each GOP boundary. If the chapter division is performed at a position other than the recording start or stop boundary position, a PlayListMark is assigned to each position indicated by the entry "PTSEPStart". This enables maximizing user convenience.

Figure 31:
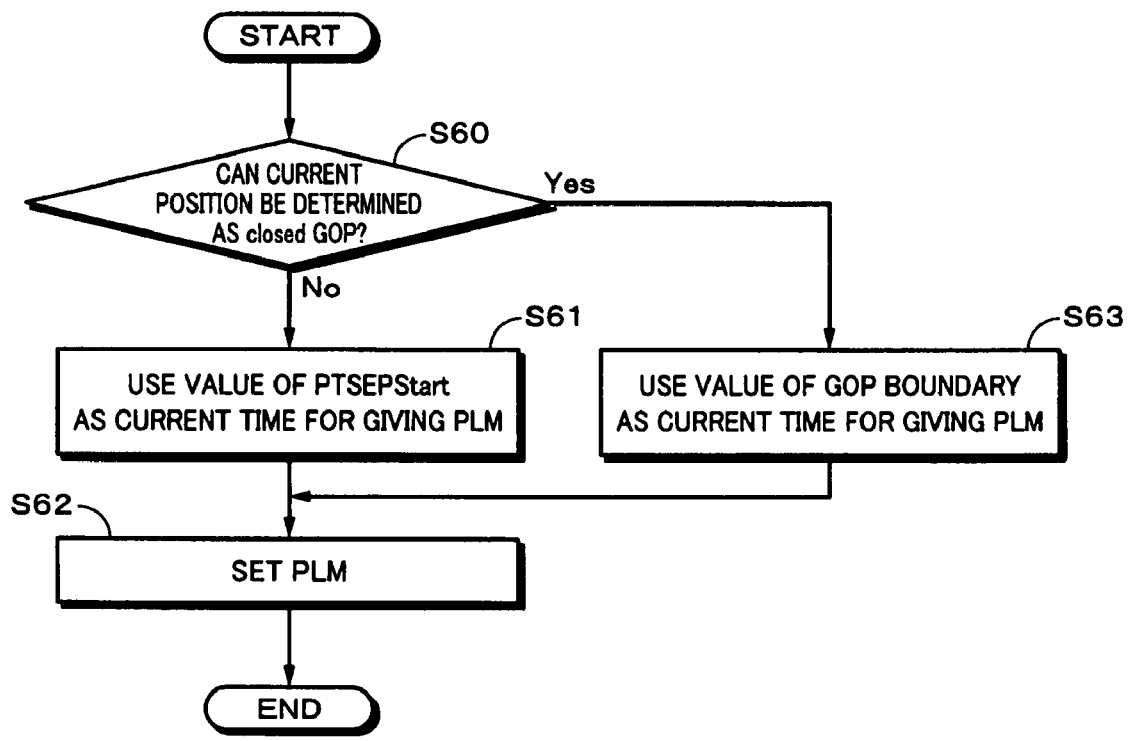
FIG. 31 is a flowchart showing an exemplary method of inserting a PlayListMark when chapter division-editing is conducted.

FIG. 31 is a flowchart showing an exemplary method of inserting a PlayListMark when chapter division-editing is conducted. If it is instructed to perform chapter division while clips are being reproduced according to the PlayList, for example, it is determined at a step S60 whether a GOP corresponding to a current reproduction position can be determined as a closed GOP. Information on the current reproduction position can be acquired from, for example, a decoder decoding a video stream.

If it is determined at the step S60 that the GOP cannot be determined as the closed GOP, the processing moves to a step S61, at which the value of the entry "PTSEPStart" is used as current time for assigning a PlayListMark. If it is determined at the step S60 that the GOP can be determined as the closed GOP, the processing moves to a step S63, at which the value of the GOP boundary is used as current time for assigning the PlayListMark.

After the step S61 or S63, the processing goes to a step S62, at which a processing for assigning the PlayListMark based on the current position decided at the step S61 or S63. Namely, at the step S62, the value of the field "MarkTimeStamp" in the block "blkPlayListMark( )" described in the step S54 in the above FIG. 24 is decided according to the result of the step S61 or S63.

The GOP boundary position can be acquired from, for example, the decoder decoding a video stream. Alternatively, the GOP boundary position can be calculated based on the value of the entry "PTSEPStart". In this alternative, the position returning from the position indicated by the entry "PTSEPStart" according to the GOP structure is set as the top position of the GOP.

A recording apparatus configured to automatically assigning a PlayListMark to each recording start position according to user's recording start operation may be available. By so configuring the recording apparatus, chapter jumping can be performed whenever recording starts or stops without need to perform the clip division-editing processing.

Figure 32:
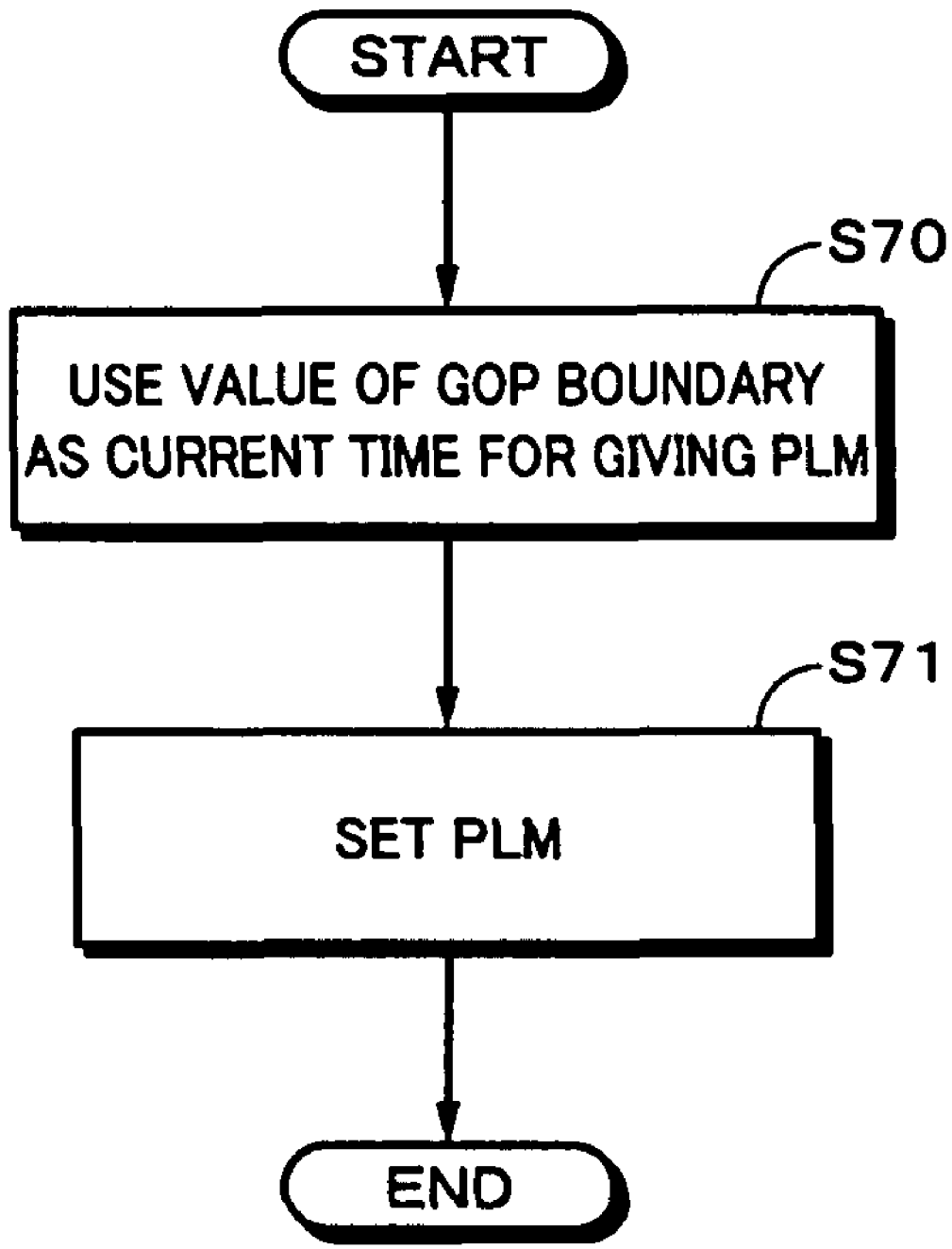
FIG. 32 is a flowchart showing an exemplary processing for automatically assigning a PlayListMark to a recording start position whenever recording starts.

FIG. 32 is a flowchart showing an exemplary processing for automatically assigning a PlayListMark at a recording start position whenever recording starts. If the user performs a recording start operation on, for example, the recording apparatus, clip recording starts and, at the same time, it is decided to use the GOP boundary value as the current time for assigning the PlayListMark. At a step s71, a processing for assigning the PlayListMark is performed based on the result of the step S70. Namely, at the step S71, the reproduction time corresponding to the top of the GOP first produced after the recording starts is set as the value of the field "MarkTimeStamp" in the block "blkPlayListMark( )", and the PlayListMark is assigned.

For a first recorded clip with respect to the PlayList, for example, the time corresponding to the recording start position, that is, the top of the GOP first produced after the recording start is a value obtained by adding a predetermined offset to the value "0". In case of a specification of additionally describing a clip produced when recording starts or stops again, the time is a value obtained by, for example, adding a predetermined offset to an accumulative reproduction time for already recorded clips. The Predetermined offset may be, for example, a value corresponding to time required since supply of streams to the decoder starts until a frame at the top of the GOP is displayed, which value is unique according to the specification of the apparatus or the like.

This processing is a suitable method for the following instance. If a plurality of recording start or stop operations can be performed for one clip, the chapter boundary corresponding to each recording start or stop operation is provided only by the PlayListMark while using only one clip AV information file, one clip information file, and one PlayItem corresponding to the clip information file.

An upper limit may be able to set to the number of PlayListMarks assignable to one PlayList file. By setting the upper limit of the number of PlayListMarks, it is possible to prevent an unlimited increase in a capacity of each PlayList file. Moreover, if the number of display chapters is limited to, for example, a three-digit number in an editing apparatus or a reproducing apparatus, the upper limit may be possibly set to the number of PlayListMarks. Each of the processings described with reference to FIGS. 31 and 32 is performed after it is determined whether the number of PlayListMarks to be currently set exceeds the upper limit of the number of PlayListMarks settable in this PlayList and it is determined that the number of PlayListMarks does not exceed the upper limit.

A recording/reproducing apparatus applicable to an embodiment of the present invention will be described. Before describing the recording/reproducing apparatus, a virtual player will be outlined. If a disc having the above-stated data structure is installed in a player, the player typically needs to convert commands described in the MovieObjects or the like read from the disc into unique commands for controlling hardware within the player. The player stores therein software for such conversion in advance, in a ROM (Read Only Memory) built in the player. Because this software enables the player to operate according to the format via the disc and the player, the software is referred to as "virtual player".

Figure 33:
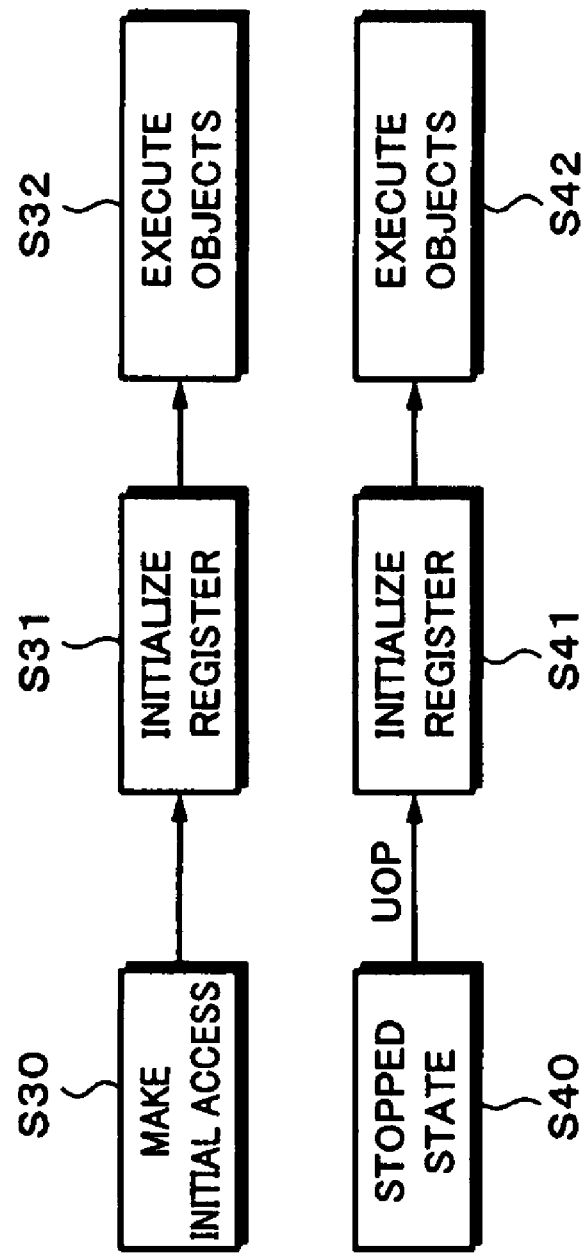
FIGS. 33A and 33B are flowcharts schematically showing operations performed by a virtual player.

FIGS. 33A and 33B schematically show operations performed by the virtual player. FIG. 33A shows an example of the operation during disc loading. When the disc is installed in the player and an initial access is made to the disc at a step S30, a register that stores therein common parameters shared in one disc is initialized at a step S31. At a step S32, the program described in each MovieObject is read from the disc and executed. The initial access means that the data stored in the disc is reproduced for the first time such as at the time of installing the disc.

FIG. 33B shows an example of the processing if the user depresses, for example, a play key to instruct reproduction in a state in which the player is stopped. While the player is in the first stopped state (step S40), the user instructs the player to perform reproduction using, for example, a remote control command (UO: User Operation). In response to the reproduction command, the register, that is, the common parameters are initialized at a step S41, and the player turns into a phase of executing MovieObjects ("movie-object executing phase") at a step S42.

Reproduction of a PlayList in the movie-object execution phase will be described with reference to FIG. 34. An instance in which it is instructed by the UO or the like to start reproducing contents with a title number #1 will be described by way of example. The player refers to the Index Table shown in FIG. 3 in response to the command to start reproducing contents, and acquires the number of object corresponding to the reproduction of the contents with the title #1. If the number of the MovieObject for realizing reproduction of the contents with the title #1 s, for example, #1, the player starts executing a moving object #1.

Figure 34:
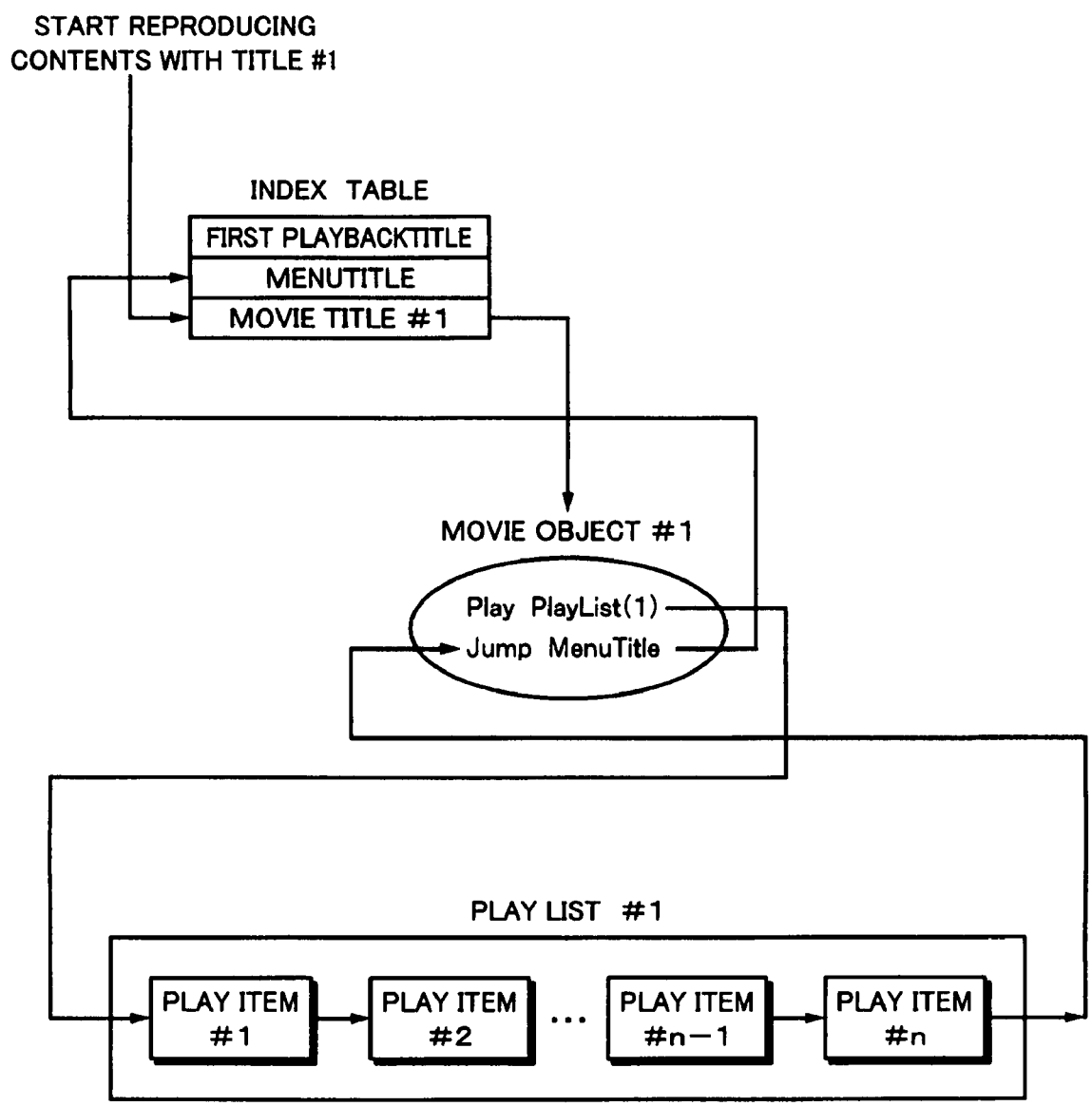
FIG. 34 is a schematic diagram schematically showing the operations performed by the virtual player.

In the example shown in FIG. 34, the program is described in the MovieObject #1 on two lines. If a command on the first line is "Play PlayList(1)", the player starts reproducing the PlayList #1. The PlayList #1 includes one or more PlayItems, so that the PlayItems are reproduced in sequence. When the reproduction of the PlayItems included in the PlayList #1 is finished, the processing returns to execution of the MovieObject #1 and a command on the second line is executed. In the example of FIG. 34, the command on the second line is "Jump MenuTitle", and the command is executed thereby start executing a MovieObject for realizing the MenuTitle described in the Index Table.

Figure 35:
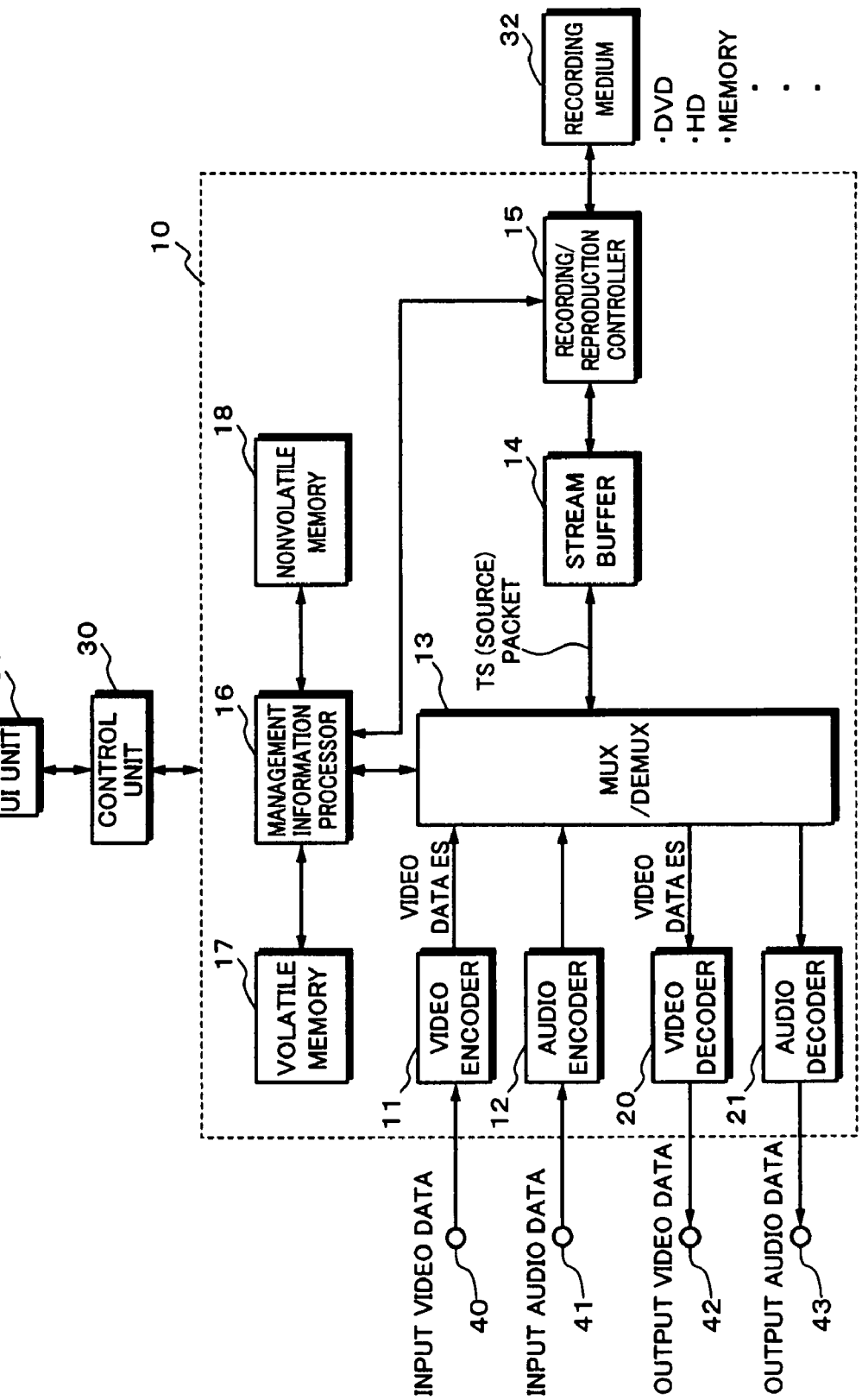
FIG. 35 is a schematic block diagram of an exemplary configuration of a recording/reproducing apparatus according to an embodiment of the present invention.

FIG. 35 is a schematic diagram of an exemplary configuration of the recording/reproducing apparatus according to one embodiment of the present invention. A recording/reproducing apparatus shown in FIG. 35 is applicable either as a single recording/reproducing apparatus for recording video data and audio data input from an outside of the apparatus in a recording medium, and for reproducing the video data and the audio data recorded in the recording medium or as a recording block included in a video camera apparatus for recording video data based on imaging signals picked up in combination with a camera block that includes an optical system, an imaging device, and the like.

Various compression coding and multiplexing systems are applicable to the recording/reproducing apparatus. For example, the H.264|AVC system is applicable to the recording/reproducing apparatus as the compression coding system according to the embodiments of the present invention. However, the compression-coding system is not limited to the H.264|AVC system based on the MPEG2 system. Alternatively, the MPEG2-based compression coding systems, for example, are applicable to the recording/reproducing apparatus. The recording/reproducing apparatus will be described assuming that the video data is compression-coded according to the H.264|AVC system and that the video data and the audio data are multiplexed according to the MPEG2 systems.

A control unit 30 includes, for example, a CPU (Central Processing Unit), a RAM (Random Access Memory), a ROM (Read Only Memory) or the like (not shown). The control unit 30 controls respective constituent element of the recording/reproducing apparatus 10 by using RAM as a work memory. Paths for connecting the control unit 10 to the respective constituent elements of the recording/reproducing apparatus 10 are not shown in FIG. 35 to avoid complication.

An operator for causing the user to operate operations performed by the recording/reproducing apparatus 10 is provided in a predetermined portion in a UI (User Interface) unit 31, and the UI unit 31 outputs a control signal in response to a user's operation of the operator. The control signal is supplied to the control unit 30. The control unit 30 controls operations performed by the respective constituent elements of the recording/reproducing apparatus 10 by a processing performed by a program based on the control signal supplied from the UI unit 31. Furthermore, the UI unit 31 includes a simple display unit so as to be able to display a predetermined state, e.g., a recording or reproducing state of the recording/reproducing apparatus based on information supplied from a management information processor 16 to be described later.

For example, in response to an operation performed on the UI unit 31, the control unit 30 controls the recording/reproducing apparatus to perform operations for starting and stopping an operation for recording data in a recording medium 32 and to perform a reproduction operation for reproducing the data from the recording medium 32. Furthermore, during an editing operation, the data is reproduced from the recording medium 32 and a chapter division processing is performed at a position according to the operation on the UI unit 31.

A video encoder 11 includes a buffer memory in which video data of a plurality of frames can be stored, accumulates supplied baseband digital video data in the buffer memory, and compression-codes the digital video data in the predetermined system. In the example in which the video encoder 11 compression-codes the digital video according to the H.264|AVC system, the video encoder 11 performs intraframe compression on the digital video data based on, for example, the DCT (Discrete Cosine Transform) and in-screen prediction. Further, the video encoder 11 performs interframe coding using motion vectors and then entropy coding on the digital video data, thereby improving compression efficiency. The digital video data compression-coded by the video encoder 11 is output as an H.264|AVC elementary stream (ES).

A video decoder 20 includes a buffer memory in which video data of a plurality of frames can be stored, accumulates supplied compressed video data in the buffer memory, decodes the compressed video data according to a decoding system corresponding to the compression coding system, and outputs the decoded video data as baseband digital video data. In the example in which the video encoder 11 compression-codes the digital video according to the H.264|AVC system, the video decoder 20 decodes the compressed video data according to the H.264|AVC system to correspond to the video encoder 11. The video decoder 20 can decode the compressed video data and output the decoded video data based on time extracted by a multiplexer/demultiplexer 13 (hereinafter, "MUX/DEMUX") to be described later and indicated by a DTS (Decoding Time Stamp) and a PTS (Presentation Time Stamp). The baseband digital video data obtained as a result of the decoding processing performed by the video decoder 20 is output from a terminal 42.

An audio encoder 12 compression-codes baseband digital audio data supplied from a terminal 41 according to a predetermined compression coding system, e.g., Dolby Digital® system. However, the compression coding system for the audio data is not limited to the Dolby Digital® system. Alternatively, the baseband data may possibly used as it is without compression-coding the audio data.

An audio decoder 21 decodes the supplied compressed audio data according to a decoding system corresponding to the compression coding system, and outputs the decoded audio data as baseband digital audio data. In the example in which the audio encoder 12 compression-codes the audio data according to the Dolby Digital® system, the audio decoder 21 decodes the compressed audio data according to the decoding system compliant with the Dolby Digital® system to correspond to the audio encoder 12. The audio decoder 21 outputs the decoded audio data from a terminal 43 synchronously with the video data output from the video decoder 20.

The MUX/DEMUX 13 includes a multiplexer function and a demultiplexer function. Namely, the MUX/DEMUX 13 functions as a multiplexer that multiplexes the supplied digital video data and the supplied digital audio data compression-coded according to the respective compression coding systems with each other according to a predetermined multiplexing system, and that outputs one digital stream. In addition, the MUX/DEMUX 13 functions as a demultiplexer that demultiplexes the data stream in which the digital video data and the digital audio data are multiplexed with each other according to the predetermined multiplexing system to the digital video data and the digital audio data, and that extracts the digital video data and the digital audio data.

In the example in which multiplexing is performed according to the MPEG2 systems, the MUX/DEMUX 13 multiplexes the supplied compressed video data with the supplied compressed audio data in a time division fashion using an MPEG2 transport stream as the multiplexer function. For example, the MUX/DEMUX 13 has a buffer memory and temporarily stores the supplied compressed video data and audio data in the buffer. The compressed video data stored in the buffer memory is divided into packets each at a predetermined size, to which headers are added, and provided as PES (Packetized Elementary Stream) packets. Likewise, the compressed audio data stored in the buffer memory is divided into packets each at a predetermined size, to which headers are added, and provided as PES packets. Each of the headers stores therein predetermined information specified in the MPEG2 systems such as PTS indicating reproduction time for the data stored in each packet and DTS (Decoding Time Stamp) indicating decoding time therefor. The PES packets are further divided and each packet is packed into a payload of a transport packet (TS packet). A header of the TS packet stores therein PID (Packet Identification) for identifying a type or the like of the data packed into the payload.

As the demultiplexer function, the MUX/DEMUX performs an opposite processing to the multiplexer function, and extracts the compressed video data and the compressed audio data from the respective packets. For example, the MUX/DEMUX detects the PID from the header of each of the supplied TS packets, and sorts the TS packets according to the types of the data stored in their payloads. Furthermore, the MUX/DEMUX extracts the data stored in the payload for each of the sorted TS packets, and reconstructs the PES packets. Moreover, the MUX/DEMUX extracts the compressed video data and compressed audio data stored in the payloads of the PES packets, adds header information or the like to the extracted video and audio data based on the information stored in the respective PES headers, and outputs each of the video and audio data as one elementary stream.

A stream buffer 14 temporarily stores therein the TS packets supplied from the MUX/DEMUX 13 (at the time of recording) or from a recording/reproduction controller 15 (at the time of reproduction). By controlling timings of reading and writing the TS packets to and from the stream buffer 14 in a predetermined manner, an access rate for accessing the recording medium 32 is matched to signal processing rates of the audio and video encoders or decoders.

The recording/reproduction controller 15 controls recording of data in the recording medium 32 and reproducing data from the recording medium 32. Namely, the recording/reproduction controller 15 writes and reads data to and from the recording medium 32 at a designated address in response to a command from a higher-level unit such as the control unit 30.

As the recording medium 32, a recordable DVD (Digital Versatile Disc), for example, can be employed. However, the recording medium 32 is not limited to the recordable DVD but a hard disc drive or a semiconductor memory is applicable as the recording medium 32. Moreover, a Blu-ray Disc® having a large capacity may be applicable as the recording medium 32.

The management information processor 16 is configured to include, for example, a CPU, a RAM serving as a work memory, and a ROM storing therein data on predetermined programs (not shown). However, a configuration of the management information processor 16 is not limited to the configuration. The functions of the management information processor 16 can be realized by, for example, program processings performed by the control unit 30. In this case, the RAM included in the control unit 30 is employed as a nonvolatile memory 17, and a nonvolatile memory 18 is connected to the control unit 30.

The management information processor 16 uses, for example, the nonvolatile memory 17 as a work memory, and performs the processings related to the index file "index.bdmv", the MovieObject file "MovieObject.bdmv", the PlayList file "xxxxx.mpls", and the clip information file "zzzzz.clpi" as stated above. The management information processor 16 performs, for example, the processing for additional insertion of the PlayListMark according to the embodiment of the present invention under control of the control unit 30.

A recording operation performed by the recording/reproducing apparatus 10 configured as stated above will be described. It is assumed that the video data is compression-coded according to the system compliant with the H.264|AVC, and that the audio data is compression-coded according to the AAC system.

The baseband digital video data is input from a terminal 40 to the recording/reproducing apparatus 10, and supplied to the video encoder 11. When the user starts the recording start operation on the UI unit 31, for example, the video encoder 11 starts compression-coding the supplied digital video data. The video encoder 11 compression-codes the baseband digital video data and outputs the compression-coded digital video data as the elementary stream (ES) according to the H.264|AVC. The elementary stream is supplied to the MUX/DEMUX 13.

The baseband digital audio data is input from the terminal 41 to the recording/reproducing apparatus 10, and supplied to the audio encoder 12. The audio encoder 12 starts compression-coding the supplied digital audio data at a timing of the user's recording start operation on the UI unit 31. The digital audio data compression-coded by the audio encoder 12 is supplied to the MUX/DEMUX 13.

The MUX/DEMUX 13 multiplexes the digital video data and the digital audio data compression-coded in the respective compression coding systems with each other according to the predetermined multiplexing system, and outputs the multiplexed data as one data stream. The MUX/DEMUX 13 includes the buffer memory and temporarily stores the supplied compressed video and audio data in the buffer memory.

The compressed video data stored in the buffer memory is divided into packets each at the predetermined structure, and headers are added to the respective packets, thereby providing the PES (Packetized Elementary Stream) packets. Likewise, the compressed audio data stored in the buffer memory is divided into packets each at the predetermined size, and headers are added to the respective packets, thereby providing the PES packets. Each of the headers stores therein the predetermined information specified in the MPEG2 systems such as the PTS indicating reproduction time for the data stored in each packet and the DTS (Decoding Time Stamp) indicating decoding time therefor. The PES packets are further divided and each packet is packed into the payload of the TS packet. The header of the TS packet stores therein the PID (Packet Identification) for identifying the type or the like of the data packed into the payload. The TS packets output from the MUX/DMUX 13 functioning as the multiplexer are temporarily accumulated in the stream buffer 14.

The MUX/DMUX 13 actually adds a predetermined header at a predetermined size to each of the TS packets and then outputs the header-added TS packets. The packet obtained by adding the predetermined header to each TS packet is referred to as "source packet".

The recording/reproduction controller 15 monitors an amount of the data accumulated in the stream buffer 14. If the data of an amount equal to or larger than the predetermined amount is accumulated in the stream buffer 14, the recording/reproduction controller 15 reads data from the stream buffer 14 each by a recording unit of the recording medium 32 and writes the read data to the recording medium 32.

The management information processor 16 generates information to be stored in the index file "index.dbmv", the MovieObject file "MovieObject.bdmv", the PlayList files "xxxxx.mpl", and the clip information file "zzzzz.clpi" using the nonvolatile memory 17 as the work memory based on the recorded data. The generated information is written to the recording medium 32 at predetermined timing.

By way of example, the management information processor 16 acquires time information on the recorded data from the MUX/DMUX 13, and also acquires address information on the recorded data in the recording medium 32 from the recording/reproduction controller 15, and generates the entry "PTSEPStart" based on the acquired time information and address information. Furthermore, the management information processor 16 performs generation or update of the PlayList file "xxxxx.mpls", generation of the clip information file "zzzzz.clpi" and the like based on the control signal output from the control unit 30 in response to the user's recording start or end operation on the UI unit 31 and on the information on the recorded data from the MUX/DMUX 13 and the recording/reproduction controller 15.

If the recording/reproducing apparatus is configured to assign a PlayListMark to each recording start position when recording starts, the management information processor 16 creates the PlayListMark having the reproduction time corresponding to the top frame created in response to the user's recording start operation on the UI unit 31 as the value of the field "MarkTimeStamp" and add the created PlayListMark to the PlayList.

A reproduction operation performed by the recording/reproducing apparatus 10 will be described. When the recording medium 32 is installed to, for example, the recording/reproducing apparatus, the index file "index.bdmv" and the MovieObject files "MovieObject.bdmv" are read from the recording medium 32 and transmitted to the management information processor 16. The management information processor 16 stores the received information in the nonvolatile memory 17. The control unit 30 acquires the information stored in the nonvolatile memory 17 from the management information processor 16, and controls clip information recorded in the recording medium 32 to be displayed on the display unit included in the US unit 31 based on the acquired information. The user performs a predetermined operation on the UI unit 31 based on the displayed information, whereby the user is able to instruct the clips recorded in the recording medium 32 to be reproduced. For brevity, it is assumed that reproduction start from the top of each clip.

The control unit 30 acquires information on the PlayList files from the management information processor 16 in response to the user's operation on the UI unit 31. Furthermore, the control unit 30 instructs the recording/reproduction controller 15 to read the clip information file referred to by each of the PlayItems stored in each PlayList file and the clip AV stream file corresponding to the clip information file from the recording medium 32 based on the PlayList files. The recording/reproduction controller 15 reads the clip information file and the clip AV stream file from the recording medium 32 in response to the command from the control unit 30. The clip AV stream file is read from the recording medium 32 for every TS packet and accumulated in the stream buffer 14 via the recording/reproduction controller 15.

The TS packets read from the recording medium 32 are actually the source packets obtained by adding the header of the predetermined size to each of the original TS packets.

The MUX/DEMUX 13 monitors an amount of the data accumulated in the stream buffer 14. If the data of an amount equal to or larger than the predetermined amount is accumulated in the stream buffer 14, the MUX/DEMUX 13 reads data from the stream buffer 14 as TS packets by as much as the amount which it is necessary for the video decoder 20 to decode. The read TS packets are supplied to the MUX/DEMUX 13 and temporarily stored in the buffer memory of the MUX/DEMUX 13. The MUX/DEMUX 13 sorts the TS packets according to the types of the data based on their PIDS, and reconstructs the PES packets from the data stored in the payloads of the respective TS packets. Furthermore, the MUX/DEMUX 13 extracts the data from the payloads of the PES packets, adds predetermined header information or the like including the information for designating the decoding time and the reproduction time, e.g., the DTS and the PTS to the data based on information on the PES headers, and generates elementary streams (ESs) of the compression-coded video data and the compression-coded audio data (hereinafter, "video data ES" and "audio data ES"), respectively.

The MUX/DEMUX 13 supplies the video data ES, i.e., the elementary stream of the compression-coded video data to the video decoder 20. The video decoder 20 accumulated the compression-coded video data in the buffer memory. When the data corresponding to predetermined pictures is accumulated in the buffer memory, the video decoder 20 starts decoding the data accumulated in the buffer memory. The video decoder 20 sequentially outputs the decoded video data at frame timings according to the PTS based on, for example, an STC (System Time Clock) supplied from a system clock, not shown.

On the other hand, the MUX/DEMUX 13 supplies the audio data ES, i.e., the compressed audio data to the audio decoder 21, and the audio decoder 21 performs a predetermined decoding processing on the compressed audio data. The audio decoder 21 outputs the decoded audio data synchronously with the video data output from the video decoder 20.

The recording/reproducing apparatus can perform chapter division and editing on the clips recorded in the recording medium 32. A predetermined operation is performed on the UI unit 31 while the clips are being reproduced from the recording medium 32, thereby designating each of positions where chapter division is performed. As a method of designating the position of the chapter division, a method of performing a clip division operation at a desired position while the clips are being reproduced in an ordinary manner, e.g., at 1× reproduction speed in forward direction, a method of performing the chapter division operation by searching the division position for every frame using variable-speed reproduction such as quick reproduction, slow reproduction or frame-by-frame reproduction, or the like may be adopted.

When the division position is designated, the positional relationship between the current reproduction position corresponding to the designated division position and the other PlayListMarks in the PlayList is determined according to the processing already described with reference to FIG. 24. Furthermore, it is determined whether the value of the entry "PTSEPStart" or that of the GOP boundary is used as the current time for assigning a PlayListMark according to the processing already described with reference to FIG. 31.

If the value of the entry "PTSEPStart" is used as the current time for assigning the PlayListMark and the division position is designated arbitrarily for every frame, the designated division position is not necessarily a position in the frame indicated by the entry "PTSEPStart". In this case, the value of the entry "PTSEPStart" closest to the designated position may be used as the value of the entry "PTSEPStart" corresponding to before or after the designated division position. Furthermore, the value of the closest past or future entry "PTSEPStart" to the designated division position may be used as the value of the entry "PTSEPStart" corresponding to the designated division position.

If it is determinable that the GOP corresponding to the current reproduction position is the closed GOP, the reproduction time for reproducing the top frame of the closed GOP can be acquired from, for example, the MUX/DEMUX 13. However, the method of obtaining the reproduction time is not limited to the above-stated method. The reproduction time for reproducing the top frame of the closed GOP may possibly be calculated based on the data accumulated in the buffer memory of the video decoder 20 and the STC with the value of the entry "PTSEPStart" set as a reference point.

Figure 36:
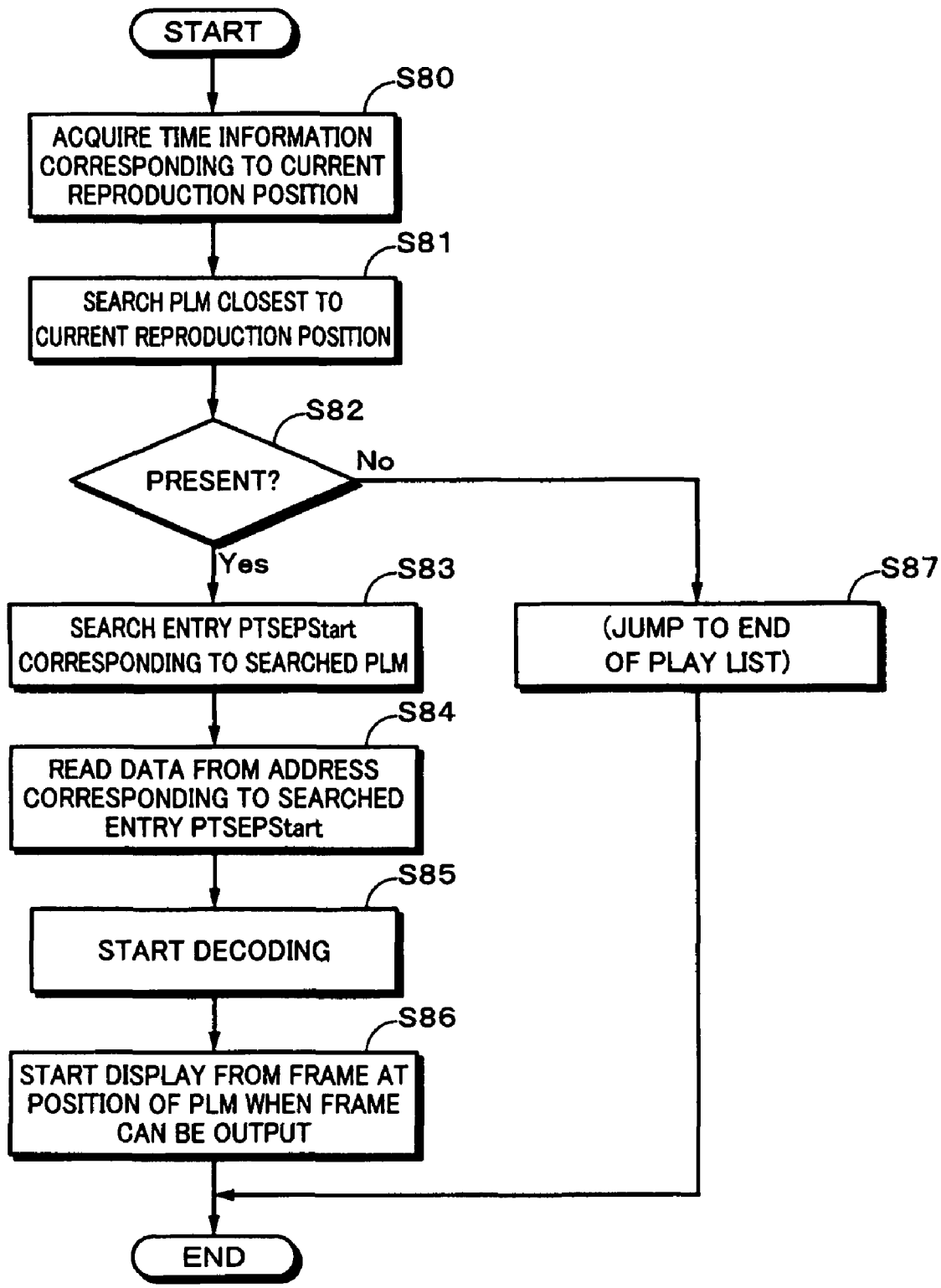
FIG. 36 is a flowchart showing an exemplary method of performing a chapter jumping processing based on a PlayListMark.

FIG. 36 is a flowchart showing an exemplary method of performing a chapter jumping processing based on the PlayListMark assigned as stated above. By way of example, while the PlayList to which the PlayListMark has been assigned and which has been subjected to the chapter division and editing is being reproduced, the user performs an operation on, for example, the UI unit 31 to make chapter jumping. The control unit 30 acquire time information corresponding to a current reproduction position in response to the operation at a step S80. For example, the control unit 30 communicates with the MUX/DEMUX 13. The control unit 30 is thereby able to acquire information on the reproduction time for reproducing an arbitrary one of the frames that are being decoded by the video decoder 20 based on the PTS included in the video data ES demultiplexed by the MUX/DEMUX 13 and the STC of the MUX/DEMUX 13.

A method of acquiring the time information corresponding to the current reproduction position is not limited to that described above. Alternatively, a method of performing address conversion based on the entry "PTSEPStart" typically using the information on the block "blkEPMap( )" (see FIG. 18) in the clip information file during reproduction may possibly be used. During the reproduction, it is necessary to read data on a next GOP. If the alternative method is used, the data on the next GOP can be easily acquired. Furthermore, by reproducing the PlayList while typically updating the relationship between the current reproduction position and the position of the PlayListMark, information on the chapter that is currently reproduced can be advantageously displayed on a screen of the display unit of the UI unit 31.

After the time information corresponding to the current reproduction position is acquired, the control unit 30 searches a PlayListMark closest to the time indicated by the time information in a reproducing direction from the blocks "blkPlayListMark( )" in the PlayList currently reproduced at a step S81.

If the closest PlayListMark is present ("Yes" at a step 82), the processing goes to a step S83. At the step S83, the control unit 30 searches the entry "PTSEPStart" corresponding to the PlayListMark searched at the step S81 based on the PlayListMark.

According to the embodiments of the present invention, each PlayListMark is assigned to either the position of each entry "PTSEPStart" or each GOP boundary position. Accordingly, if the entry "PTSEPStart" coincident with the value "MarkTimeStamp" indicating the reproduction time of the PlayListMark is present, the entry "PTSEPStart" corresponding to the PlayListMark is the entry "PTSEPStart" coincident with the value "MarkTimeStamp". On the other hand, if the entry "PTSEPStart" coincident with the value "MarkTimeStamp" indicating the reproduction time of the PlayListMark is not present, the PlayListMark is assigned to a GOP boundary position, and it is recognized that the GOP is the closed GOP, then the entry "PTSEPStart" corresponding to the PlayListMark is the first entry "PTSEPStart" appearing when the reproduction time advances from the "MarkTimeStamp" in the reproducing direction. Moreover, the entry "PTSEPStart" coincident with the value "MarkTimeStamp"indicating the reproduction time of the PlayList mar is not present, and the PlayListMark is not assigned to a GOP boundary position or it is not recognized that the GOP is the closed GOP, then the entry "PTSEPStart" corresponding to the PlayListMark is the next entry "PTSEPStart" appearing when the reproduction time advances in an opposite direction to the reproducing direction.

At a step S84, the control unit 30 acquires address information corresponding to the entry "PTSEPStart" searched at the step S83 based on the block "blkEPMap( )" (see FIGS. 18 to 21) in the clip information file corresponding to the PlayItem currently reproduced. The control unit 30 controls the recording/reproduction controller 15 to read the data at an address indicated by the address information from the recording medium 32.

The data read from the recording medium 32 is supplied to the MUX/DEMUX 13 from the recording/reproduction controller 15 via the stream buffer 14, and the MUX/DEMUX 13 demultiplexes the streams that have been time-division multiplexed using the packets according to the types of data. Among the demultiplexed data, the video data ES, i.e., the elementary stream of the compressed video data is supplied to the video decoder 20. The video decoder 20 starts decoding the supplied elementary stream of the compressed video data at a step S85. When the frame indicated by the PlayListMark can be output, the frame and starts displaying the frame at a step S86.

At this time, if the PlayListMark is assigned to the position indicated by the entry "PTSEPStart", the pictures previous to the picture corresponding to the entry "PTSEPStart" in the GOP are controlled to be decoded but not to be displayed. If the PlayListMark is assigned to the GOP boundary position, display of the pictures starts at the top position of the GOP.

A command of chapter jumping to a position temporally later than the PlayListMark assigned at last reproduction time may possibly be transmitted. This means that the PlayListMark closest to the current reproduction position in the reproducing direction is not present in the PlayList currently reproduced. In this case, the chapter jumping command is ignored. However, the jumping destination is not limited to this. As exemplarily shown in a step S87 of FIG. 36, the jumping destination may be an end of the PlayList.

Another embodiment of the present invention will be described. In the embodiment described with reference to FIG. 35, the single recording/reproducing apparatus has been described. In another embodiment, a video camera apparatus including an imaging device and an optical system for causing a light from an object to be incident on the imaging device and recording video data in a recording medium based on an imaging signal picked up by the imaging device will be described.

Figure 37:
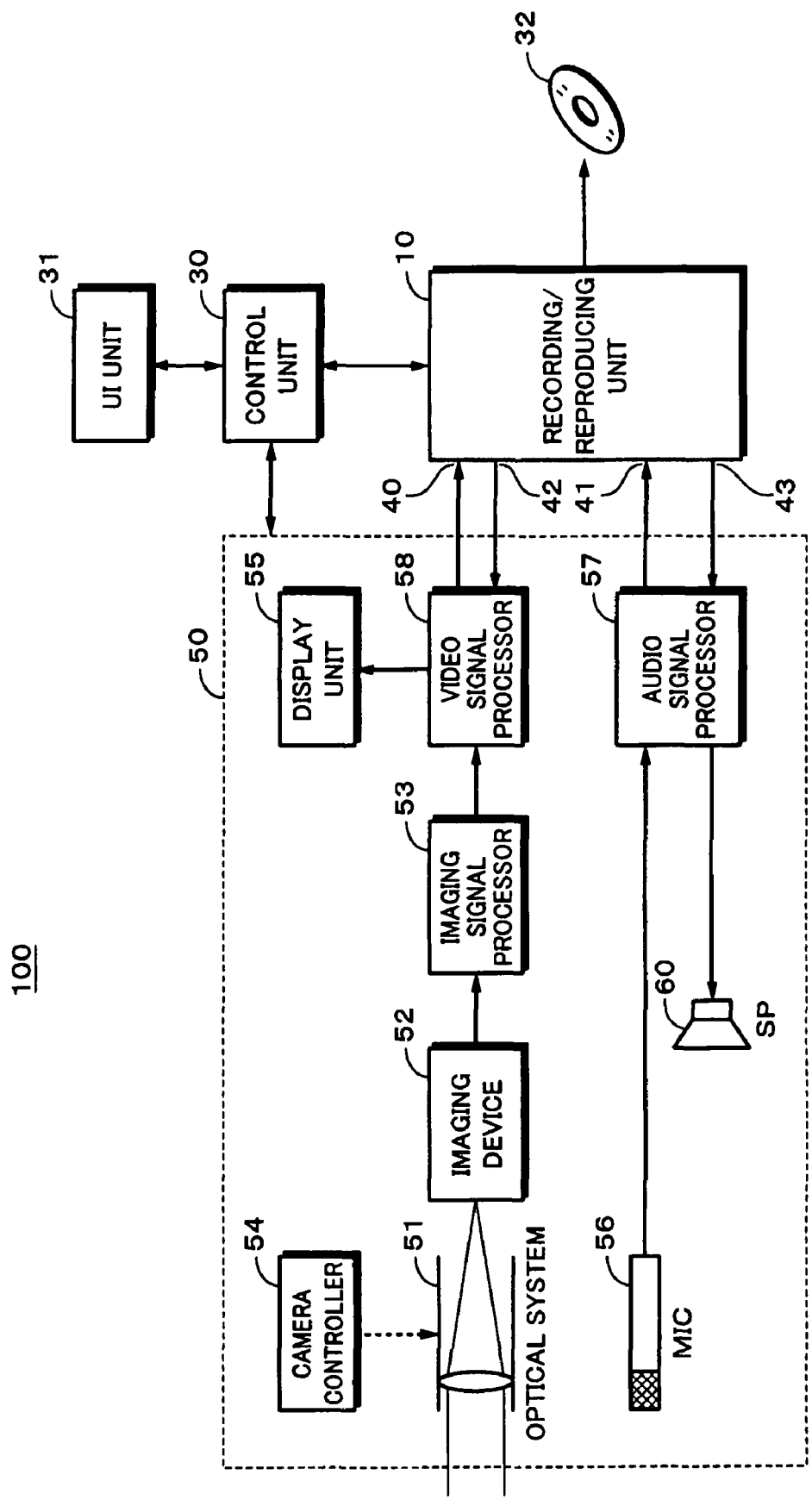
FIG. 37 is a schematic diagram showing an exemplary configuration of a video camera apparatus according to another embodiment of the present invention.

FIG. 37 shows an exemplarily configuration of a video camera apparatus 100 according to another embodiment of the present invention. In the video camera apparatus 100, the configuration of the recording apparatus described with reference to FIG. 35 is almost applicable a configuration of a recording system. Therefore, in FIG. 37, the same constituent elements as those shown in FIG. 35 are denoted by the same reference symbols and will not be described herein in detail.

In the configuration shown in FIG. 37, a camera section 50 includes an optical system 51, an imaging device 52, an imaging signal processor 53, a camera controller 54, a video signal processor 58, and a display unit 55 as video signal-related constituent elements. The camera section 50 also includes a microphone (MIC) 56, an audio signal processor 57, and a loudspeaker unit SP60 as audio signal-related constituent elements. A control unit 30 exchanges various control signals and information with the respective constituent elements of the camera section 50, and controls operations performed by the camera section 50. Furthermore, the control unit 50 controls the operations performed by the camera section 50 based on a control signal supplied from a UI unit 31 according to user's operation.

If an apparatus is constituted as the video camera apparatus 100, recording start operation and recording stop operations are generally controlled so that a recording start command and a recording stop command are alternately whenever a user depresses a single recording switch provided at the UI unit 31 using the single recording switch. It is assumed that a disc recording medium such as a Blu-ray Disc or a recordable DVD is employed as a recording medium 20 in the video camera apparatus 100.

In the camera section 50, the optical system 51 includes a lens system, an aperture adjustment mechanism, a focus adjustment mechanism, a zooming mechanism, a shutter mechanism for introducing a light from an object to the imaging device 52. Operations performed by the aperture adjustment mechanism, the focus adjustment mechanism, the zooming mechanism, and the shutter mechanism are controlled by the camera controller 54 based on a control signal supplied from the control unit 30.

The imaging device 52, which is configured to include, for example, a CCD (Charge Coupled Device), converts the light irradiated via the optical system 51 into an electric signal by photoelectric conversion, performs a predetermined signal processing on the electric signal, and outputs the resultant electric signal as the imaging signal. The imaging signal processor 53 performs a predetermined signal processing on the imaging signal output from the imaging device and outputs the resultant imaging signal as baseband digital video data. For example, the imaging signal processor 53 samples only a signal having image information from the imaging signal output from the imaging device 52 using a CDS (Correlated Double Sampling) circuit, not shown, eliminates noise from the sampled signal, and adjusts a gain of the sampled signal using an AGC (Auto Gain Control) circuit, not shown. Furthermore, the imaging signal processor 53 converts the resultant signal into a digital signal by A/D conversion.

Moreover, the imaging signal processor 53 transmits information on the imaging signal output from the imaging device 52 to the control unit 30. The control unit 30 generates a control signal for controlling the optical system 51 based on the information, and supplies the control signal to the camera controller 54. The camera controller 54 controls the focus adjustment mechanism, the aperture adjustment mechanism, and the like based on the control signal.

The video signal processor 58 perform a predetermined signal processing on the digital signal supplied from the imaging signal processor 53. For example, the video signal processor 58 performs a sensing-related signal processing on the supplied digital signal and extracts components of respective colors of R (red), G (green), and B (blue). The video signal processor 58 performs processings such as γ correction and white balance correction on the digital signal based on the extracted components of the respective colors. Finally, the video signal processor 58 outputs the resultant signal as one baseband digital video data.

The display unit 55, which employs, for example, an LCD (Liquid Crystal Display) as a display element, can display the data based on the digital video data supplied from the video signal processor 58. The display unit 55 is used as a monitor for monitoring picked-up images during pickup and displays reproduced images during reproduction.

The audio signal processor 57 converts an analog audio signal supplied from, for example, the MIC 56 into digital audio signal by A/D conversion, performs predetermined audio signal processings such as noise elimination and acoustic quality correction on the digital audio data, and outputs the digital audio data as baseband digital audio data. Further, the audio signal processor 57 performs predetermined audio signal processings such as the audio quality correction and a volume adjustment on supplied digital audio data, converts the digital audio data into an analog audio signal by D/A conversion, performs an amplification processing and the like on the analog audio signal, and supplies the resultant analog audio signal to the SP 60.

During imaging operation, the light incident on the imaging device 52 via the optical system 51 is converted to the electric signal by the photoelectric conversion and the electric signal is output as the imaging signal. The imaging signal is subjected to the predetermined signal processing by the imaging signal processor 53, converted to the digital signal by the A/D conversion, and output as the digital video signal. The digital video signal is supplied to the video signal processor 58. The video signal processor 58 performs the predetermined signal processings such as an image quality correction on the supplied digital video signal, and outputs the resultant digital video signal as the digital video data. The digital video data is supplied to a recording/reproducing unit 10 and input to a terminal 40.

Moreover, the video signal processor 58 generates digital video data to be displayed on the display unit 55 based on the digital signal supplied from the imaging signal processor 53. Further, the video signal processor 58 can communicate with the control unit 30 and generate an image based on a display control signal generated by the control unit 30 in a predetermined manner. The digital video data and the image generated by the video signal processor 58 are supplied to the display unit 55 and displayed on the display unit 55.

Meanwhile, the audio signal output from the MIC 56 is subjected to the predetermined signal processings such as the noise elimination, a limiter processing, and the audio quality correction by the audio signal processor 57, converted to the digital audio signal by the A/D conversion, and output as the digital audio data. The digital audio data is supplied to the recording/reproducing unit 10 and input to a terminal 41.

When the recording switch provided at the UI unit 31 is depressed in a recording stop state, a control signal for instructing recording start is supplied from the UI unit 31 to the control unit 30. Recording of the baseband digital video data and digital audio data output from the camera section 50 in the recording medium 32 starts under control of the control unit 30.

Namely, as already described with reference to FIG. 35, the video encoder 11 and the audio encoder 12 starts operating under control of the control unit 30. The video encoder 11 and the audio encoder 12 compression-codes the video data and the audio data, respectively. The MUX/DEMUX 13 packetizes the resultant video data and audio data, and multiplexes them with each other into the AV stream data. The AV stream data is supplied to the recording controller 15 via the stream buffer 14 and recorded in the recording medium 32 as clip AV stream files.

If the video camera apparatus 100 is configured to automatically assign a PlayList to a recording start position when recording starts, the PlayListMark is automatically assigned to the position corresponding to the recording start position according to the processing described with reference to FIG. 32. In actuality, information stored in each PlayList file is generated by, for example, the nonvolatile memory 17. The PlayListMark is information in the nonvolatile memory 17 at this moment.

When the recording switch provided on the UI unit 31 is depressed next, recording is stopped, the clip information files are created and the PlayList files are updated. The management information processor 16 creates clip information files corresponding to the respective clip AV stream files recorded in the recording medium 32 based on the information from the MUX/DEMUX 13 and the recording controller 15. Furthermore, the management information processor 16 creates PlayItems referring to the created clip file files. If a PlayList is already present, then the created PlayItems are added to the PlayList, and PlayListMark information is stored in the PlayList.

During reproduction, when the recording medium 32 is installed in the video camera apparatus 100, the files such as the index file and the MovieObject files are read from the recording medium 32 and supplied to the management information processor 16. The control unit 30 acquires information on the index file from the management information processor 16, and generates the display control signal for displaying a predetermined menu screen based on the acquired information. The display control signal is supplied to the video signal processor 58 and displayed on the display unit 55. When the user performs a predetermined operation on the UI unit 31 according to the display of the menu screen, one PlayList file instructed to be reproduced is read from the recording medium 32, for example, and clips recorded in the recording medium 32 are reproduced according to the description of the PlayList file.

Namely, as already described with reference to FIG. 35, the control unit 30 acquires the information on the PlayList file from the management information processor 16 according to the user's operation on the UI unit 31. Further, the control unit 30 transmits a command to the recording/reproduction controller 15 to read the clip information file and the clip AV stream file from the recording medium 32 based on the acquired information.

The clip AV stream file read from the recording medium 32 is supplied to the MUX/DEMUX 13 via the stream buffer 14, demultiplexed based on the packet header information or the like, and extracted as the compressed video data and the compressed audio data. The compressed video data is supplied to the video decoder 20, decoded by the video decoder 20, and supplied from the terminal 42 according to, for example, the PTS. The compressed audio data is supplied to and decoded by the audio decoder 21, and output from the terminal 43 synchronously with the video data output from the video decoder 20.

The video data output from the terminal 42 is subjected to the predetermined signal processings by the video signal processor 58 and then supplied to the display unit 55. The display unit 55 displays pictures based on the supplied video data. The audio data output from the terminal 43 is subjected to the predetermined signal processings by the audio signal processor 57, further subjected to an amplification operation and the like, and supplied to the SP unit 60.

The video camera apparatus 100 can also perform clip chapter division and editing. Because the chapter division and editing processing is identical with that according to the preceding embodiment, it will not be described herein for brevity. Likewise, because the chapter jumping processing is identical with that according to the preceding embodiment, it will not be described herein for brevity.

In the embodiments, it has been described that the recording/reproducing apparatus shown in FIG. 35 or the recording/reproducing unit 10 included in the video camera apparatus 100 shown in FIG. 37 is configured as hardware. However, the embodiments of the present invention are not limited to the hardware configuration. Namely, the recording/reproducing unit 10 can be configured as software. In this case, the software is stored in, for example, the ROM, not shown, included in the control unit 30 in advance. Alternatively, the recording/reproducing unit 10 can be configured in a computer apparatus such as a personal computer. In this alternative, software for causing the computer apparatus to execute the recording/reproducing unit 10 is provided while being recorded in a recording medium such as a CD-ROM or a DVD-ROM. If the computer apparatus is connectable to a network, the software can be provided via the network such as the Internet.

Moreover, in the embodiments, the recording apparatus or the recording/reproducing apparatus for recording contents data or the like in the recording medium has been described. However, the application range of the embodiments of the present invention is not limited to the recording apparatus and the recording/reproducing apparatus. For example, an apparatus that does not include a recording unit that records contents data in the recording medium and a reproducing unit that reproduces contents data from the recording medium, for example, an editing apparatus for editing the contents data and reproduction control information (the index file, MovieObjects, PlayLists, clip information files, and the like) on the contents data is also applicable to the embodiments of the present invention. In this case, a recording/reproducing apparatus, for example, connected to the editing apparatus may read and write data from and to the recording medium.

It should be understood by those skilled in the art that various modifications, combinations, sub-combinations and alternations may occur depending on design requirements and other factors insofar as they are within the scope of the appended claims or the equivalences thereof.

What is claimed is:

1. A recording apparatus for compression-coding video data and recording the compression-coded video data, comprising:
    an encoder compression-coding video data using interframe compression based on predictive coding for each of groups each including a plurality of pictures, a plurality of pictures including at least one independently-decodable picture; and
    a mark information generator generating mark information indicating an access position to the groups of the video data,
    wherein, when the access position is designated to one of the groups decodable without use of information on a closest past group in reproduction order, the mark information generator generates the mark information indicating a position which return from the access position to a top of the decodable group,
    the mark information indicating a position within a playlist layer that is a layer above a clip layer in which the compression-coded video data is arranged,
    the mark information being assigned to a group boundary when the group corresponding to the position of the mark information is closed, and the mark information being assigned to a presentation time stamp entry designated in the clip layer when the group corresponding to the position of the mark information is open.

2. The recording apparatus according to claim 1,
    wherein the mark information generator automatically generates the mark information indicating a top of each of the groups generated at start of recording.

3. The recording apparatus according to claim 1,
    wherein, when the access position is designated to one of the groups decoded using information on a immediately after group in reproduction order, the mark information generator generates the mark information indicating a position of the independently-decodable picture belonging to each of the groups.

4. The recording apparatus according to claim 1, further comprising a determining unit determining whether one of the groups including the access position to be designated is decodable without the use of the information on the immediately after group in the reproduction order,
    wherein the mark information generator determines whether to generate the mark information indicating the position of the top of the groupor to generate the mark information indicating the position of the independently-decodable picture belonging to the group, according to a determination result of the determining unit.

5. The recording apparatus according to claim 1, further comprising a reproduction control information generator generating reproduction control information indicating a method of reproducing the video data, wherein the mark information is stored in the reproduction control information.

6. A recording method for compression-coding video data and recording the compression-coded video data, the method comprising steps of:
compression-coding video data using interframe compression based on predictive coding for each of groups including a plurality of pictures, a plurality of pictures including at least one independently-decodable picture; and
generating mark information indicating an access position to the groups of the video data
wherein, when the access position is designated to one of the groups decodable without use of information on a closest past group in reproduction order, the mark information indicating a position which return from the access position to a top of the decodable group is generated at the step of generating the mark information,
the mark information indicating a position within a playlist layer that is a layer above a clip layer in which the compression-coded video data is arranged,
the mark information being assigned to a group boundary when the group corresponding to the position of the mark information is closed, and the mark information being assigned to a presentation time stamp entry designated in the clip layer when the group corresponding to the position of the mark information is open.

7. A non-transitory computer readable storage medium having stored thereon a recording program for causing a computer apparatus to execute a recording method for compression-coding video data and recording the compression-coded video data,
wherein the recording method comprises the steps of:
compression-coding video data using interframe compression based on predictive coding for each of groups each including a plurality of pictures, a plurality of pictures including at least one independently-decodable picture; and
generating mark information indicating an access position to the groups of the video data
wherein, when the access position is designated to one of the groups decodable without use of information on a closest past group in reproduction order, the mark information indicating a position which return from the access position to a top of the decodable group is generated at the step of generating the mark information,
the mark information indicating a position within a playlist layer that is a layer above a clip layer in which the compression-coded video data is arranged,
the mark information being assigned to a group boundary when the group corresponding to the position of the mark information is closed, and the mark information being assigned to a presentation time stamp entry designated in the clip layer when the group corresponding to the position of the mark information is open.

8. A recording/reproducing apparatus for compression-coding video data, recording the compression-coded video data in a recording medium, and reproducing and decoding the compression-coded video data recorded in the recording medium, comprising:
an encoder compression-coding video data using interframe compression based on predictive coding for each of groups each including a plurality of pictures, a plurality of pictures including at least one independently-decodable picture; and
a mark information generator generating mark information indicating an access position to the groups of the video data,
wherein, when the access position is designated to one of the groups decodable without use of information on a closest past group in reproduction order, the mark information generator generates the mark information indicating a position which return from the access position to a top of the decodable group,
the mark information indicating a position within a playlist layer that is a layer above a clip layer in which the compression-coded video data is arranged,
the mark information being assigned to a group boundary when the group corresponding to the position of the mark information is closed, and the mark information being assigned to a presentation time stamp entry designated in the clip layer when the group corresponding to the position of the mark information is open.

9. The recording/reproducing apparatus according to claim 8, wherein the mark information generator automatically generates the mark information indicating the position of the top of each of the groups generated at start of recording.

10. The recording/reproducing apparatus according to claim 8, wherein, when the access position is designated to one of the groups decoded using information on a closest past group in reproduction order, the mark information generator generates the mark information indicating a position of the at least one independently-decodable picture belonging to each of the groups.

11. The recording/reproducing apparatus according to claim 8, further comprising an operating unit accepting a user's operation and designating the access position according to the user's operation,
wherein, when the access position designated by user's operating the operating unit indicates a position other than a recording start position, the mark information generator generates the mark information indicating a position of the at least one independently-decodable picture belonging to one of the groups including the access position.

12. The recording/reproducing apparatus according to claim 8, further comprising a determining unit determining whether one of the groups including the access position to be designated is decodable without the use of the information on the closest past group in the reproduction order,
wherein the mark information generator determines whether to generate the mark information indicating the position of the top of the group or to generate the mark information indicating the position of the independently-decodable picture belonging to the group, according to a determination result of the determining unit.

13. The recording/reproducing apparatus according to claim 8, further comprising a reproduction control information generator generating reproduction control information indicating a method of reproducing the video data,
wherein the mark information is stored in the reproduction control information.

14. A recording/reproducing method for compression-coding video data, recording the compression-coded video data in a recording medium, and reproducing and decoding the compression-coded video data recorded in the recording medium, the method comprising steps of:
compression-coding video data using interframe compression based on predictive coding for each of groups each including a plurality of pictures, a plurality of pictures including at least one independently-decodable picture; and generating mark information indicating an access position to the groups of the video data, wherein, when the access position is designated to one of the groups decodable without use of information on a closest past group in reproduction order, the mark information indicating a position which return from the access position to a top of the decodable group is generated at the step of generating the mark information, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

15. A non-transitory computer readable storage medium having stored thereon a recording/reproducing program for causing a computer apparatus to execute a recording/reproducing method for compression-coding video data, recording the compression-coded video data in a recording medium, and reproducing and decoding the compression-coded video data recorded in the recording medium, wherein the recording/reproducing method comprises the steps of:

compression-coding video data using interframe compression based on predictive coding for each of groups each including a plurality of pictures, a plurality of pictures including at least one independently-decodable picture; and generating mark information indicating an access position to the groups of the video data, wherein, when the access position is designated to one of the groups decodable without use of information on a closest past group in reproduction order, the mark information indicating a position which return from the access position to a top of the decodable group is generated at the step of generating the mark information, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

16. An editing apparatus for generating mark information for designating an access position to video data, comprising:

a decoder decoding video data compression-coded using interframe compression based on predictive coding for each of groups each including a plurality of pictures, a plurality of pictures including at least one independently-decodable picture; and mark information generator generating mark information indicating an access position to the groups of the video data, wherein, when the access position is designated to one of the groups decodable without use of information on a closest past group in reproduction order, the mark information generator generates the mark information indicating a position which return from the access position to a top of the decodable group, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

17. The editing apparatus according to claim 16, wherein, when the access position is designated to one of the groups decoded using information on the closest past group in the reproduction order, the mark information generator generates the mark information indicating a position of the independently-decodable picture belonging to the groups.

18. The editing apparatus according to claim 17, further comprising a determining unit determining whether one of the groups including the access position to be designated is decodable without the use of the information on the closest past group in the reproduction order, wherein the mark information generator determines whether to generate the mark information indicating the position of the top of the group or to generate the mark information indicating the position of the independently-decodable picture belonging to the group, according to a determination result of the determining unit.

19. The editing apparatus according to claim 17, further comprising a reproduction control information generator generating reproduction control information indicating a method of reproducing the video data, wherein the mark information is stored in the reproduction control information.

20. An editing method for generating mark information for designating an access position to video data, the method comprising steps of:

decoding video data compression-coded using interframe compression based on predictive coding for each of groups each including a plurality of pictures, a plurality of pictures including at least one independently-decodable picture; and generating mark information indicating an access position to the video data for each of the groups;

wherein, when the access position is designated to one of the groups decodable without use of information on a closest past group in reproduction order, the mark information indicating a position which return from the access position to a top of the decodable group is generated at the step of generating the mark information, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

21. The editing method according to claim 20 wherein, when the access position is designated to one of the groups decoded using information on the closest past group in the reproduction order in response to the operation at the step of accepting the operation, the mark information indicating a position of the independently-decodable picture belonging to each of the groups is generated at the step of generating the mark information.

22. A non-transitory computer readable storage medium having stored thereon an editing program for causing a computer apparatus to execute an editing method for generating mark information for designating an access position to video data, wherein the editing method comprises the steps of:

decoding video data compression-coded using interframe compression based on predictive coding for each of groups each including a plurality of pictures, a plurality of pictures including at least one independently-decodable picture; and generating mark information indicating an access position to the groups of the video data;

wherein, when the access position is designated to one of the groups decodable without use of information on a closest past group in reproduction order in response to the operation at the step of accepting the user's operation, the mark information indicating a position which return from the access position to a top of the decodable group is generated at the step of generating the mark information, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

23. The editing method according to claim 22 wherein, when the access position is designated to one of the groups decoded using information on the closest past group in the reproduction order in response to the operation at the step of accepting the operation, the mark information indicating a position of the independently-decodable picture belonging to each of the groups is generated at the step of generating the mark information.

24. An editing apparatus for generating mark information for designating an access position to video data, comprising:

a decoder decoding video data compressed coded using interframe compression based on predictive coding for each of groups each including a plurality of pictures, a plurality of pictures including at least one independently-decodable picture;

a mark information generator generating mark information indicating an access position to the groups of the video data;

wherein, when the access position is designated to one of the groups decoded using information on the closest past group in the reproduction order, the mark information generator generates the mark information indicating a position of the independently-decodable picture belonging to the groups, the mark information indicating a position within a playlist layer that is a layer above a clip layer in which the compression-coded video data is arranged, the mark information being assigned to a group boundary when the group corresponding to the position of the mark information is closed, and the mark information being assigned to a presentation time stamp entry designated in the clip layer when the group corresponding to the position of the mark information is open.

* * * * *